(12) United States Patent
Lautzenheiser et al.

(10) Patent No.: US 10,183,870 B2
(45) Date of Patent: Jan. 22, 2019

(54) POINT-OF-USE WATER TREATMENT SYSTEM

(71) Applicant: Access Business Group International LLC, Ada, MI (US)

(72) Inventors: Terry L. Lautzenheiser, Nunica, MI (US); Michael E. Miles, Grand Rapids, MI (US); Robert M. Missman, Grand Rapids, MI (US); David J. Anderson, Ada, MI (US); Ilir Furxhi, Grand Rapids, MI (US); Liane B. Hopaluk, Lowell, MI (US); Amy Sue Puroll, Ionia, MI (US); Kevin G. King, Caledonia, MI (US); Rick G. Good, Rockford, MI (US)

(73) Assignee: Access Business Group International LLC, Ada, MI (US)

( * ) Notice: Subject to any disclaimer, the term of this patent is extended or adjusted under 35 U.S.C. 154(b) by 102 days.

(21) Appl. No.: 15/160,151

(22) Filed: May 20, 2016

(65) Prior Publication Data
US 2016/0340202 A1 Nov. 24, 2016

Related U.S. Application Data

(60) Provisional application No. 62/165,252, filed on May 22, 2015.

(51) Int. Cl.
*E03C 1/02* (2006.01)
*B01D 35/30* (2006.01)
(Continued)

(52) U.S. Cl.
CPC .............. *C02F 1/003* (2013.01); *B01D 35/30* (2013.01); *C02F 1/283* (2013.01); *C02F 1/325* (2013.01);
(Continued)

(58) Field of Classification Search
CPC .......... C02F 1/003; C02F 9/005; C02F 1/283; C02F 1/325; C02F 2201/3228;
(Continued)

(56) References Cited

U.S. PATENT DOCUMENTS

| 4,971,687 A | 11/1990 | Anderson |
| 5,445,729 A | 8/1995 | Monroe et al. |

(Continued)

FOREIGN PATENT DOCUMENTS

| CA | 2 634 313 | 12/2000 |
| CA | 2 634 660 | 12/2000 |

(Continued)

OTHER PUBLICATIONS

International Search Report and Written Opinion for International Application No. PCT/US2010/020623 dated Dec. 3, 2010.

*Primary Examiner* — Madeline Gonzalez
(74) *Attorney, Agent, or Firm* — Warner Norcross + Judd LLP

(57) ABSTRACT

A water treatment system having a water treatment engine including a pressure vessel, electronics module and optionally replaceable shrouds. The water treatment engine may include a tether and a single connection point for water and power lines. The tether may have a release that is accessible only when the electronic module is removed. The water treatment engine may be circular and the water and power lines may be arranged within a region bounded by tangent lines that square the circular shape. The electronics module may be configured to receive one of a variety of alternative interchangeable displays. The electronics module may have a single display port that provides power and data that can be utilized by a plurality of different types of displays. The system may include a replaceable cartridge with soft end (Continued)

caps that include an integral seal and are shaped to self-center within the pressure vessel.

26 Claims, 54 Drawing Sheets

(51) Int. Cl.
| | |
|---|---|
| *C02F 1/00* | (2006.01) |
| *E03B 1/04* | (2006.01) |
| *C02F 1/32* | (2006.01) |
| *C02F 1/28* | (2006.01) |
| *C02F 9/00* | (2006.01) |
| *C02F 103/02* | (2006.01) |

(52) U.S. Cl.
CPC .............. *C02F 9/005* (2013.01); *E03B 1/04* (2013.01); *E03C 1/02* (2013.01); *B01D 2201/4023* (2013.01); *B01D 2201/4053* (2013.01); *B01D 2201/54* (2013.01); *C02F 2103/02* (2013.01); *C02F 2201/002* (2013.01); *C02F 2201/004* (2013.01); *C02F 2201/006* (2013.01); *C02F 2201/3228* (2013.01); *E03C 2201/40* (2013.01)

(58) Field of Classification Search
CPC .......... C02F 2201/006; C02F 2201/004; C02F 2201/002; C02F 2103/02; E03C 1/02; E03C 2201/40; B01D 35/30; B01D 2201/4023; B01D 2201/4053; B01D 2201/54; E03B 1/04
USPC ........ 210/435, 440, 443, 447, 232, 234, 449
See application file for complete search history.

(56) References Cited

U.S. PATENT DOCUMENTS

| | | | |
|---|---|---|---|
| 5,536,395 A | 7/1996 | Kuennen et al. | |
| 5,698,091 A | 12/1997 | Kuennen et al. | |
| 5,709,795 A | 1/1998 | Park et al. | |
| 5,853,572 A | 12/1998 | Kuennen et al. | |
| 6,001,249 A | 12/1999 | Bailey et al. | |
| 6,024,867 A | 2/2000 | Parise | |
| 6,042,720 A | 3/2000 | Reber et al. | |
| 6,238,552 B1 | 5/2001 | Shannon | |
| 6,368,504 B1 | 4/2002 | Kuennen et al. | |
| 6,436,299 B1 | 8/2002 | Baarman et al. | |
| 6,451,202 B1 | 9/2002 | Kuennen et al. | |
| 6,491,868 B2 | 12/2002 | Kuennen et al. | |
| 6,514,420 B2 | 2/2003 | Kuennen et al. | |
| 6,569,319 B2 | 5/2003 | Kuennen et al. | |
| 6,673,250 B2 | 1/2004 | Kuennen et al. | |
| 6,793,817 B2 | 9/2004 | Kuennen et al. | |
| 6,806,649 B2 | 10/2004 | Mollema et al. | |
| 6,825,620 B2 | 11/2004 | Kuennen et al. | |
| 7,170,200 B2 | 1/2007 | Mollema | |
| 7,180,248 B2 | 2/2007 | Kuennen et al. | |
| 7,252,763 B2 | 8/2007 | Kuennen et al. | |
| 7,382,636 B2 | 6/2008 | Baarman et al. | |
| 7,385,357 B2 | 6/2008 | Kuennen et al. | |
| 7,592,753 B2 | 9/2009 | Baarman et al. | |
| 7,821,208 B2 | 10/2010 | Baarman et al. | |
| 7,953,369 B2 | 5/2011 | Baarman | |
| 8,116,681 B2 | 2/2012 | Baarman | |
| 8,222,827 B2 | 7/2012 | Kuennen et al. | |
| 8,421,267 B2 | 4/2013 | Cook et al. | |
| 8,618,749 B2 | 12/2013 | Kuennen et al. | |
| 8,754,584 B2 | 6/2014 | Chen et al. | |
| 2002/0162779 A1 | 11/2002 | Kuennen et al. | |
| 2003/0019764 A1 | 1/2003 | Baldwin et al. | |
| 2003/0070968 A1 | 4/2003 | Haynes et al. | |
| 2003/0094405 A1 | 5/2003 | Stamey, Jr. et al. | |
| 2003/0094408 A1 | 5/2003 | Schuyler et al. | |
| 2003/0168389 A1 | 9/2003 | Astle et al. | |
| 2003/0173273 A1 | 9/2003 | Giordano et al. | |
| 2003/0178356 A1 | 9/2003 | Bartkus et al. | |
| 2004/0129617 A1 | 7/2004 | Tanner et al. | |
| 2005/0045552 A1 | 3/2005 | Tadlock | |
| 2005/0103701 A1 | 5/2005 | Bechtum et al. | |
| 2005/0167352 A1 | 8/2005 | Burrows et al. | |
| 2006/0065601 A1 | 3/2006 | Baird | |
| 2006/0065607 A1 | 3/2006 | Bassett et al. | |
| 2006/0108267 A1 | 5/2006 | Warren et al. | |
| 2007/0039863 A1 | 2/2007 | Miles et al. | |
| 2007/0125692 A1 | 6/2007 | Snyder | |
| 2007/0151919 A1 | 7/2007 | Klump et al. | |
| 2007/0181481 A1 | 8/2007 | Reynolds et al. | |
| 2008/0047889 A1 | 2/2008 | Huda | |
| 2009/0045106 A1 | 2/2009 | Kuennen et al. | |
| 2012/0132573 A1 | 5/2012 | Lautzenheiser et al. | |
| 2014/0077696 A1 | 3/2014 | Kuennen et al. | |
| 2014/0086565 A1* | 3/2014 | Lilley ..................... B08B 9/08 392/449 |

FOREIGN PATENT DOCUMENTS

| | | |
|---|---|---|
| CA | 2576634 | 8/2008 |
| CA | 2634660 | 1/2011 |
| CN | 1968896 | 5/2007 |
| CN | 201136806 | 10/2008 |
| DE | 20202004 | 6/2002 |
| DE | 202008011662 | 11/2008 |
| EP | 0 243 557 | 11/1987 |
| EP | 1068888 | 1/2001 |
| EP | 1253114 | 10/2002 |
| JP | S5944595 | 3/1984 |
| JP | S61-11989 | 1/1986 |
| JP | S62-262784 | 11/1987 |
| JP | H2104894 | 8/1990 |
| JP | H10511033 | 10/1998 |
| JP | H10-328653 | 12/1998 |
| JP | H11-216463 | 8/1999 |
| JP | 2005517525 | 6/2005 |
| JP | 2005-344311 | 12/2005 |
| JP | 2007021494 | 2/2007 |
| JP | 2007-326028 | 12/2007 |
| JP | 2008-514427 | 5/2008 |
| JP | 2008272748 | 11/2008 |
| WO | 9609250 | 3/1996 |
| WO | 0078678 | 12/2000 |
| WO | 0078681 | 12/2000 |
| WO | 03018486 | 3/2003 |
| WO | 03076342 | 9/2003 |
| WO | 2005090241 | 9/2005 |
| WO | 2006/039538 | 4/2006 |
| WO | 2007145944 | 12/2007 |
| WO | 2008010116 | 1/2008 |
| WO | 2008056311 | 5/2008 |
| WO | 2009033048 | 3/2009 |
| WO | 2009038447 | 3/2009 |
| WO | 2009125979 | 10/2009 |

\* cited by examiner

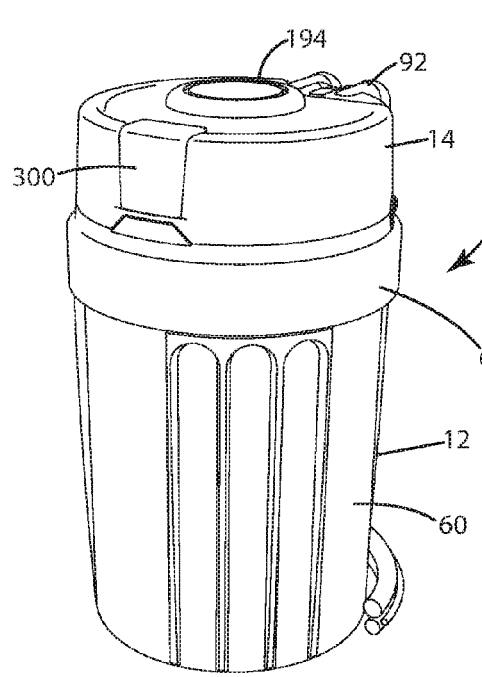
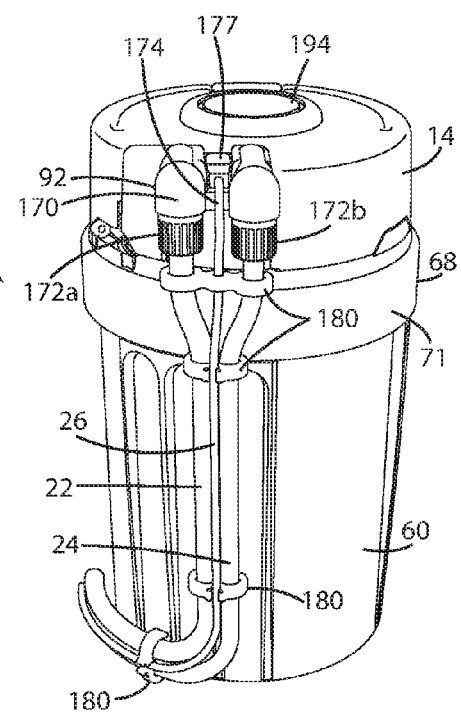
Fig. 1A     Fig. 1B
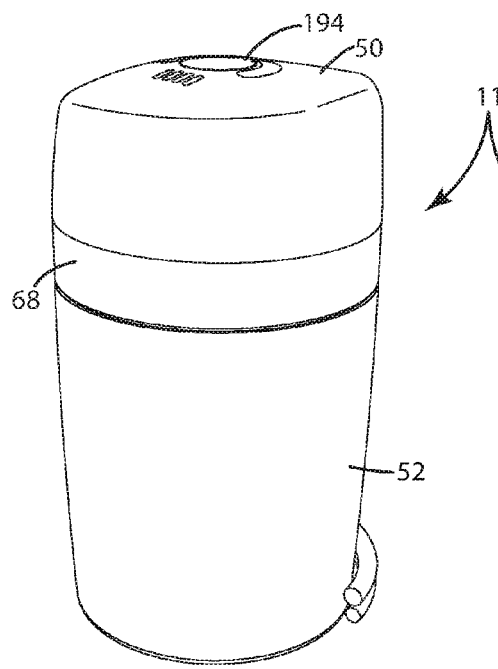
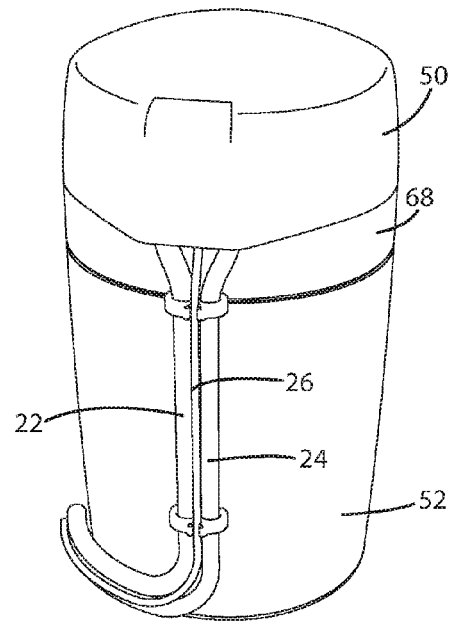
Fig. 2A     Fig. 2B

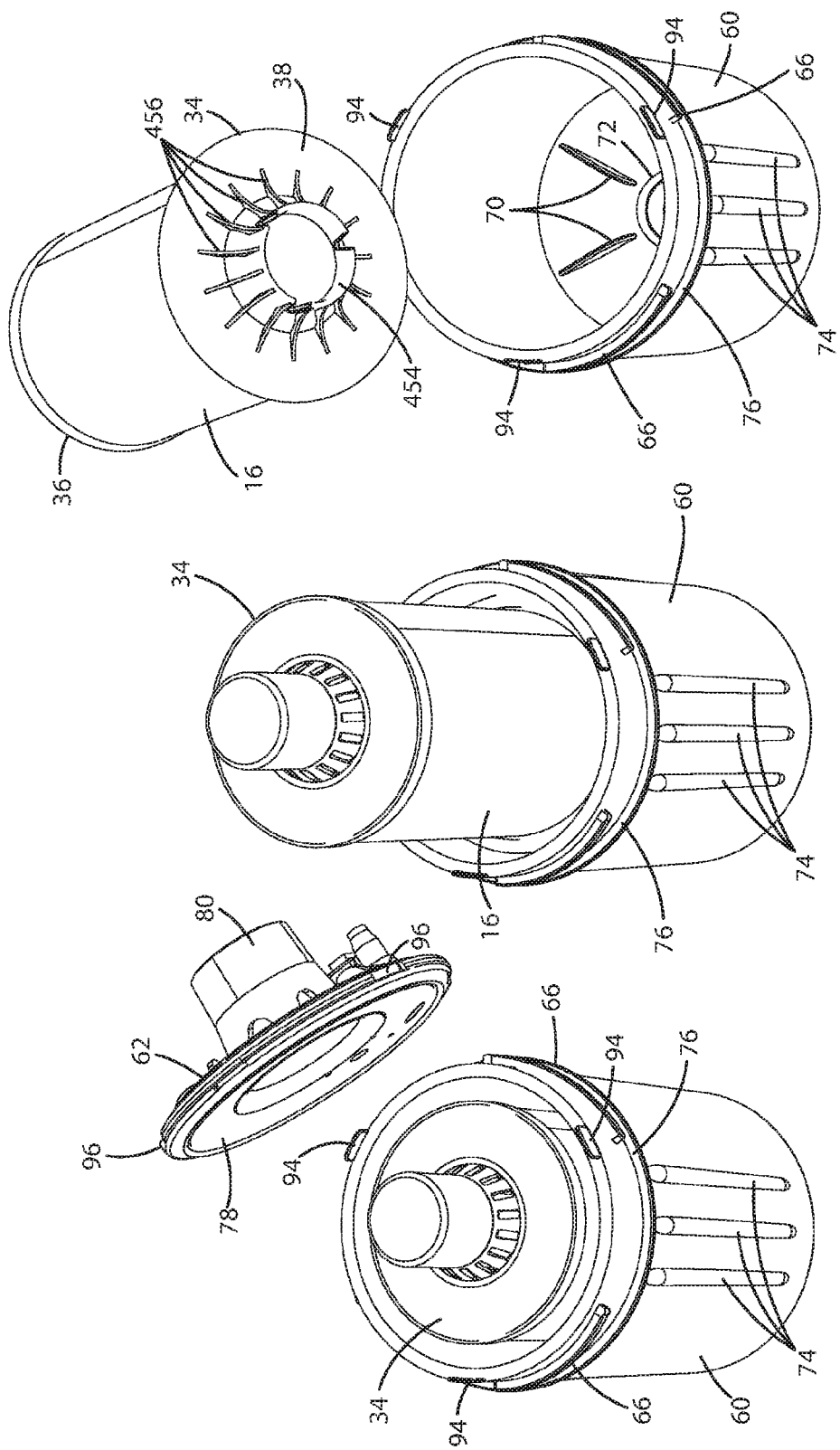

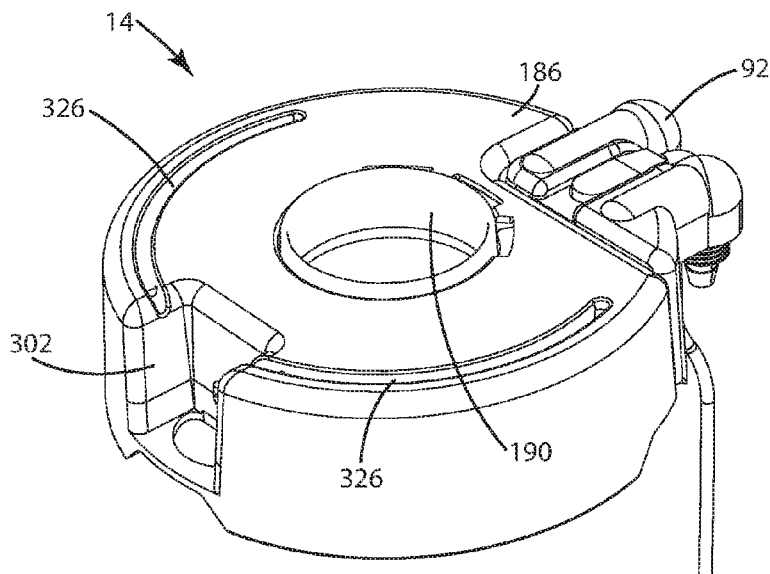
Fig. 6A
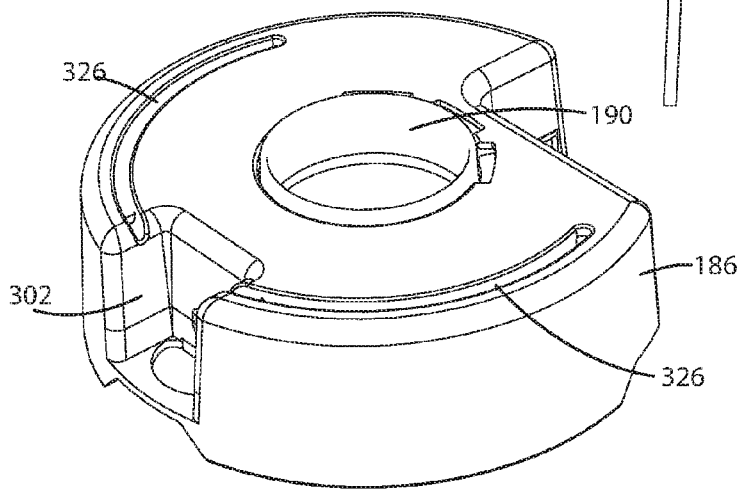
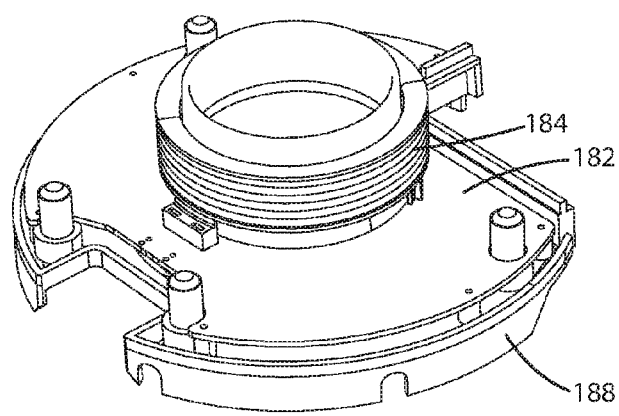
Fig. 6B

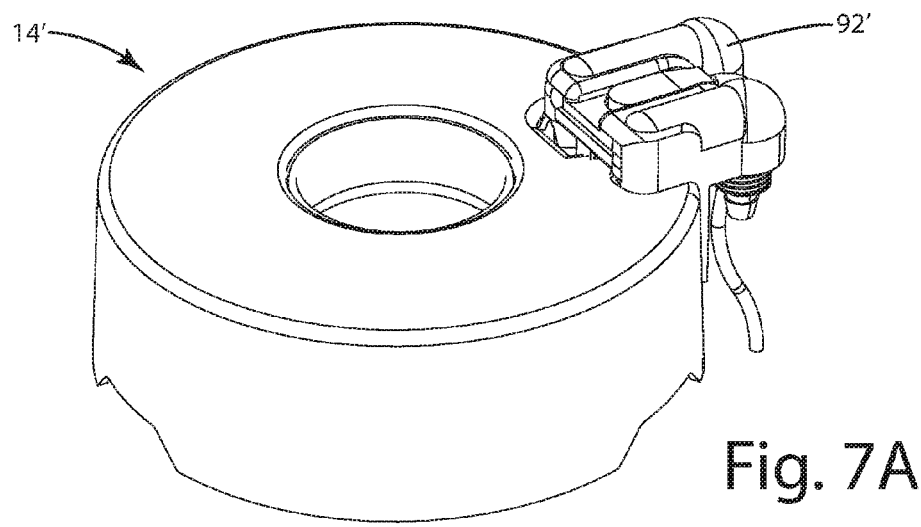
Fig. 7A
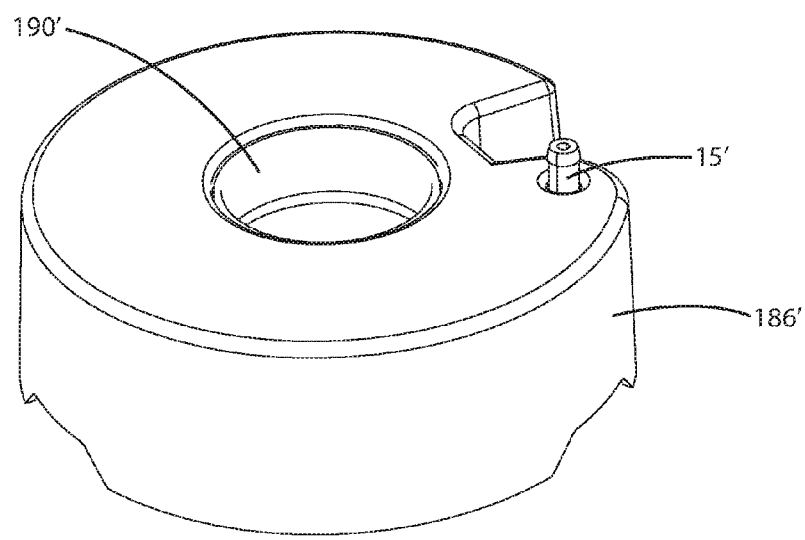
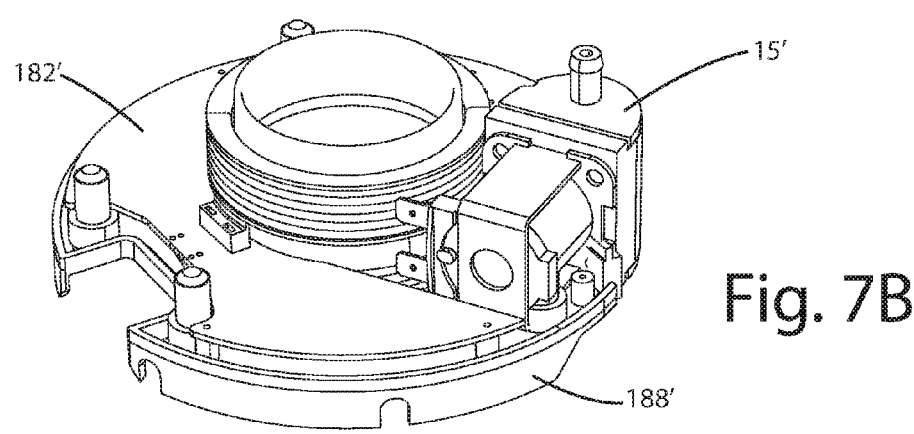
Fig. 7B

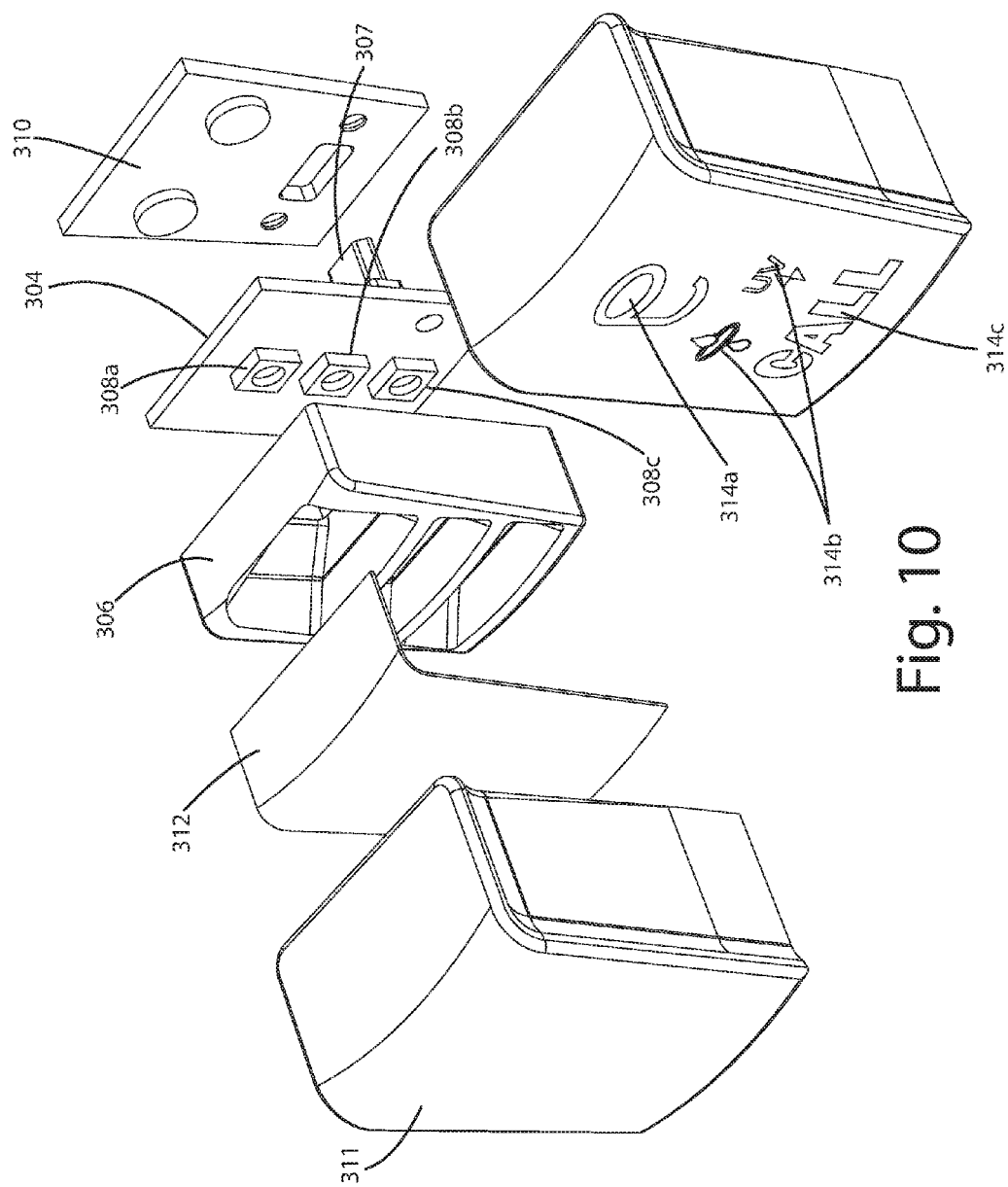

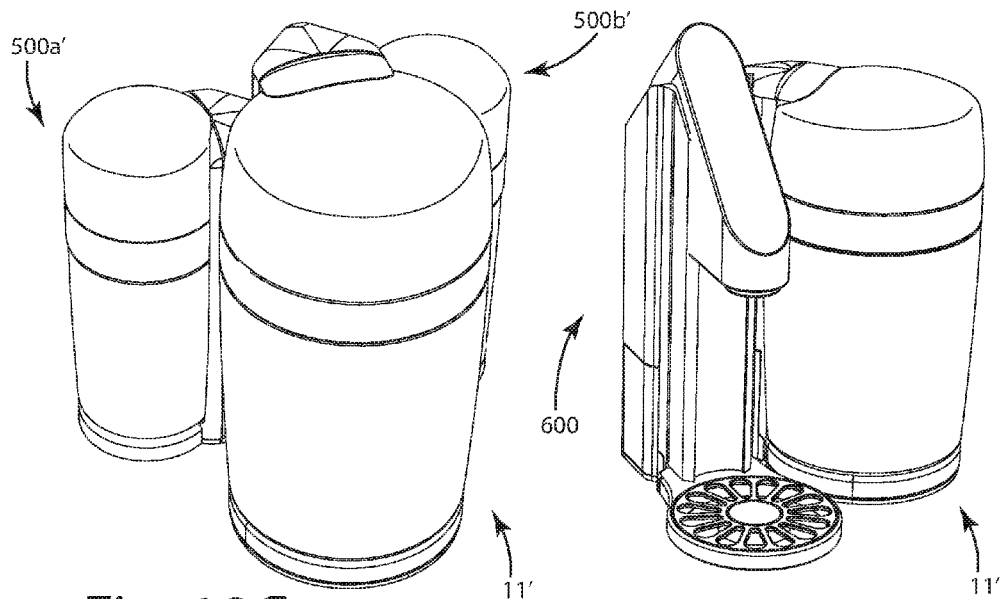
Fig. 19C
Fig. 19D
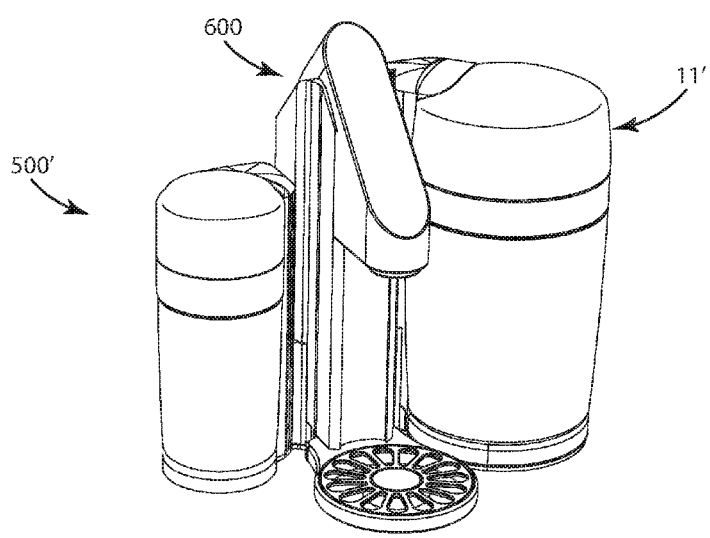
Fig. 19E

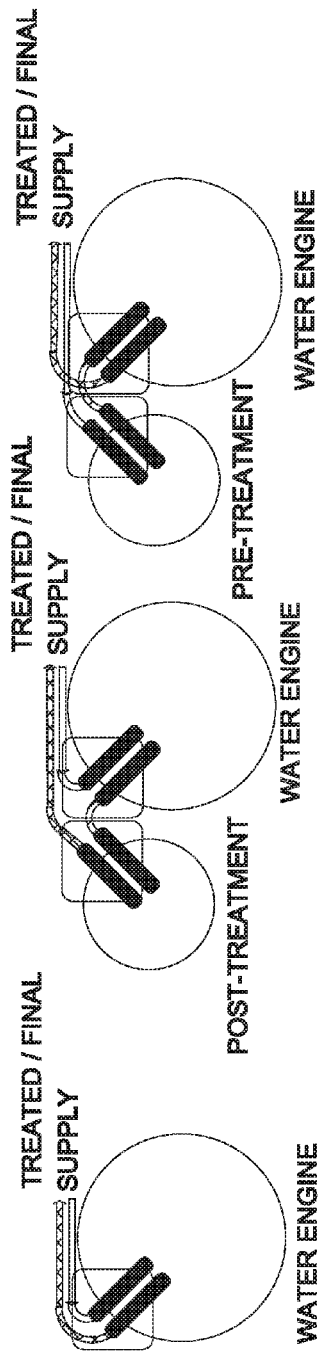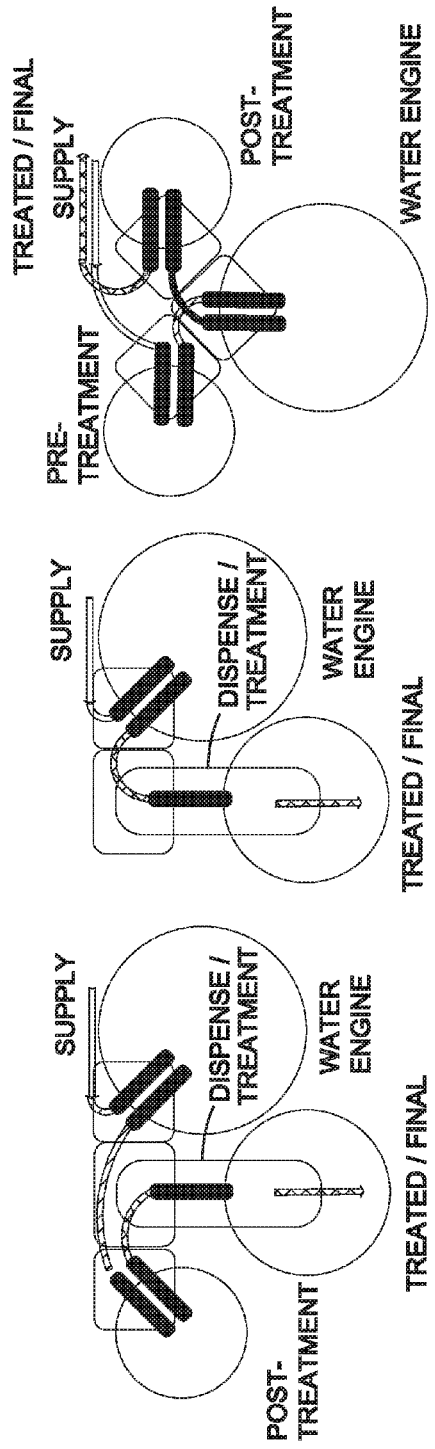

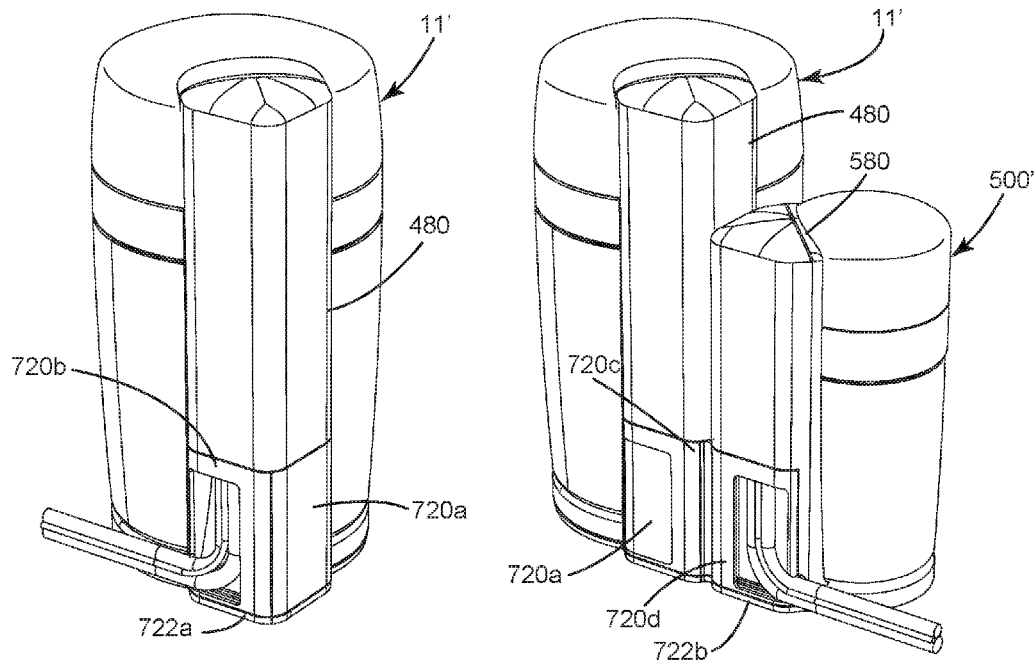
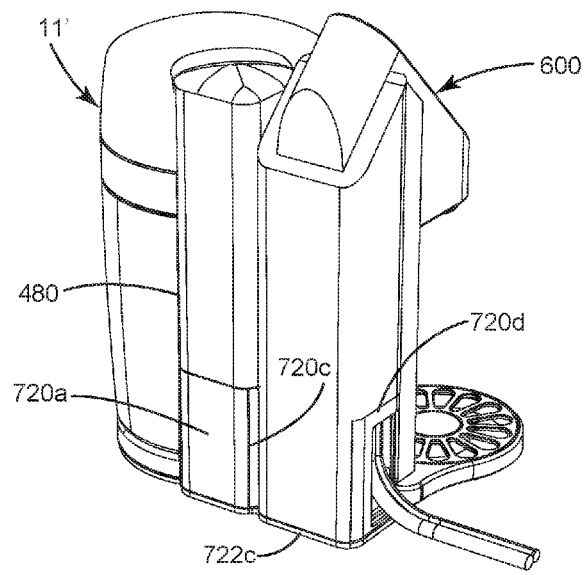
Fig. 21A　　Fig. 21B
Fig. 21C

POINT-OF-USE WATER TREATMENT SYSTEM

BACKGROUND OF THE INVENTION

The present invention relates to a water treatment systems, and more particularly to point-of-use water treatment systems for residential or commercial applications.

Water treatment systems are commonly used to treat water intended for human consumption. A typical water treatment system is configured to remove pathogens, chemical contaminants and turbidity from water. A wide variety of treatment mechanisms are employed in conventional water treatment systems. Many conventional treatment methods can be broadly classified as either solid separation using physical processes and/or chemical processes or as sterilization using heat, irradiation or chemical additives. For example, conventional water treatment systems often include carbon filtration, non-carbon filtration, distillation, ozone treatment, reverse osmosis, ion exchange components, chlorination components, aeration components, advanced oxidation process components, coagulation components, sedimentation components or ultraviolet radiation components.

Conventional point-of-use water treatment systems are designed for use at a single water outlet, such as a sink or water dispenser. A typical point-of-use water treatment system is connected to a pressurized water supply to treat water as it is being dispensed. In some applications, the water treatment system is positioned on a countertop adjacent to a sink. In countertop applications, the water treatment system is typically connected to the end of the water faucet so that water exiting the faucet can be routed through the water treatment system before it is dispensed. In other applications, the water treatment system is positioned below the countertop, for example, in a cabinet under the sink. In a typical under-counter application, the water treatment system is connected to the water supply line upstream from the standard faucet. In such applications, the water treatment system may be coupled to an auxiliary faucet installed adjacent to the sink above the counter to dispense treated water. Point-of-use water treatment systems are used in a wide variety of diverse environments. This diversity relates not only to the nature and quality of the water to be treated, but also to the physical and aesthetic characteristics of the surrounding environment. As a result, it is desirable to provide a single point-of-use water treatment system that is capable of being adapted for use in a wide range of different environments.

Many conventional point-of-use water treatment systems include consumable water treatment components that must be replaced over time, such as replaceable carbon filters and replaceable UV lamps. It is desirable to provide a water treatment system in which it is easy for the operator to remove and replace consumable water treatment components.

SUMMARY OF THE INVENTION

The present invention provides a point-of-use water treatment system having a water treatment engine that can be fitted with a variety of interchangeable shrouds depending on the environment in which the water treatment system will be used. In one embodiment, the shroud includes top and bottom shroud halves, and the water treatment engine may include a central band. In use, the water treatment engine may be fitted into the bottom shroud with the band engaging the top edge of the bottom shroud, and the top shroud may be fitted over the top of the water treatment engine with the bottom edge of the shroud engaging the top of the band. The top shroud may include a translucent or transparent region that allows viewing a display covered by the top shroud.

In one embodiment, the shroud is generally circular and the power and water lines are arranged within a region bounded by tangent lines that square the circular shape of the shroud. The bounding tangent lines may extend at an angle of at least about ninety degrees from one another.

In one embodiment, the water treatment engine includes an electronics module that is situated at the top of the water treatment engine above the water line. The water treatment system may include a water treatment component that operates with electrical power and the electronics module may wirelessly transfer electrical power to the water treatment component. For example, the water treatment engine may include a UV light source that is situated in water treatment vessel near the electronics module. This allows the water treatment component to be fully sealed and unpenetrated by any connections.

In one embodiment, the water treatment engine includes a single connection point that includes connectors for the water inlet, the water outlet and electrical power. In one embodiment, the connection point includes a manually-operated release that is accessible only when the electronics module is removed from the water treatment engine.

In one embodiment, the water treatment engine may be configured to receive one of a variety of alternative interchangeable displays. The water treatment engine may include an electronics module with a single display port that provides power and data that can be utilized by a plurality of different types of displays. Each display may be configured to connect to the display port and to utilize power and that portion of the data provided over the display port to perform its display function.

In one embodiment, the water treatment engine includes a connection point that is situated atop the water treatment engine. The connection point may be within the perimeter of the water treatment engine so that it does not increase the overall footprint of the water treatment engine.

In one embodiment, the water treatment engine includes a wireless flow meter that is external, but situated in close proximity to, the electronics module, so that the flow meter can be read by a reader situated in the electronics module. In one embodiment, the flow meter includes a turbine that rotates at a rate proportional to the volume of water flowing through the system. The turbine may include one or more magnets that can be read by a Hall-effect sensor or other magnetic field sensor situated in the electronics module.

In one embodiment, the water treatment engine includes a base and a manifold that cooperatively house a replaceable cartridge. The replaceable cartridge may include soft end caps. The top end cap may include an integral annular seal that interacts with the manifold to define the internal flow path. The bottom end cap may be shaped so that it self-centers when fitted into the base.

In one embodiment, the replaceable cartridge includes a UV lamp and a carbon block filter. The upper end of the UV lamp protrudes from the top and extends into a corresponding recess in the bottom of the electronics module. The upper end of the UV lamp includes an inductive secondary configured to wirelessly receive power from an inductive primary included in the electronics module. A water-proof cover may be fitted over the upper end of the UV lamp to protect the electronics from water exposure. A slotted collar may be fitted between the cover and the top end cap. The slots in the collar allow water and light to pass. The collar may be transparent to visible light to improve light transmission.

In one embodiment, the manifold is secured to the base by a connector collar. The connector collar may be configured to be fitted over the manifold and threadedly secured to the base. The connector collar may include an internal flange that engages the manifold so that, when closed, the connector collar clamps the manifold down into leaktight engagement with the base and the filter cartridge. The connector collar may include an integral handle that can provide a mechanical advantage when turning the connector collar. The handle may be configured to fold into a seat in the top of the manifold. The connector collar and the manifold may be configured so that the handle will align with the seat in the manifold only when the connector collar is properly closed. This may help to ensure proper closure of the connector collar.

In one embodiment, the water treatment system may be configured for easy interconnection with auxiliary components, such as supplemental water treatment components, water dispensing components, water temperature components and components that can introduce additives (e.g. vitamins, minerals and other nutritional supplements, as well as flavoring and carbonation) to the water. The water treatment system and auxiliary components may be interconnected by interchangeable base plates that are readily secured to the bottom of the water treatment system and the auxiliary components. The water treatment system and auxiliary components may also include interchangeable wall panels that can be used to close or to selectively create access openings in the housings to allow routing of water and power lines. The system may also include connecting panels that can be installed between adjacent components.

In an alternative embodiment, the pressure vessel includes a tank, a tank adapter, a manifold, a collar. The tank may be a thin-walled structure that is sized and shaped to receive a replaceable cartridge. The tank may have an open end with a flange to interface with the manifold, the tank adapter and the collar. The manifold is configured to close the open end of the tank and includes a water inlet and a water outlet. For example, the manifold may be secured against the tank flange. A seal may be fitted between the manifold and the flange to provide a leaktight interface. The tank adapter is a ring-like structure that is fitted about the tank in engagement with the flange. The tank adapter extends circumferentially around the tank and provides a mating structure for the collar. The collar is fitted over the manifold and is configured to be intersecured to the tank adapter. For example, the tank adapter and collar may include mating threads that allow the collar to be threadedly installed with tank adapter. In use, the collar and tank adapter interact to secure and compress the manifold and the tank flange.

In another alternative embodiment, the water treatment system may include a tether that combines the supply inlet and treated water outlet into a single assembly for ease and simplicity of user effort. In one embodiment, the tether includes a prominent button that is operated by a user to secure/release the tether from the pressure vessel. In this embodiment, the tether may be configured to be fitted over the supply inlet and treated water outlet of the manifold and latched under the collar. The bottom may be exposed and configured to provide a readily apparent visual indication of the status of the tether (e.g. properly installed or released).

In another embodiment, the water treatment system may include a tether and an electronics module that are configured so that the tether can be installed or removed only after the electronics module has been removed from the water treatment system. This helps to protect the electronics module from harm that may be caused by water because it encourages the user to move the electronics module before interacting with parts that might release water. For example, in one embodiment, the tether may be installed below the electronics module. In this embodiment, the tether may be fitted to the inlet and outlet in the manifold and have a relatively low profile so that it is generally covered by the electronics module. As another example, the tether may extend above the electronics module, but may include a tether housing that renders the underlying water connections inaccessible until the electronics module has first been removed. The tether housing may include with one or more features that are physically trapped below the electronics module so that the electronics module must be removed to gain access to the water connections.

The present invention provides a point-of-use water treatment system that is user-friendly and can be adapted for use in a wide variety of settings. The incorporation of water and power lines into a single tether makes it easy to connect and disconnect the system for maintenance and other purposes. Concealing the tether release button by the electronics module helps to ensure the electronics module is removed before the tether is disconnected. This can reduce the risk of exposing the electronics module to water. The replaceable cartridge can include soft ends caps that facilitate installation within the base and include an integral seal to help establish the desired flow path. The system may be configured to provide a reliable UV light indicator that is directly illuminated by light from the UV lamp. The electronics module may include a port that is capable of providing power and data to a plurality of interchangeable displays. For example, the electronics module may include a single display port that integrates power and data output. The pressure vessel may include a base and a manifold that are connected using a connector collar. The connector collar may have an integral handle that can be folded into a storage position. The manifold may include a seat capable of receiving the folded handle. The system may be configured so that the handle will only fold into the seat in the manifold when the connector collar has been properly installed. Once folded into the seat, the handle helps to lock the connector collar in position. The water treatment engine can be fitted with connectable shrouds as desired. For example, the water treatment engine may include top and bottom shrouds. The shroud configuration may vary to provide the desired aesthetics. The water treatment system may be combined with a wide range of auxiliary components that can provide supplemental treatment or other features. The system may include a collection of interchangeable base plates and wall panels that provide a variety of water and power line routing options.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 1A is a front perspective view of a water treatment engine in accordance with an embodiment of the present invention.

FIG. 1B is a rear perspective view of the water treatment engine.

FIG. 2A is a front perspective view of a water treatment system incorporating a water treatment engine contained within a shroud.

FIG. 2B is a rear perspective view of the water treatment system.

FIGS. 4A-4I are a plurality of views illustrating disassembly of the water treatment engine.

FIG. 6A is a perspective view of an electronics module and tether.

FIG. 6B is a partially exploded perspective view of the electronics module.

FIG. 7A is a perspective view of an alternative electronics module and tether.

FIG. 7B is a partially exploded perspective view of the alternative electronics module.

FIG. 10 is an exploded perspective view of the standard display.

FIGS. 19A-E are perspective views of alternative systems, including a water treatment system combined with different auxiliary components.

FIG. 20A-F are schematic representations showing water line routing through various alternative systems.

FIGS. 21A-E are rear perspective views of alternative systems.

DESCRIPTION OF THE CURRENT EMBODIMENT

I. Overview.

Figure 1C:
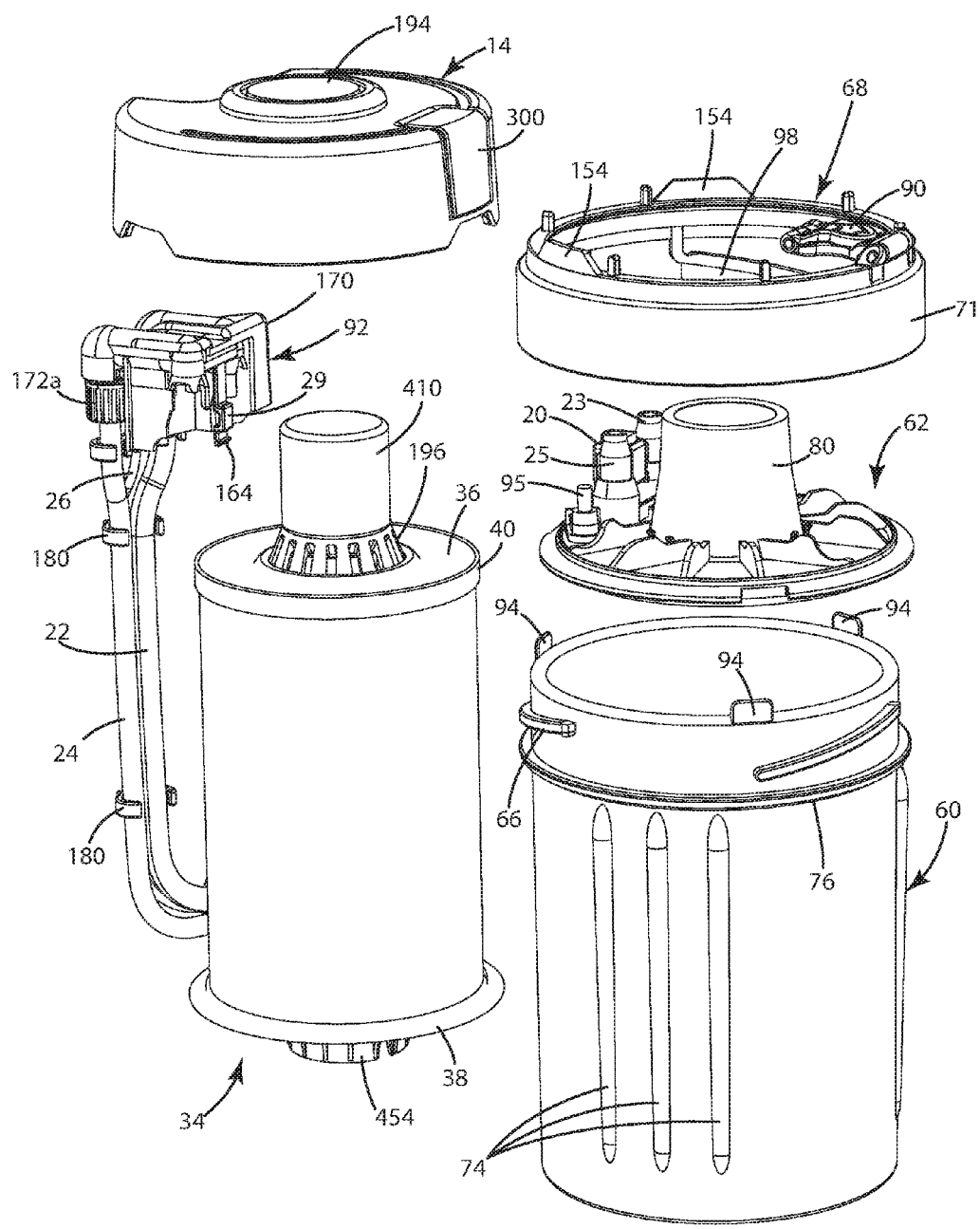
FIG. 1C is an exploded view of the water treatment engine.

A water treatment engine 10 in accordance with an embodiment of the present invention is shown in FIGS. 1A-1C. The water treatment engine 10 generally includes a pressure vessel 12 and an electronics module 14. The pressure vessel 12 of this embodiment contains a carbon block filter 16 and UV lamp 18. The pressure vessel 12 includes a single connection point 20 that allows connection and disconnection of the water supply line 22, water return line 24 and power supply line 26 in a single action. The connection point 20 may be positioned atop the pressure vessel 12 within the periphery of the pressure vessel 12. In the illustrated embodiment, the water treatment engine 10 includes a tether 92 that carries the water and power lines and is configured to be fitted onto the connection point 20. The tether 92 includes a locking mechanism to secure the tether 92 in place on the connection point 20. The locking mechanism includes a release 29. The electronics module 14 monitors and controls operation of the water treatment engine 10. The electronics module 14 may be positioned atop the pressure vessel 12 above the water line. The electronics module 14 may be configured to receive or communicate with any one of a plurality of displays 300, 320 and 320'. In the illustrated embodiment, the electronics module 14 may include a display port 252 that provides power and data for a range of alternative displays. In the illustrated embodiment, the tether release 29 that is inaccessible when the electronics module 14 is installed on the pressure vessel 12. This encourages removal of the electronics module 14 before removing the tether 92, which helps to prevent the electronics module 14 from being exposed to water. The pressure vessel 12 of this embodiment includes a base 60, a manifold 62 and a connector collar 68 that cooperatively house a replaceable cartridge 34. The replaceable cartridge 34 that includes the carbon block filter 16 and the UV lamp 18. The replaceable cartridge 34 may include "soft" end caps 36 and 38. The top end cap 36 includes an integral annular seal 40 that is compressed against the manifold 62 to help define the internal water flow path. The bottom end cap 38 is tapered to provide a self-centering interfit with the base 60.

Figure 2C:
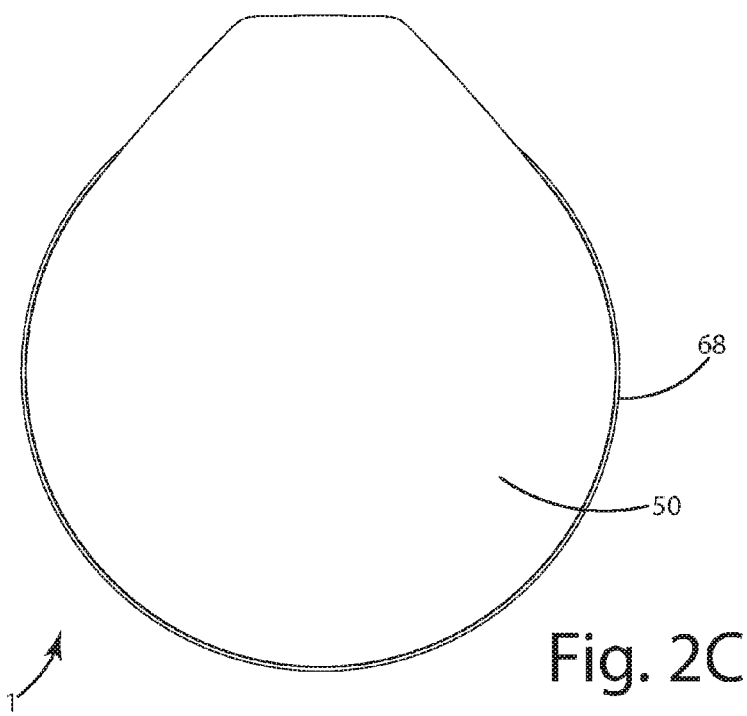
FIG. 2C is a top view of the water treatment system.

The water treatment engine 10 may be enclosed within a shroud assembly including a top shroud 50 and the bottom shroud 52 to form a fully assembled water treatment system 11 (See FIGS. 2A-2C). The shrouds 50 and 52 may be interchangeable to allow the water treatment system 11 to be customized for individual applications (See FIG. 3). For purposes of disclosure, FIGS. 2A-2C show the water treatment engine 10 contained in one of the shroud assemblies shown in FIG. 3. As perhaps best shown in FIG. 2C, the shrouds 50 and 52 of the illustrated embodiment are generally circular in profile when viewed from the top. However, the top shroud 50 of this embodiment also includes an extension to accommodate the water and power lines. The top extension may be contained within a boundary defined by two lines that are tangent to the top profile and intersect at about ninety degrees or more from one another. This, in effect, "squares the circle" of the top profile and allows the water treatment system 11 to be fitted nicely into a ninety degree corner as illustrated in FIG. 2C.

The water treatment system 11 may be configured so that it can be easily combined with a variety of auxiliary components that can be disposed upstream or downstream from the water treatment engine 10. For example, the water treatment system 11 may be combined with a supplemental water treatment device, such as auxiliary filter 500 (See FIG. 17). The auxiliary filter 500 may have a profile that, although smaller, generally corresponds with the profile of the water treatment system 11. The water treatment system 11 may additionally or alternatively be combined with a hot water dispenser 600 (See FIGS. 19D and 19E). The hot water dispenser 600 may have a top profile that complements the "squared-circle" profiles of the water treatment system 11 and the auxiliary filter 500.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

II. Water Treatment System.

A point-of-use water treatment system 11 in accordance with an embodiment of the present invention is shown in FIG. 1-12. The point-of-use water treatment system of this embodiment 11 generally includes a water treatment engine 10 that can be enclosed within an interchangeable shroud assembly, which as described in more detail below includes a top shroud 50 and a bottom shroud 52. The water treatment engine 10 generally includes a pressure vessel 12 and an electronics module 14. Generally speaking, the pressure vessel 12 contains the water treatment components of this embodiment and the electronics module 14 provides monitoring and control of the water treatment system 11. In this embodiment, the water treatment components include a carbon block filter 16 and a UV lamp 18. The water treatment components may, however, vary from application to application. In embodiments with different water treatment components, the pressure vessel 12 may be adapted as desired to accommodate the alternative water treatment components. For example, the size, shape and configuration of the pressure vessel may vary. In some alternative applications, the water treatment engine 10 may include a water treatment component that need not be fitted into the pressure vessel 12 or that might benefit from a separate pressure vessel. The water treatment engine 10 and pressure vessel 12 may be adapted for use in those types of alternative applications.

Figure 23:
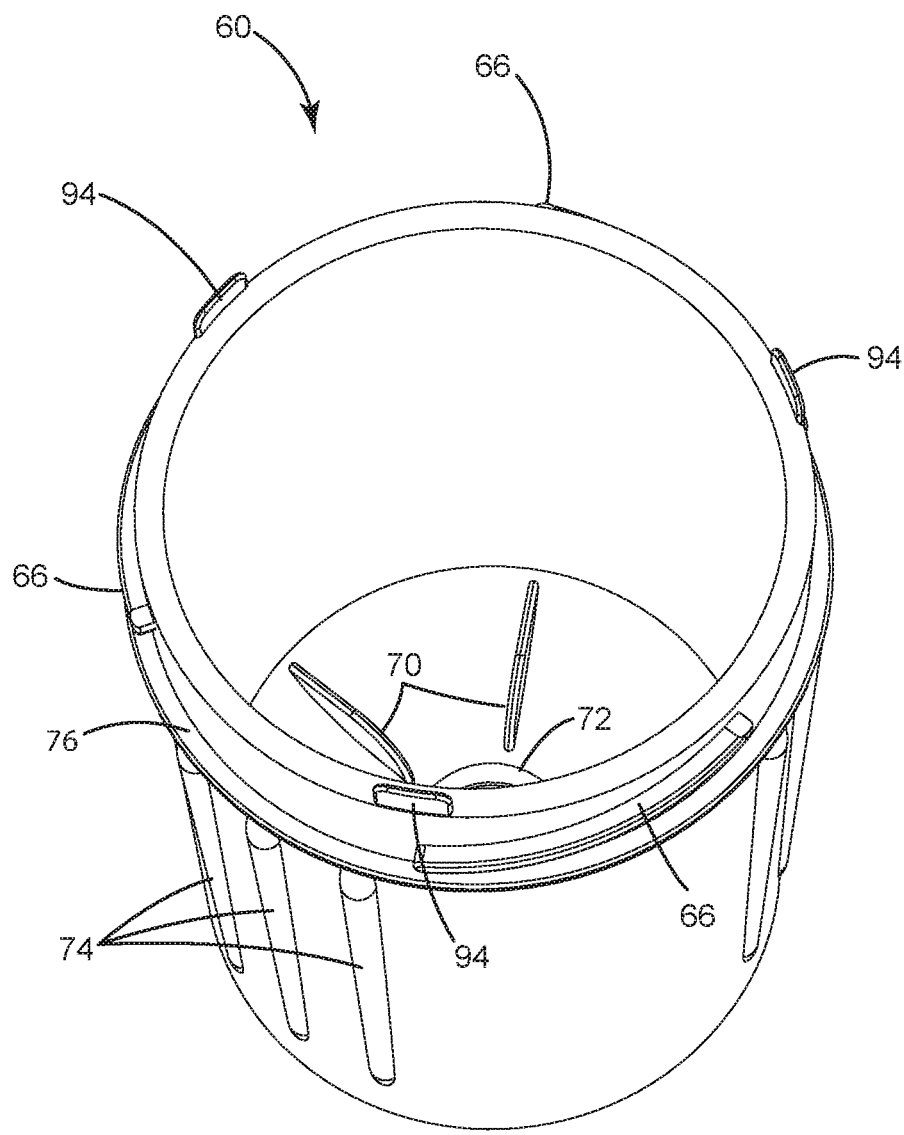
FIG. 23 is a perspective view of the base.

Referring now to FIG. 1C, the pressure vessel 12 of this embodiment generally includes a base 60, a manifold 62 and a connector collar 68 that cooperatively house a replaceable cartridge 34. In this embodiment, the base 60 is generally bucket-shaped defining a generally cylindrical void configured to closely receive the replaceable cartridge 34 (See FIG. 23). In this embodiment, the base 60 has a generally circular profile when viewed from the top, but the base 60 may vary from application to application, for example, to correspond with the size and shape of an alternative replaceable cartridge. The bottom interior of the base 60 may include structural features that are configured to interact with corresponding features on the bottom end of the replaceable cartridge 34 to help center and hold the replaceable cartridge 34 within the base 60. These structural features may vary from application to application; however, in the illustrated embodiment, the interior bottom of the base 60 includes a plurality of contoured radially-extending fins 70 and an annular hub 72 that interact with an annular sleeve 454 and tapered fins 456 on the bottom of the replaceable cartridge 34 (See FIGS. 4I and 5A). The illustrated features are merely exemplary, and the number, size, shape and configuration of the fins 70 and hub 72 and sleeve 454 and fins 456 may vary from application to application.

The base 60 may include additional features that allow the water treatment engine 10 to be fitted with interchangeable top and bottom shrouds 50 and 52, as well as structure for interconnecting the manifold 62 and the base 60. To help center the water treatment engine 10 within the bottom shroud 52, the base 60 may include an outwardly extending annular lip 76 that runs around the circumference of the base 60 and a plurality of outwardly protruding ribs 74 that extend vertically along the outer surface of the base 60. The number, size, shape and configuration of the annular lip 76 and the ribs 74 may vary from application to application. The annular lip 76 and/or ribs 74 may be eliminated when unnecessary or undesirable.

The base 60 may be configured to assist in providing proper alignment between the base 60 and the manifold 62. In the illustrated embodiment, the base 60 includes three radially symmetric keys 94 that extend upwardly from the top edge of the base 60. The keys 94 are configured to be received in corresponding recesses 96 in the manifold 62. In this embodiment, the keys 94 are configured to allow the manifold to be fitted onto the base in one of three alternative positions that will ensure that the handle 90 will align with one of the handle seats 88 when the connector collar 68 is fully seated as described in more detail below.

The base 60 may include interconnecting features that allow the manifold 62 to be secured to the base 60 by an intermediate connecting structure, such as connector collar 68 (described below). For example, in this embodiment, three one-third turn threads 66 are arranged at radially symmetric positions on the exterior surface of the base 60 just below the top edge. The external threads 66 on the base 60 are configured to interact with corresponding internal threads 98 on the interior surface of the connector collar 68. This arrangement of threads 66 and 98 allows the connector collar 68 to be secured on the base 60 in one of three alternative positions. The number, size, shape and configuration of the connecting structures may vary from application to application as desired. For example, the three external threads 66 may be replaced by a different number of threads, a bayonet fitting, a snap-lock closure, latches, fasteners or essentially any other structure capable of intersecuring or helping to intersecure the base 60 and the manifold 62.

Figure 24A:
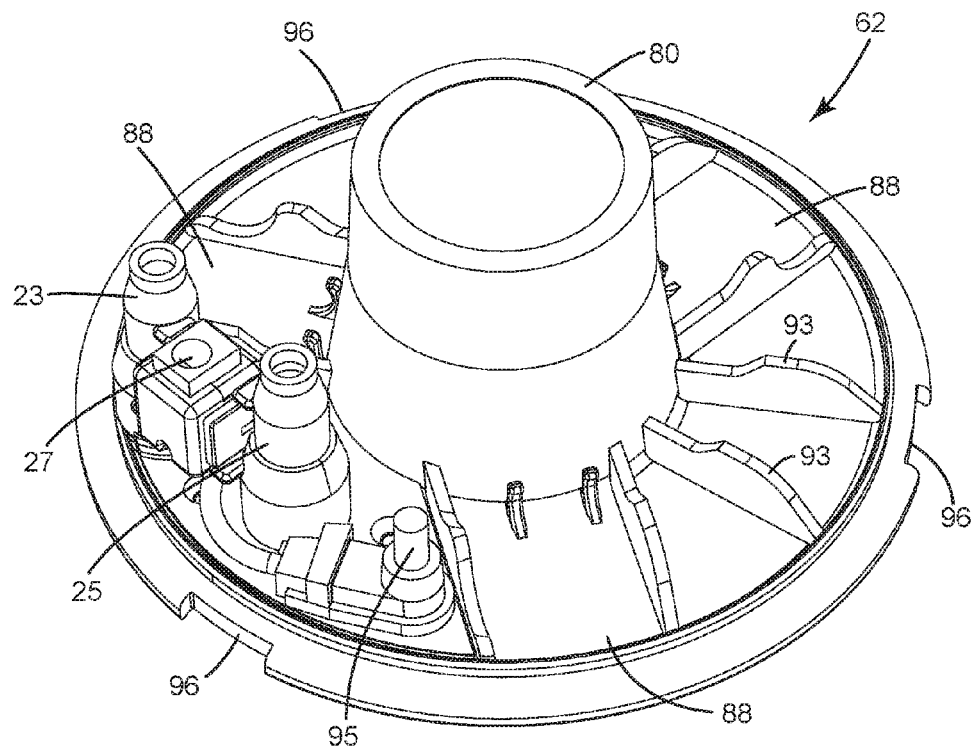
FIG. 24A is a top perspective view of the manifold.
Figure 24B:
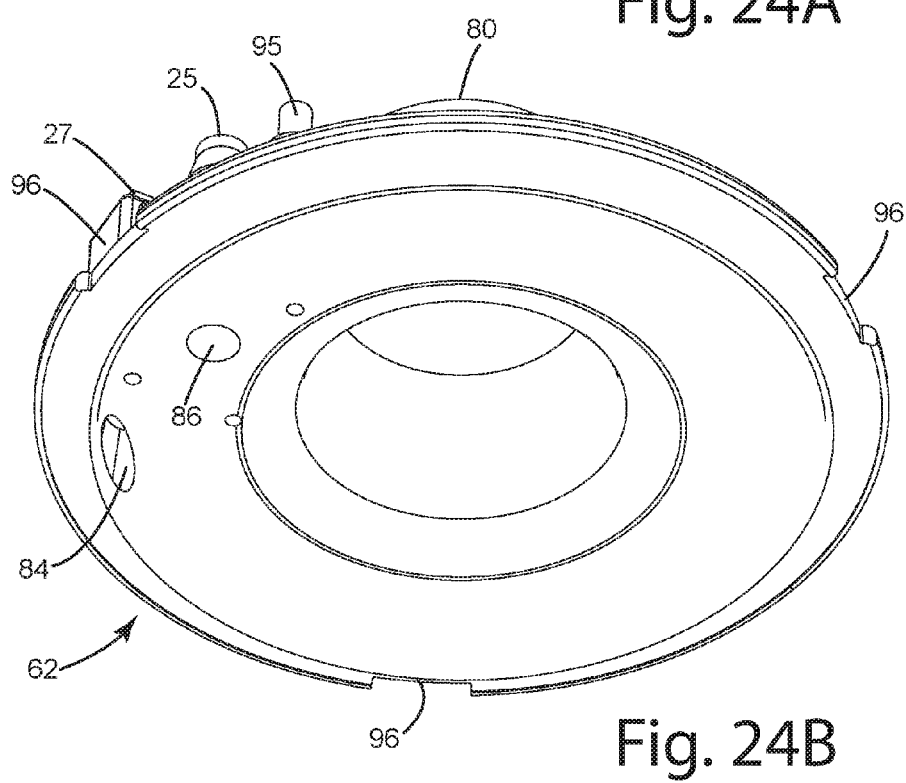
FIG. 24B is a bottom perspective view of the manifold.

The manifold 62 is generally circular and is configured to close the base 60 and to provide a single connection point 20 for attaching water and power to the water treatment engine 10 using a tether 92 that carries the water and power lines (See FIGS. 24A and 24B). The manifold 62 includes a generally disc shaped main body 78 having a central hub 80 that extends upwardly from the center of the main body 78 to accommodate the UV lamp 18 (as described in more detail below). In the illustrated embodiment, the hub 80 is transparent or translucent to visible light to allow visible light emitted by the UV lamp 18 to travel from the UV lamp 18 within the pressure vessel 12 to a UV light indicator 194 in the electronics module 14. The hub 80 may be manufactured separately from the remainder of the main body 78 or it may be manufactured as an integral portion of the main body 78 (in which case the main body 78 may be manufactured entirely from transparent or translucent material or the main body 78 and the hub 80 may be manufactured using insert-molding or a two-shot molding process). The manifold 62 may include a perimeter seal 63 configured to engage the top edge of the base 60 (See FIG. 5A). In use, the perimeter seal 63 may provide a leaktight seal between the manifold 62 and the base 60. Alternatively (or additionally), a perimeter seal (not shown) may be provided on the top edge of the base 60.

As described in more detail below, the connector collar 68 includes a handle 90 that is capable of being folded into a storage position atop the manifold 62. The top surface of the manifold 62 of this embodiment includes three radially symmetric handle seats 88 that are configured to receive the folded handle 90. The handle seats 88 are positioned to receive the handle 90 only when the connector collar 68 is properly seated. The manifold 62 may include additional support ribs 93 that help to strengthen the manifold.

As noted above, the manifold 62 includes a single connection point 20 that allows simultaneous connection of the water and power lines to the water treatment engine 10. In the illustrated embodiment, the connection point 20 is situated atop the main body 78 and generally includes a water inlet 23, a water outlet 25 and a power connector 27. The water inlet 23 is in fluid communication with an inlet flow path 84 that extends vertically through the main body 78. To accommodate the flow paths within the pressure vessel 12, the bottom end of the inlet flow path 84 may be oblong in an annular direction to provide the flow path with adequate cross-section area, while staying within the confines of the annular seal 40 (described below). The water outlet 25 may be position radially inward from the water inlet 22. The water outlet 25 is in fluid communication with an outlet flow path 86 that extends vertically through the main body 78. The power connector 27 is configured to receive power from a connector on the tether 92 and to convey that power along a conductor to an electronics module power connector 95 (See FIG. 4C). The electronics module power connector 95 is position so that it automatically makes an electrical connection with a power connection port 250 in the electronics module 14 when the electronics module 14 is properly seated on the pressure vessel 12. The connection point 20 may also include a catch for locking the tether 92 into place on the connection point 20. For example, a recess 162 (See FIG. 5A) may be defined in the connection point 20 to receive a locking finger 164 incorporated into the tether 92. The locking finger 164 may automatically engage with the recess 162 when the tether 92 is fully seated on the connection point 20, and may be disengaged by the operator through the use of a release button 29 on the tether 92 (described below).

Figure 26A:
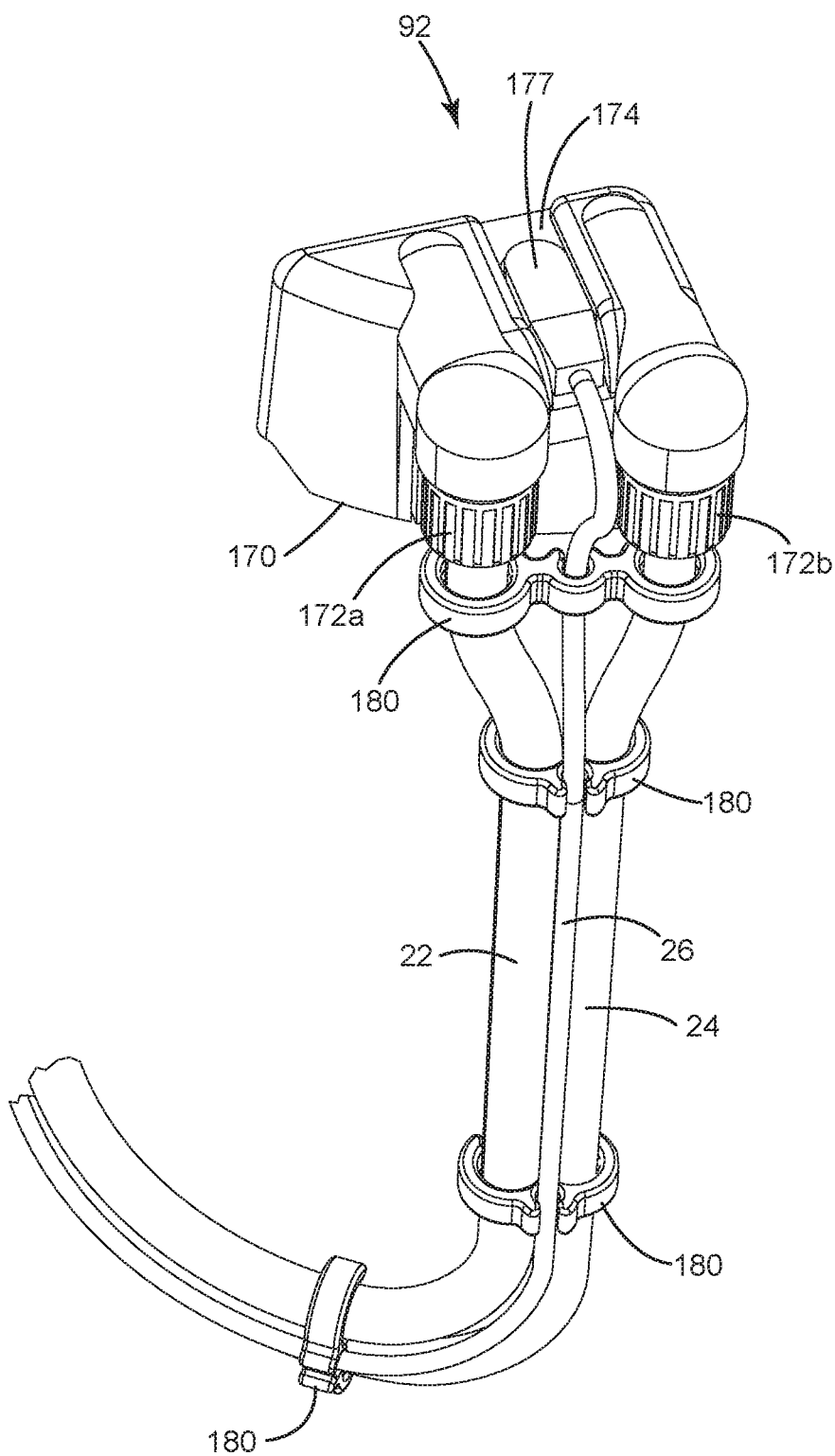
FIG. 26A is a top perspective view of the tether.
Figure 26B:
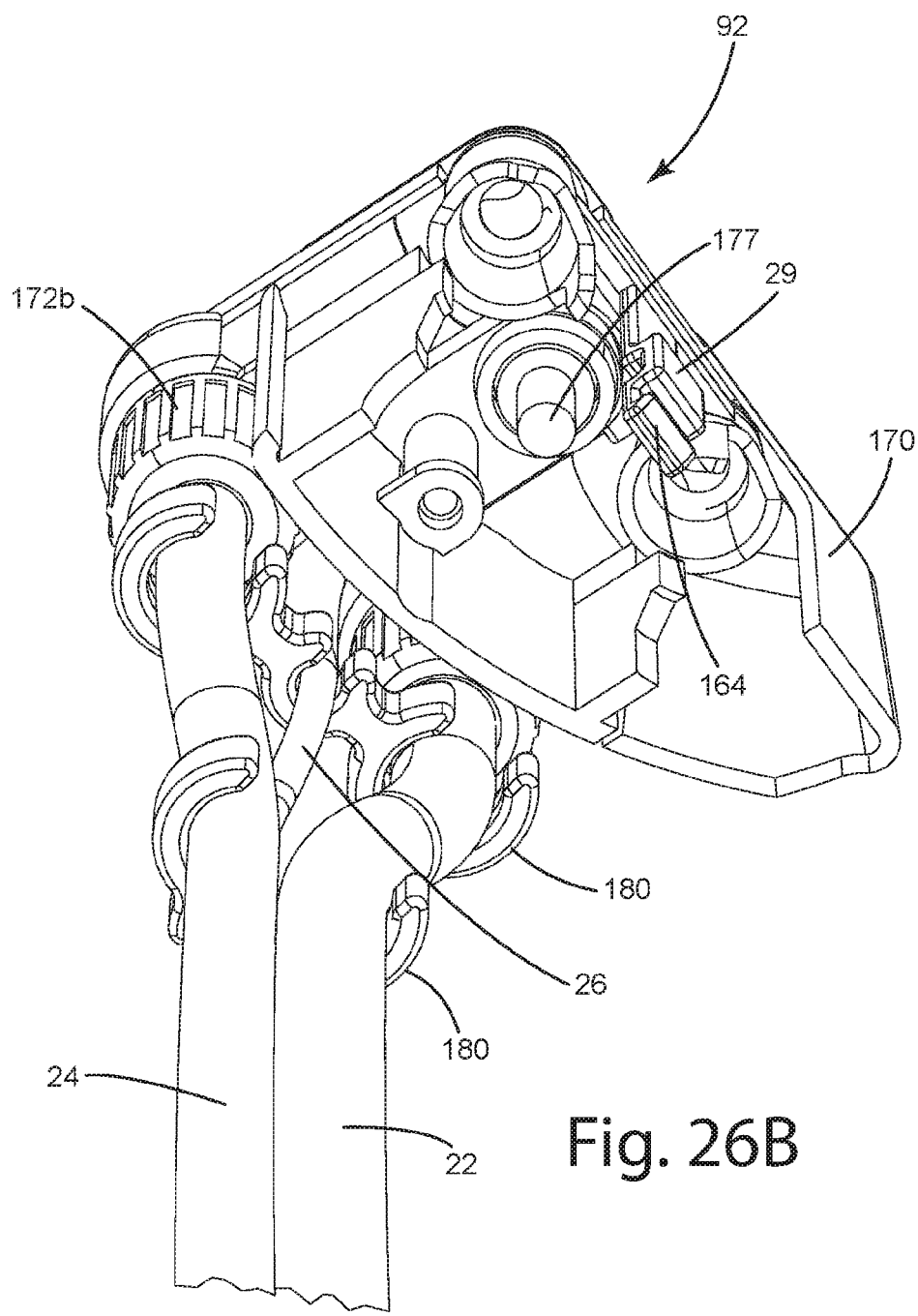
FIG. 26B is a bottom perspective view of the tether.

Referring now to FIG. 1B, the tether 92 is joined with water lines 22, 24 and power line 26, and is configured to be easily connected to and removed from the connection point 20 on the water treatment engine 10. The tether 92 generally includes a main body 170 that is adapted to physically and mechanically interfit with the connection point 20. The main body 170 generally includes an inlet water connection 172a, an outlet water connection 172b and a power connector seat 174 (See FIGS. 26A and 26B). In this embodiment, the water connections 172a-b have a somewhat inverted U-shape that allows the water lines and power cord to run up the back of the water treatment system 11, which can help to minimize the footprint of the water treatment engine 10. This shape also allows the tether 92 to be fitted onto the connection point 20 in a downward motion. In the illustrated embodiment, one end of inlet water connection 172a is coupled to the untreated water supply line 22, for example, using a standard compression fitting, and the other end is configured to be fitted over the water inlet 23. Similarly, one end of outlet water connection 172b is coupled to the treated water return line 24, for example, using a standard compression fitting, and the other end is configured to be fitted over the water outlet 25. The water connection 172a-b may be essentially any type of water fitting that is capable of providing a leaktight connection when pushed down onto the water inlet 23 and the water outlet 25. The power connector seat 174 may be situated between the water connections 172a-b, and may be configured to receive the plug end 177 of the power cord 26. For example, the shape of the seat 174 may be configured to correspond with the shape of the plug end 177 so that the plug end 177 is held in the seat 174 by an interference fit or a snap-lock. The plug end 177 may alternatively be secured to the tether 92 using essentially other suitable technique, such as fasteners. As noted above, the tether 92 may include a locking mechanism that secures the tether 92 on the connection point 20. The locking mechanism may include a locking finger 164 that is configured to selectively interlock with recess 162 to secure the tether 92 to the connection point 20. The locking mechanism may also include a release button 29 that can be manually actuated to disengage the finger 164 from the recess 162. The release button 29 may be situated on the tether 92 in a location where it is inaccessible when the electronics module 14 is seated on the top of the pressure vessel 12. As noted above, this helps to protect the electronics module 14 from water by ensuring that the electronics module 14 is removed from the pressure vessel 12 before the tether 92 is disconnected, as disconnection may allow a small amount of water to spill from the pressure vessel 12, the tether 92 and/or the water lines 22 and 24. Referring now to FIG. 1C, the water lines 22, 24 and electrical power cord 26 may be joined together by a plurality of clips 180 that help to keep the water lines and power cord together, prevent tangling and promote a neat and tidy appearance. The number, size, shape and configuration of clips 180 may vary from application to application. The clips may be eliminated or replaced by other structure intended to manage the water lines and power cord.

Figure 25:
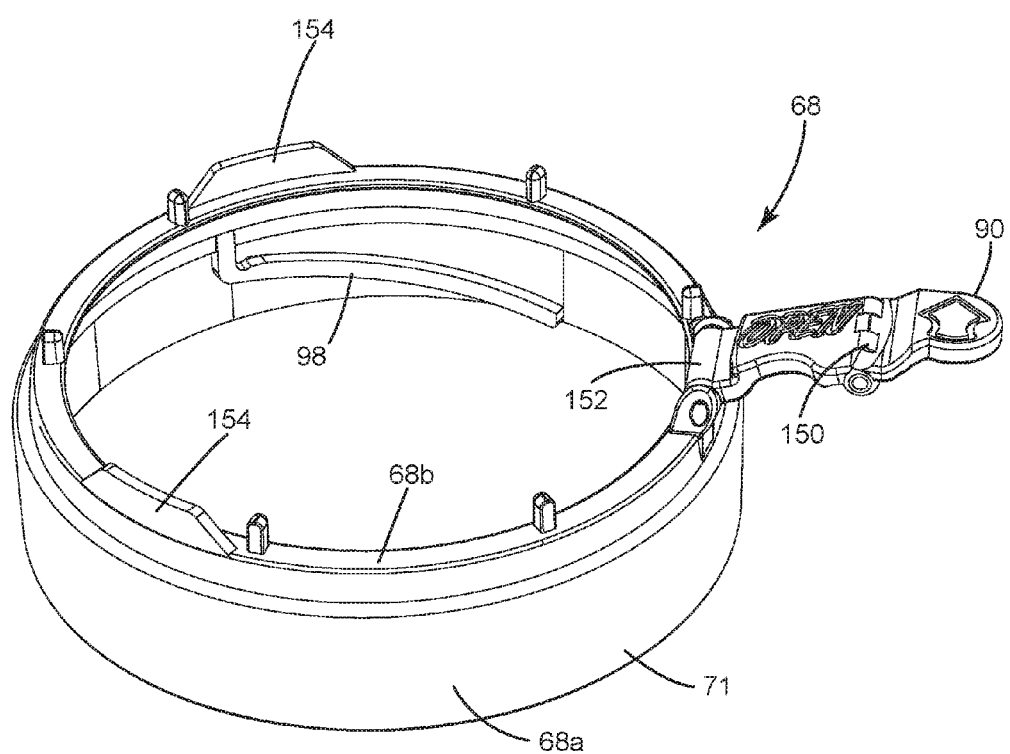
FIG. 25 is a perspective view of the connector collar.

In the illustrated embodiment, the manifold 62 is secured to the base 60 by a connector collar 68 (as described in more detail below). In this embodiment, the connector collar 68 not only interconnects the base 60 and manifold 62, but also forms an annular band 71 that extends about the periphery of the water treatment engine 10 to engage with the top shroud 50 and bottom shroud 52. Referring now to FIG. 1C, the connector collar 68 of the illustrated embodiment is an annular structure that has generally inverted L-shape when view in cross-section (See FIG. 25). More specifically, the connector collar 68 generally includes a vertical wall 68a and a horizontal flange 68b. The vertical wall 68a is configured to fit about the upper end of the base 60 and includes internal threads 98 that are configured to threadedly interact with the external threads 66 on the base 60. The horizontal flange 68b extends inwardly from the top edge of the vertical wall 68a and is configured to engage the upper surface of the manifold 62 around its perimeter. The band 71 is defined by the outer surface of the connector collar 68 and may be configured to rest on the top edge of the bottom shroud 52 and to receive the bottom edge of the top shroud 50. The size, shape and configuration of the band 71 may vary from application to application as desired. In some applications, the band 71 may be eliminated and the top and bottom shrouds 50 and 52 may directly engage one another or some other intermediate structure. In the illustrated embodiment, the band 71 is exposed even when the water treatment engine 10 is fitted within top and bottom shrouds 50 and 52. This allows the aesthetic appearance of the water treatment system 11 to be changed simply by replacing the connector collar 68 with an alternative connector collar having a different appearance. For example, in an environment that features stainless steel components, the connector collar 68 (or the band 71) can be manufactured from stainless steel or have the appearance of stainless steel, while in an environment that features white components, the connector collar 68 (or the band 71) can be white.

In the illustrated embodiment, the connector collar 68 includes a handle 90 that can be used to provide a mechanical advantage when tightening and loosening the connector collar 68. Referring now to FIGS. 4B-4F, the handle 90 may be configured to fold into a space above the manifold 62 when not in use. The handle 90 may also be configured to fold in half to reduce its footprint when folded onto the manifold 62. More specifically, the handle 90 may be capable of folding in half about an intermediate hinge 150 and folding into a handle seat 88 about primary hinge 152. A spring or other biasing component (not shown) may be incorporated into the handle 90 to facilitate user access by urging the handle 90 into an at least partially unfolded position. Although not shown, the spring may be a coil spring position on or adjacent to one of the halves of the handle 90 or it may be incorporate into a hinge 150 or 152.

The top of the connector collar 68 may be configured to facilitate proper alignment between the pressure vessel 12 and the electronics module 14. For example, in the illustrated embodiment, the connector collar 68 include a plurality of keys 154 that extend upwardly from the connector collar 68 and are configured to interfit with corresponding recesses 156 in the bottom of the electronics module 14 (See FIGS. 4E and 4F). In this embodiment, the primary hinge 152 of the handle 90 also forms a key. The number, size, shape and configuration of the keys 154 and recesses 156 may vary from application to application.

As noted above, the water treatment engine 10 includes an electronics module 14 that monitors and controls operation of the water treatment engine 10. In the illustrated embodiment, the electronics module 14 is positioned atop the pressure vessel 12 above the water level within the pressure vessel 12. The electronics module 14 includes a power connection port 250 (FIG. 4B) that is configured to automatically connect to the power connector 95 on the manifold 62 when the electronics module 14 is lowered into place on the manifold 62. The electronics module 14 of the illustrated embodiment generally includes control circuitry (not shown) contained on printed circuit board 182 and an inductive primary 184 for wirelessly transferring power to the replaceable cartridge 34. These components are contained within a housing assembly including a top housing 186 and a bottom housing 188. In the illustrated embodiment, the top housing 186 and bottom housing 188 are joined together in a manner that creates a leaktight seal to reduce the risk of water reaching the control circuitry. In the illustrated embodiment, the electronics module 14 includes a UV lamp indicator 194 that is illuminated when the UV lamp 18 is operating. The UV lamp indicator 194 of this embodiment is disposed on the top surface of the electronics module 14 and is directly illuminated by light emitted by the UV lamp 18. For example, the UV lamp indicator 194 of this embodiment is translucent and glows when in the presence of direct illumination from the UV lamp 18. As perhaps best shown in FIG. 4A, the lamp indicator 194 may be in the form of a logo or present some other graphic image or element. To facilitate this function, the replaceable cartridge 34, manifold 62 and electronics module 14 are configured to cooperatively define a light flow path that allows some light emitted by the UV lamp 18 to pass out of the replaceable cartridge 34 and through the electronics module 14 to the undersurface of the UV lamp indicator 194. As described in more detail below, the replaceable cartridge 34 of this embodiment includes a collar 196 that is transparent or translucent to visible light to allow visible light emitted by the UV lamp 18 to pass out of the replaceable cartridge 34 to the manifold 62. Similarly, the hub 80 of manifold 62 is manufactured from a transparent or translucent material to visible light that allows visible light to pass from beneath the manifold 62 to the electronics module 14 and to the UV lamp indicator 194. The bottom housing 188 of this embodiment is manufactured from transparent or translucent material that allows visible light emitted by the UV lamp 18 to pass from the manifold 62 to the UV lamp indicator 194. In this embodiment, the bottom housing 188 may include a plurality of facets 198 configured to help direct light to travel through the transom parent material of the bottom housing 188 to the UV lamp indicator 194. A typical UV lamp emits not only UV light, but also some visible light. The light flow path allows visible light emitted by the UV lamp 18 to illuminate the UV lamp indicator 194. In applications in which the UV lamp 18 does not emit sufficient visible light to illuminate the UV lamp indicator 194, the system may include a florescent material or other material capable of converting at least some UV light to visible light. As another alternative, the electronics module 14 may include a UV light sensor (not shown) and may illuminate an LED or other indicator when the sensor indicates that UV lamp 18 is emitting adequate UV light.

The control circuitry may be used to monitor operation of the water treatment engine 10, for example, collecting data concerning operation from one or more sensors situated in the water treatment engine 10. In the illustrated embodiment, the water treatment system may include a water flow meter 31 that is situated in the water outlet 25 (See FIG. 5A) in a position adjacent to the electronics module 14 so that the water flow meter can be monitored wirelessly by the control circuitry. For example, a water flow meter having a turbine with an embedded magnet can be disposed within the water input line or the water output line to spin in proportion to the volume of water flowing through the line. The control circuitry may include a Hall-effect sensor or other magnetic field sensor that is capable of determining the rate of rotation of the turbine based on the variations in magnetic field created by the spinning magnet. The control circuitry may be programmed to determine water flow rate based on the rate of rotation of the turbine. A variety of water flow meters incorporating an embedded magnet are commercially available from a number of known suppliers. This information may be used by the control circuitry to maintain use/life data relating to the filter and the UV lamp, which can be used to determine when the useful life of the replaceable cartridge 34 has been reached. The control circuitry may be configured to interact with other types of sensors that provide information that might be relevant to operation of the water treatment engine, such as a water quality sensor, a water pressure sensor, a water temperature sensor, an electrical load sensor, a leak detection sensor and a clock for making time-based determinations. Although the water flow meter of the illustrated embodiment is disposed in the water outlet 25 of the manifold 62, the water flow meter may alternatively be positioned in essentially any other location along the water flow path, such as in the tether 92 or in the water inlet 22 of the manifold 62.

Although not shown, the control circuitry may include an RFID system, including an RFID transceiver capable of communicating with an RFID chip contained in the replaceable cartridge 34. In use, the control circuitry may be capable of reading from and writing to the RFID chip in the replaceable cartridge 34. The RFID system may allow the control circuitry to uniquely identifying each replaceable cartridge 34 based on a unique identifier stored in the RFID chip of the replaceable cartridge 34. The RFID system may be capable of tracking data concerning the replaceable cartridge 34 and storing that information the RFID chip contained in the replaceable cartridge 34. For example, the RFID system may be used to store information concerning the hours and manner of operation of the replaceable cartridge 34. This information may be used to warn the operator when the replaceable cartridge 34 is nearing the end of its life. For example, a filter life warning indicator may be illuminated in display 300 (discussed below). Further, feedback from the RFID system may be used by the control circuitry to disable the water treatment engine 10 or to take other remedial action should the life of the replaceable cartridge 34 ever expire completely. RFID systems, including RFID transceivers and RFID chips, are commercially available from a variety of suppliers.

Figure 4C:
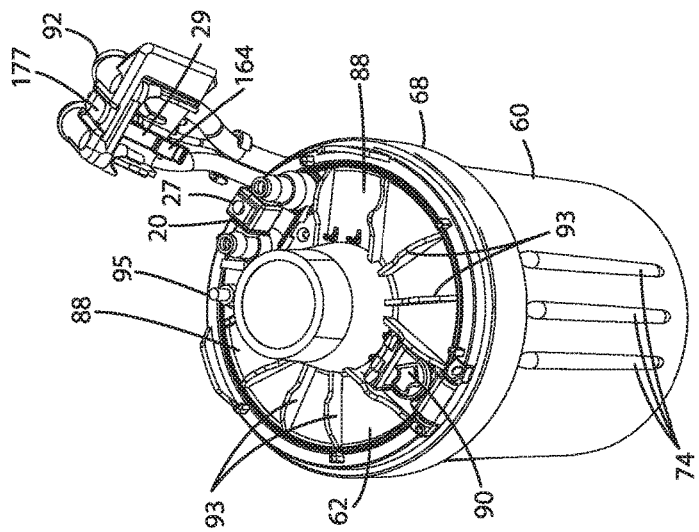
Figure 4B:
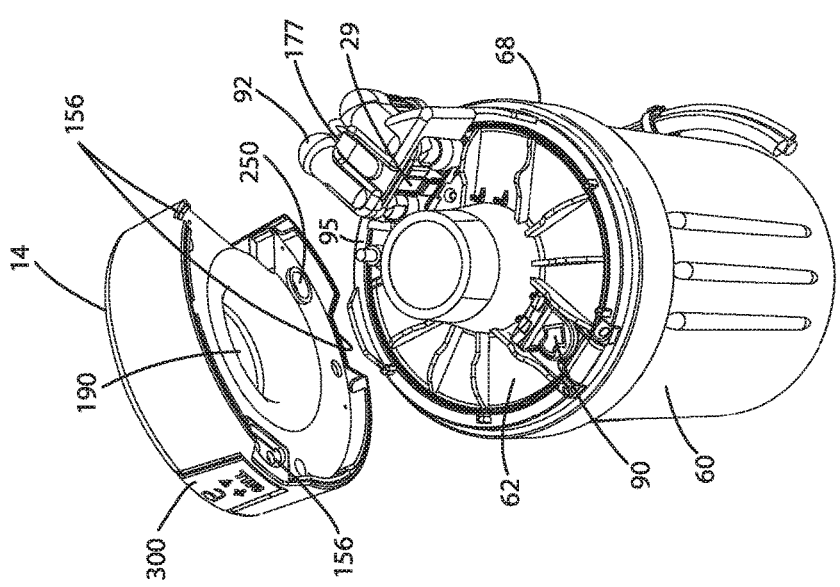
Figure 5A:
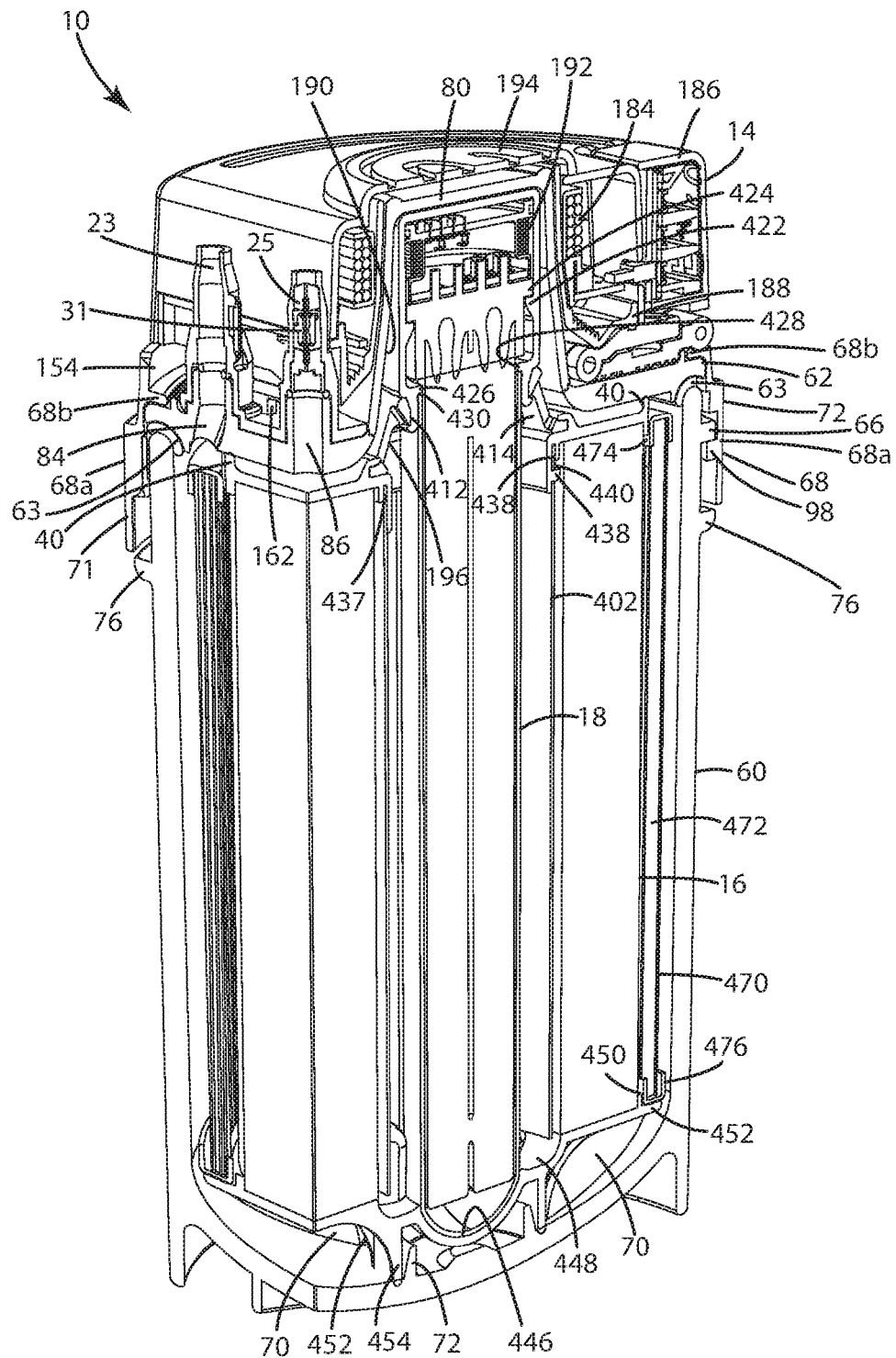
FIG. 5A is a sectional perspective view of the water treatment engine.

As noted above, the electronics module 14 includes an inductive primary 184 that is configured to wirelessly provide power to the replaceable cartridge 34. In this embodiment, the replaceable cartridge 34 includes a UV lamp 18 that requires electrical power for operation. As result, the control circuitry and the inductive primary 184 are configured to provide an amount of power appropriate for the UV lamp 18. In alternative embodiments, the replaceable cartridge 34 may include additional or alternative water treatment components that require electrical power. In such alternative embodiments, the control circuitry and inductive primary 184 may be configured to provide an appropriate amount of power. Referring now to FIGS. 4B and 5A, the electronics module 14 is somewhat ring-shaped having a circular opening 190 configured to fit closely over the central hub 80 of manifold 62. The inductive primary 184 may be wrapped about the wall defining the circular opening 190. As perhaps best shown in FIG. 5, replaceable cartridge 34 may include an inductive secondary 192 disposed in the central hub 80 in close proximity to the inductive primary 184.

In the illustrated embodiment, the electronics module 14 is capable of receiving one of a variety of alternative displays. To facilitate the use of alternative displays, the electronics module 14 includes a single display port 252 that provides data and power output for the alternative displays. For example, the display port 252 may include a communication channel over which the electronics module 14 transmits data that might be useful to one or more of the interchangeable displays. For example, the data may include power status, UV lamp status, UV lamp intensity, replaceable filter presence, replaceable filter life consumed, replaceable filter life remaining, water flow status, water flow rate, water temperature, water quality and essentially any other data that might be relevant to operation or otherwise of interest to a user. The electronics module 14 may use a conventional communication protocol or may use a custom protocol, as desired. In the illustrate embodiment, display data is communicated to the display over a communication channel, and the display is configured to utilize only the data that is appropriate for that display. As an alternative, different data can be provided at different pins in the display port. With this type of alternative embodiment, the display can be configured to ignore data on those pins that are not relevant to operation of that display. Although the electronics module 14 of the illustrated embodiment is configured to transmit data to the display, it may in alternative embodiments also be able to receive data from the display. For example, the display may include user input buttons or sensors and the operation of a button on the display or the output of a sensor may be communicated back to the electronics module 14 via the display port 252. The alternative displays may be configured to operate with the same amount of power. Each alternative display is configured to connect to the display port 252 and to utilize the provided power and data to perform its display function. Those displays that do not require all of the data can simply ignore the unnecessary data. Display port 252 may also be used for communication for service or product support. For example, a service technician could use the data to diagnose the state of the system. Additionally or alternatively, the electronics module 14 may be configured to interact wirelessly with a remote display, such as remote expanded display 320' described below, or with a separate electronic device running an application capable of interacting with the electronics module 14. For example, the separate electronic device may be a smart phone, a tablet computer, a laptop computer or other electronic computing device running a software application configured to interact with the electronics module 14 using wireless communication capabilities (e.g. Bluetooth, WiFi or NFC communications).

Figure 8A:
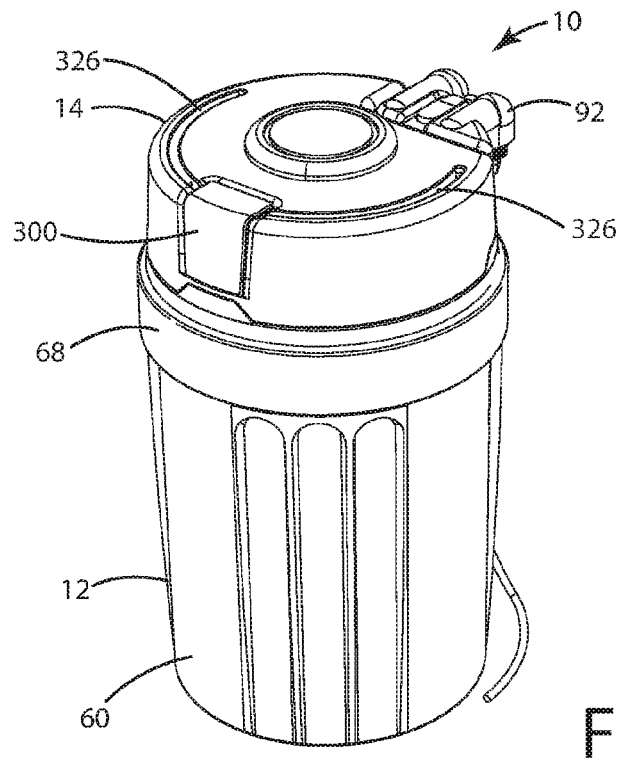
FIG. 8A is a perspective view of the water treatment engine incorporating standard display.
Figure 8B:
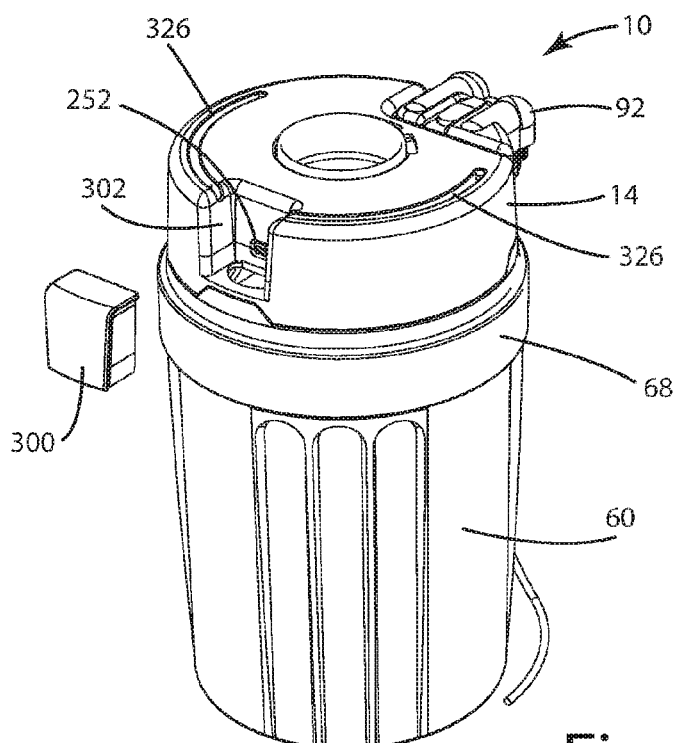
FIG. 8B is a perspective partially-exploded view of the water treatment engine with the standard display removed.

For purposes of disclosure, three alternative displays are described with reference to FIGS. 8A-12B. Referring now to FIGS. 8A and 8B, the electronics module 14 may be fitted with a basic display 300 that provides a limited feature set. The basic display 300 may be fitted into a recess 302 in the electronics module and may be plugged directly into the display port 252. In this embodiment, the display 300 corresponds in size and shape with the recess in the electronics module 14. As shown in FIG. 10, the basic display 300 may include a rear cover 310, a circuit board 304, a light guide 306, a screen 312 and a front cover 311. The circuit board 304 generally includes an input plug 307, a controller (not shown) and a plurality of LEDs 308*a*-*c*. The input plug 307 is configured to be fitted into display port 252. The controller may be programmed to illuminate LED 308*a* when the water treatment engine 10 is plugged in and powered on, to illuminated LED 308*b* when water is flowing through the water treatment engine 10 and to illuminate LED 308*c* when service is required, for example, when it is necessary to replace the replaceable cartridge 34 or when there is some other fault condition within the system. The light guide 306 defines three light flow paths that convey light from the LEDs 308*a*-*c* to the screen 312. Each LED 308*a*-*c* may be configured to illuminate graphic images on the screen 312. For example, LED 308*a* may illuminate an icon 314*a* or graphic image intended to indicate that the system is powered on, LED 308*b* may illuminate a pair of icons 314*b* or graphic images intended to symbolize the flow of water and the presence of UV light within the system and LED 308*c* may illuminate an icon 314*c* or graphic image intended to advise the user that maintenance is required. The front cover 311 may cover the screen 312 and may be transparent or translucent so that the graphic images on the screen 312 are visible when illuminated by the underlying LEDs 308*a*-*c*. In this embodiment, the UV light indicator 194 may be a disk-shaped component that is placed over the central opening 190 of the electronics module 14. The UV light indicator 194 may be transparent or translucent to visible light and may include an icon or graphic image that is illuminated by visible light emitted by the UV lamp 18.

Figure 9A:
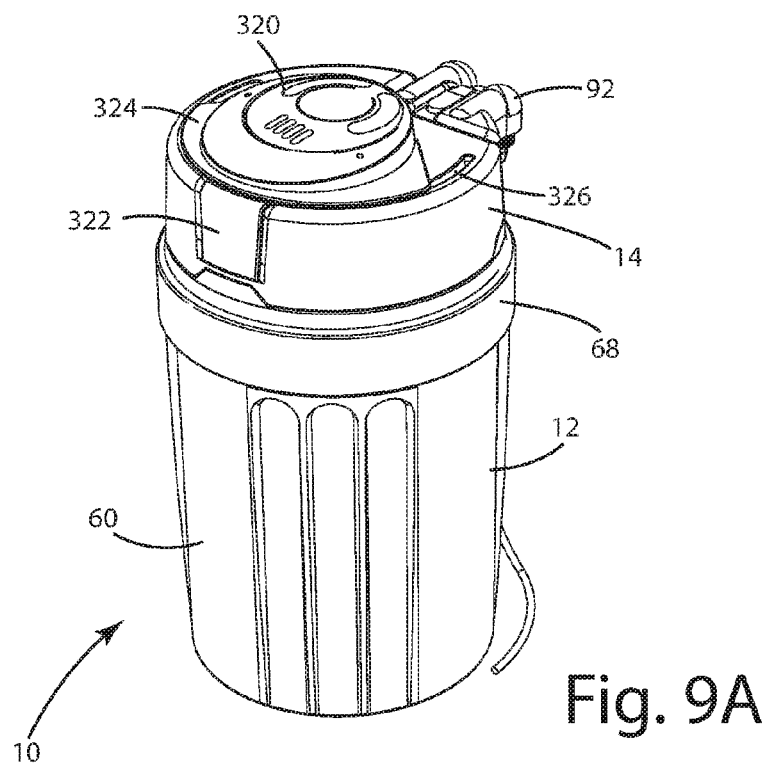
FIG. 9A is a perspective view of the water treatment engine incorporating a first alternative display.
Figure 9B:
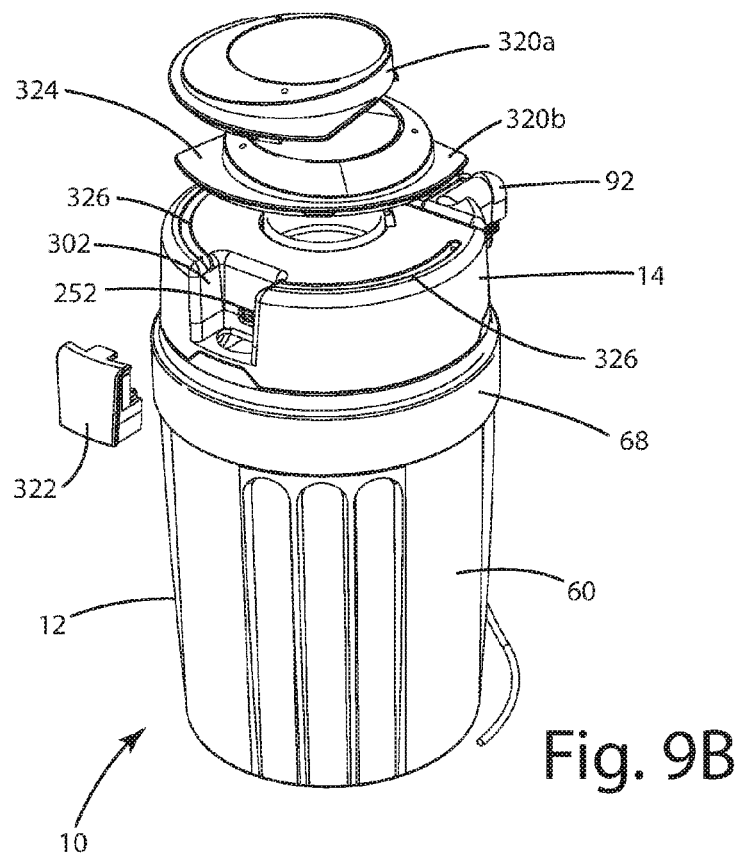
FIG. 9B is a perspective partially-exploded view of the water treatment engine with the first alternative display removed.
Figure 11A:
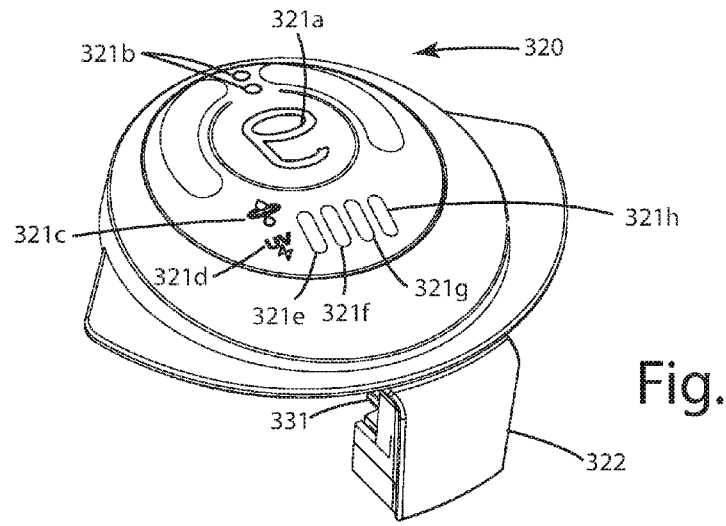
FIG. 11A is a perspective view of the first alternative display.
Figure 11B:
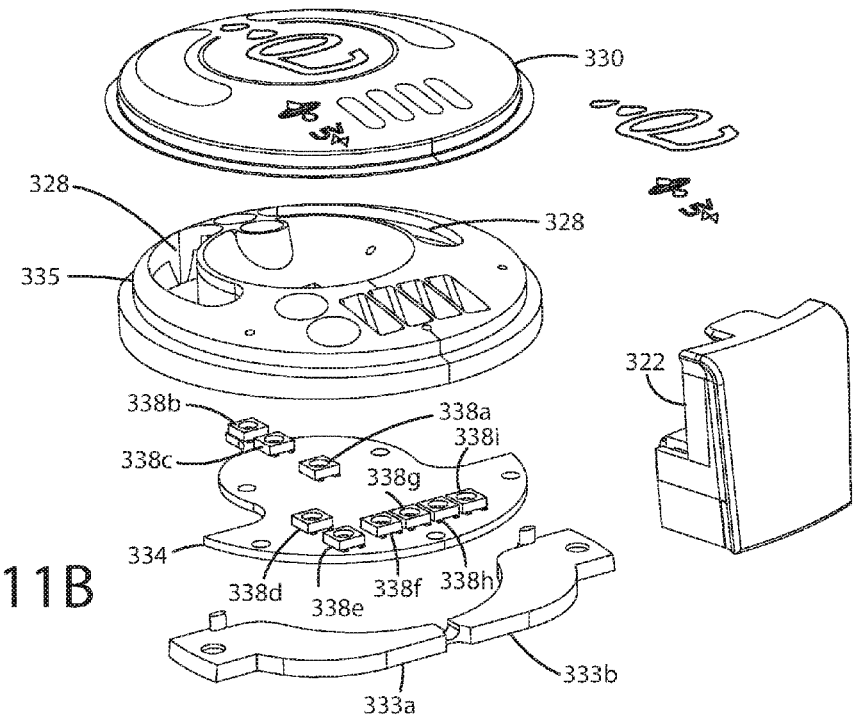
FIG. 11B is an exploded perspective view of the first alternative display.

An expanded display 320 is shown in FIGS. 9A-B and 11A-B. The expanded display 320 is configured to provide more information than is available with basic display 300. In this embodiment, the expanded display 320 is mounted atop the electronics module 14 and is electrically connected to the electronics module by a connector module 322 that is seated in recess 302. The connector module 322 of this embodiment is substantially the same size and shape as basic display 300, and therefore substantially fills recess 302. The connector module 322 includes an input plug 331 configured to be fitted into display port 252. Although not shown, the connector module 322 is electrically connected to the expanded display 320 by wires. Expanded display 320 generally includes bottom members 333*a*-*b*, circuit board 334, a light guide 335, a top cover 336 and a screen 330 (See FIGS. 9A and 11B). In this embodiment, the circuit board 334 generally includes a controller (not shown) and a plurality of LEDs 338*a*-*i*. The controller is configured to illuminate the LEDs 338*a*-*i* as appropriate to provide information to the user. The screen 330 includes graphic images that are illuminated by the underlying LEDs 338*a*-*i* (See FIGS. 9A and 11B). In this embodiment, LED 338*a* is illuminated to indicate that the water treatment engine 10 is plugged in and receiving power. This LED 338*a* may illuminate a graphic image 321*a* on the screen 330 in the form of a logo or other image intended to indicate that the system is "on". LEDs 338*b*-*c* are alternately illuminated when water is flowing through the system. These LEDs 338*b*-*c* may illuminate graphic images 321*b* on the screen 330 in the form of drops of water. In use, the alternating illumination of these graphic images may communicate that water is flowing by giving the appearance of a moving drop of water. Similarly, LED 338*d* is illuminated when water is flowing through the water treatment engine 10. LED 338*d* may illuminate a graphic image 321*c* on the screen 330 selected to represent water. LED 338*e* is illuminated when the UV lamp 18 is operating properly. LED 338*e* may illuminate a graphic image 321*d* on the screen selected to represent a UV lamp or UV light. LED 338*d* may flash when the UV lamp is operating properly. LEDs 338*f*-*i* may be illuminated to present a visual representation of the remaining life of the replaceable cartridge 34, with each LED illuminate a graphic image 321*e*-*h* representing one quarter of the life of the replaceable cartridge 34. For example, all four LEDs 338*f*-*i* may be illuminated when the replaceable cartridge 34 life is between 100% and 75%, three LEDs 338*f*-*h* may be illuminated when the replaceable cartridge 34 life is between 74% and 50%, two LEDs 338*f*-*g* may be illuminated when the replaceable cartridge 34 life is between 49% and 25%, one LED 338*f* may be illuminated when the replaceable cartridge 34 life is between 24% and 1% and finally all of the LEDs may be turned off when the replaceable cartridge 34 life is fully expired. As an alternative, the LEDs can also change color as filter life decreases. For example, the LEDs may illuminate blue when filter life is between 100% and 51%, yellow when filter life is between 50% and 10% and red when filter life is below 10%. In this embodiment, UV light indicator 194 is integrated directly into the expanded display 320. To facilitate illumination of the UV light indicator 194, a pair of arc-shaped openings 328 may be formed through the expanded display 320 to illuminate portions of screen 330 (See FIG. 11B). To facilitate customization, the expanded display 320 is mounted to the electronics module 14 in such a way that it is capable of rotation relative to the electronics module 14 through a range of motion. More specifically, the expanded display 320 is rotatably mounted over the center of the electronics module 14 and includes an eccentric skirt 324 that is slidably engaged with channels 326 in the top of the electronics module 14. For example, one or more fingers (not shown) may extend down from the skirt 324 to interfit with the channels 326. To illustrate this functionality, FIG. 9B shows the display 320 in two alternative orientations. More specifically, display 320*a* is shown in the clockwise-most position with respect to channels 326 and display 320*b* is shown in the counterclockwise-most position with respect to channels 326. Displays 320*a* and 320*b* illustrate opposite extremes in the range of motion of the display 320 and it should be noted that the display 320 may be rotated in the channels 326 into any position between the illustrated extremes.

Figure 12A:
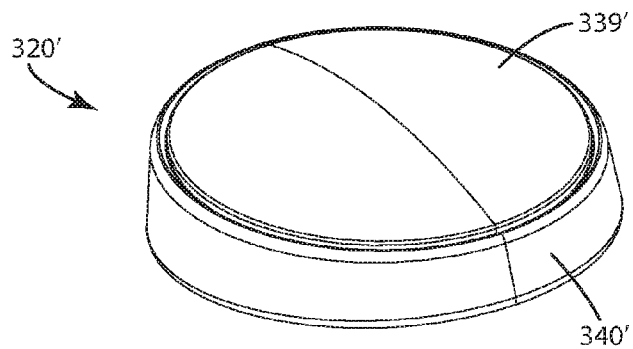
FIG. 12A is a perspective view of a second alternative display.
Figure 12B:
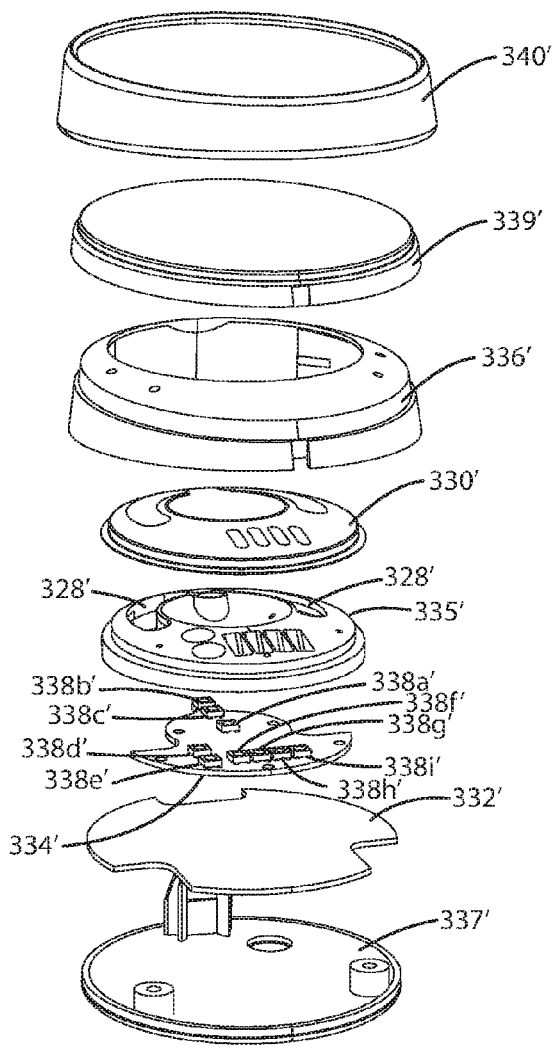
FIG. 12B is an exploded perspective view of the second alternative display.
Figures 13A, 13B:
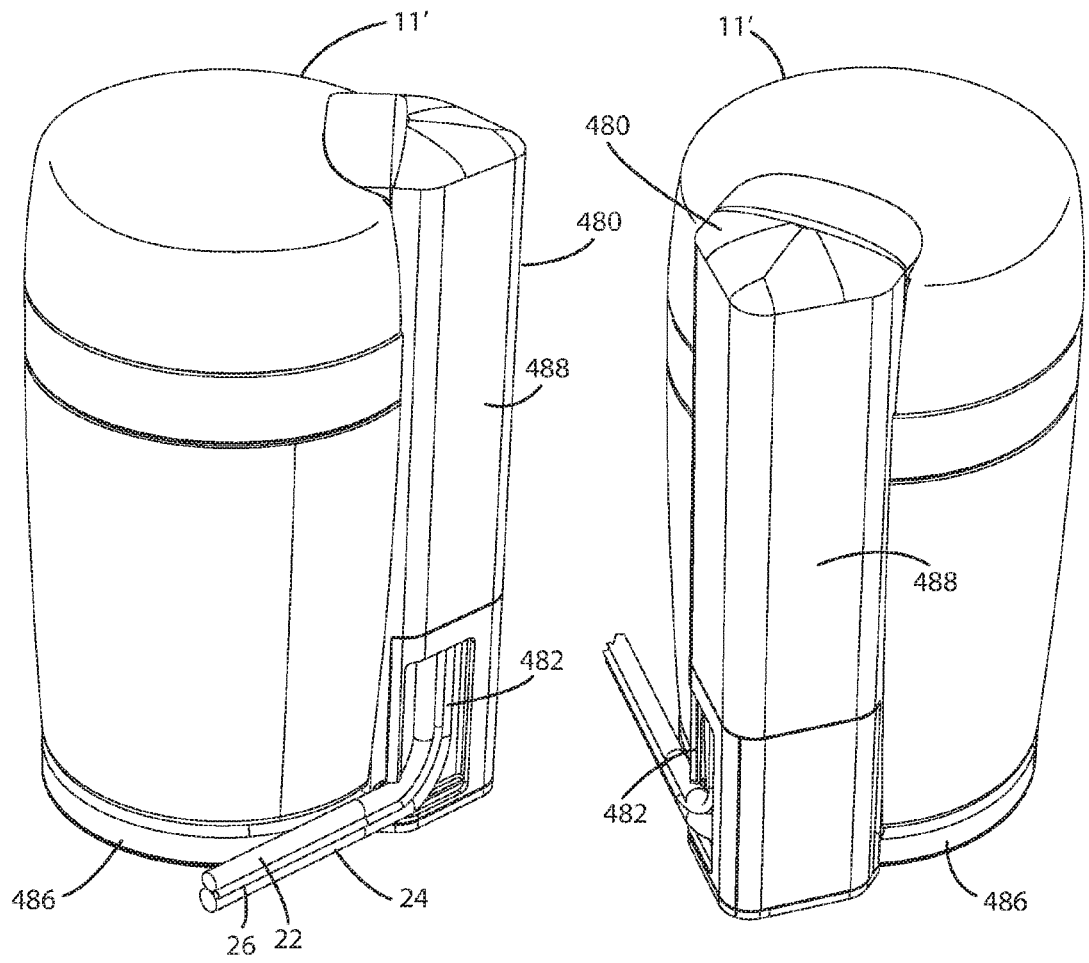
FIG. 13A is a perspective view of the water treatment system mounted to a stand.
FIG. 13B is a rear perspective view of the water treatment system moment to the stand.
Figure 14:
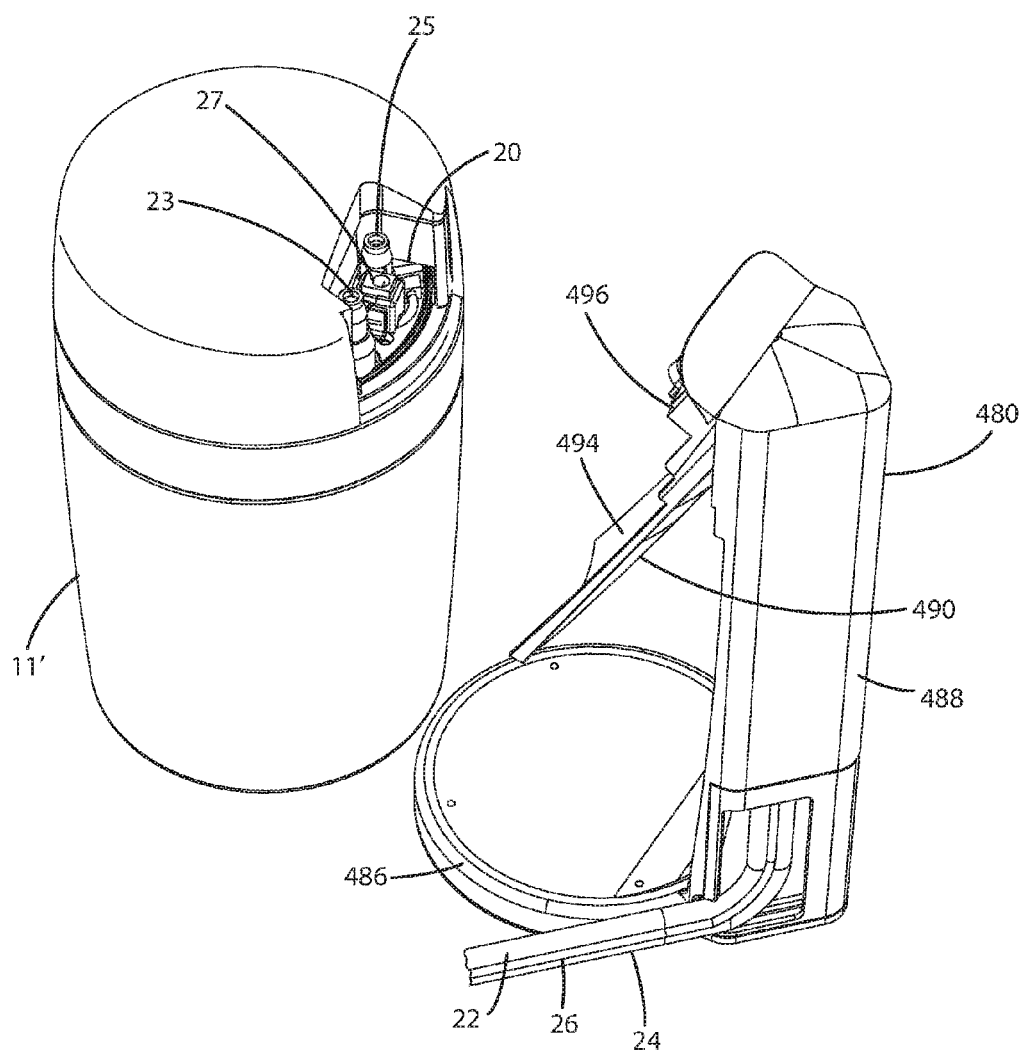
FIG. 14 is a rear perspective view of the water treatment system adjacent to the stand.

A remote expanded display 320' is shown in FIGS. 12A and 12B. The remote expanded display 320' is intended for use in a position remote from the water treatment engine 10, for example, on top of a counter in the context of an under-counter water treatment engine 10. The remote expanded display 320' is generally identical to expanded display 320, except as described and shown in the illustrations. Given its similarity to expanded display 320, remote expanded display 320' will not be described in detail, except to the extent necessary to understand the primary differences between expanded display 320 and remote expanded display 320'. To facilitate disclosure, FIGS. 12A-B include reference numerals that correspond with those used in connection with expanded display 320, except preceded by an apostrophe or prime symbol. For example, circuit board 334' corresponds with circuit board 334 described above in connection with expanded display 320. The remote expanded display 320' generally includes a bottom cover 337', a base 332', a circuit board 334', a light guide 335', a screen 330', a top cover 336', a transparent or translucent window 339' and an outer ring 340'. In this embodiment, the remote display 320' includes a window 339' that covers the screen 330'. The window 339' may be transparent or translucent to provide a "dead front" display in which the graphic images on the screen are not visible through the window 339' unless illuminated. In this embodiment, the outer ring 340' is fitted over the window 339' and the top cover 336'. The cover 336' may be joined to the base 332' to enclose the circuit board 334' and the light guide 335'. The circuit board 334' may include a controller (not shown) and LED arrangement 338*a*-*i*' that are essentially identical the controller and LED arrangement 338*a*-*i* of expanded display 320. In addition, the circuit board 334' may include a wireless receiver (or transceiver) configured to wirelessly receive water treatment engine data from the electronics module 14. The wireless receiver/transceiver may use essentially any wireless communication protocol to receive information from the electronics module 14, such as Wi-Fi or Bluetooth. Given that the remote expanded display 320' is not incorporated into the electronics module 14, it may include a separate power supply. For example, power may be provided to the circuit board 334' by a dedicated power supply, such as a wall-wart or power brick. If desired, power can be delivered wirelessly to the remote expanded display 320', such as by wireless inductive power. As another example, the remote expanded display 320' may be powered by an electrical energy storage device, such as an internal battery or internal capacitor (e.g. super capacitor or ultra capacitor).

The electronic module 14 may vary from application to application. For example, an alternative electronics module 14' is shown in FIGS. 7A and 7B. Electronics module 14' is generally identical to electronics module 14 discussed above, except to the extent described or shown in the drawings. In this embodiment, the electronics module 14' is configured for use with a water treatment engine 10 that does not include an integrated display, but rather may operate without a display or with a remote display, such as expanded display 320' discussed above. Alternatively, the display could be an application running on a wirelessly connected device, such as a smartphone, tablet or computer. Further, the electronics module 14' of this embodiment includes a water flow valve 15' that allows the control circuitry to prevent the flow of water through the water treatment engine 10. For example, the control circuitry may be configured to close the water flow valve 15' when the life of the replaceable cartridge 34 has expired, when no replaceable cartridge 34 is installed, when the UV lamp 18 is not operating properly or when the control circuitry recognizes an error or fault condition. Referring now to FIG. 7B, the electronics module 14' includes a solenoid-operated water flow valve 15' situated between the tether 92' and the water inlet and the underlying manifold (not shown). The solenoid-operated water flow valve 15' is merely exemplary and may be replaced by other types of valves, such as other electromechanical valves. In this embodiment, the tether 92' may be configured differently to accommodate the water flow valve 15'. For example, in this embodiment, the top housing 186' of the electronics module 14' may be extended to cover the water flow valve 15'. As shown, the inlet of the water flow valve 15' may protrude through the top housing 186'. To accommodate this change in the configuration of the electronics module 14', the portion of the tether 92' overlying the inlet of the water flow valve 15' may be substantially thinner than the remainder of the tether 92'.

Figure 5B:
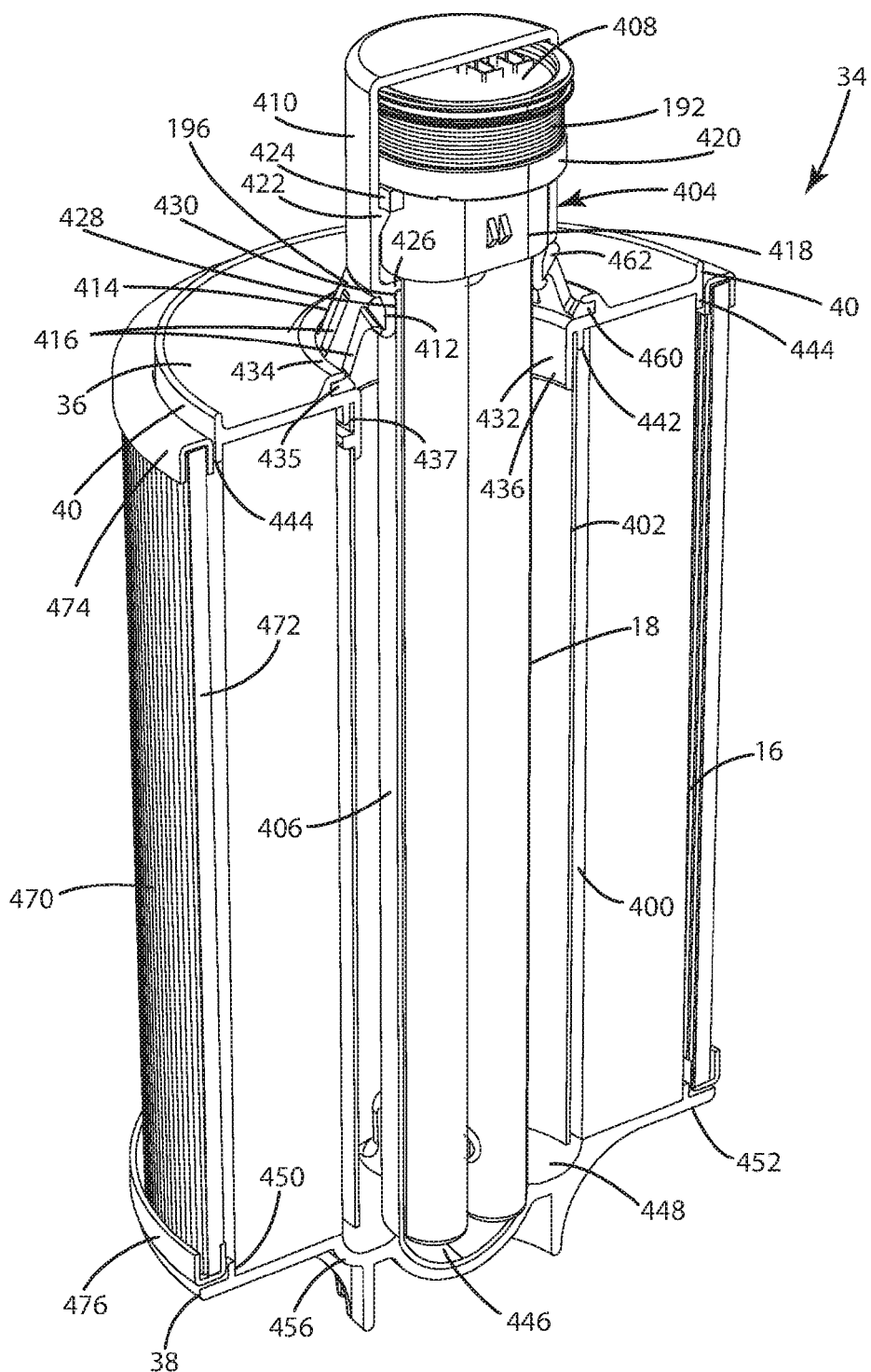
FIG. 5B is a sectional perspective view of the replaceable cartridge.
Figure 6C:
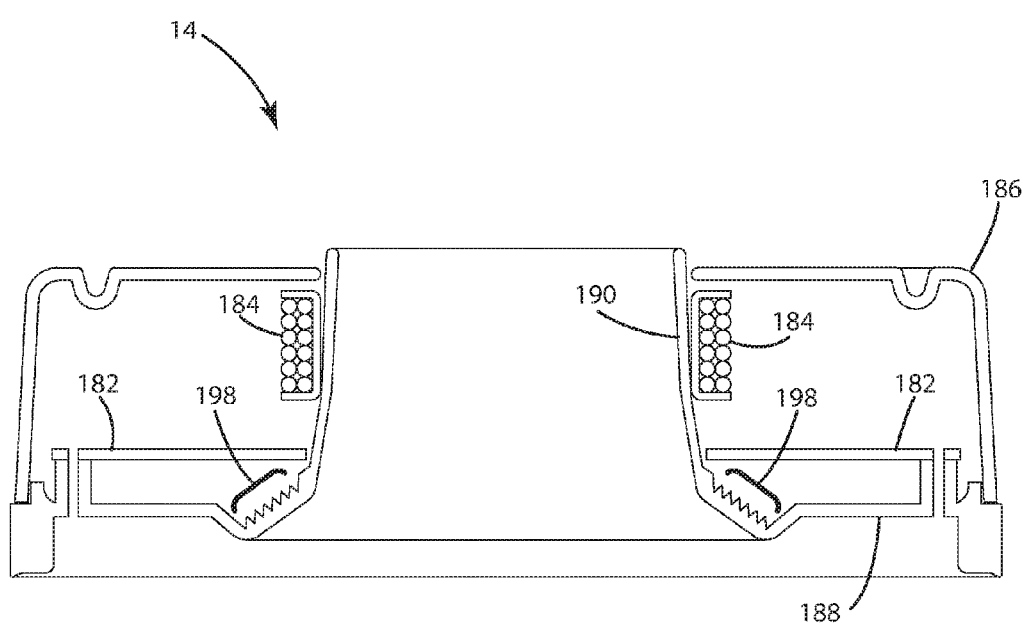
FIG. 6C is a sectional view of the electronics module with portions removed.

In this embodiment, the replaceable cartridge 34 generally includes a carbon block filter 16 and a UV lamp 18 that are entrapped between a top end cap 36 and a bottom end cap 38 (See FIGS. 4I, 5A and 5B). The replaceable cartridge may include additional and/or alternative water treatment system components, such as alternative filters and alternative treatment mechanisms. In the illustrated embodiment, the carbon block filter 16 is generally tubular and defines a central opening 400 configured to receive the UV lamp 18. The water treatment engine may be configured so that water flows radially inwardly through the carbon block filter 16 into the central opening 400. The carbon block filter 16 may include essentially any desired filter media, such as the carbon block filter disclosed in U.S. Pat. No. 6,368,504 to Kuennen, the content of which is incorporated by reference herein in its entirety. In this embodiment, the carbon block filter media includes activated carbon particles and a binder, with the carbon particles having a mean particle diameter ranging from about 60 micron to about 80 microns, and wherein the carbon particles have a particle size distribution in which no more than about 10% by weight of the carbon particles are larger than about 140 mesh and no more than about 10% by weight of the carbon particles smaller than about 500 mesh. Alternatively, the filter media could be provided with a different carbon mixture and/or a different binder. In yet another alternative, the filter media could be a material other than activated carbon, such as a layered paper filter, a pleated paper filter, a pleated woven filter, a resin bead material, a hollow fiber membrane filter or essentially any other type of filter media that might be desired.

As noted above, the replaceable cartridge 34 includes a UV lamp 18 that functions primarily to disinfect water with UV light. The UV lamp 18 of this embodiment is part of a UV lamp assembly 404 that generally includes UV lamp 18, a UV lamp end 418, UV lamp sleeve 406, UV lamp electronics 408 and UV lamp cover 410. In the illustrated embodiment, the UV lamp 18 is a single-end gas discharge lamp with side-by-side legs, but the UV lamp 18 may be essentially any UV lamp capable of producing the desired level of UV light. For example, instead of a gas discharge lamp, the UV lamp 18 may include one or more UV LEDs. A variety of suitable UV lamps are commercially available. The UV lamp 18 is physically connected to lamp end 418 and electrically connected to UV lamp electronics 408. The lamp end 418 provides a mounting structure for mounting the UV lamp 18 within the replaceable cartridge 34, and is configured to receive and support the UV lamp electronics 408. In the illustrated embodiment, lamp end 418 includes an annular bobbin 420 configured to receive the inductive secondary 192, which in this embodiment is a coil of wire.

The UV lamp electronics 408 provide power and control operation of the UV lamp 18. For example, in this embodiment, UV lamp electronics 408 generally includes an inductive secondary 192 that wirelessly receives power from the inductive primary 184 of the electronics module 14. The UV lamp electronics 408 may include circuitry capable of making any desired conversion, adaptation or transformation of the power induced in the inductive secondary 192 to make it suitable for powering the UV lamp 18. The UV lamp electronics 408 may also include control circuitry that controls operation of the UV lamp 18. From a control standpoint, the UV lamp electronics 408 may implement appropriate lamp startup procedures, such as lamp preheat and strike, as well as, adjust operation of the UV lamp 18 over time to adjust for changes in the lamp over its life. For example, the operating characteristics of some UV lamps vary over time, and the UV lamp electronics 408 may gradually increase operating power over the life of the lamp so that the UV lamp 18 provides consistent UV light output over time.

In the illustrated embodiment, the UV lamp 18 and UV lamp electronics 408 are enclosed by the UV lamp sleeve 406 and the UV lamp cover 410. In this embodiment, the UV lamp cover 410 is configured to fit over the UV lamp end 418 covering the UV lamp electronics 408 and providing a receptacle to receive the open end of the UV lamp sleeve 406. As shown in FIG. 5B, the UV lamp cover 410 includes an internal annular rib 422 configured to interfit with mating protrusions 424 extending from the UV lamp end 418. The rib 422 and protrusions 424 secure the UV lamp end 418 within the UV lamp cover 410. The open end of the UV lamp cover 410 is configured to receive the open end of the UV lamp sleeve 406. The internal diameter of the open end of the UV lamp cover 410 corresponds with the external diameter of the UV lamp sleeve 406 so that the UV lamp sleeve 406 is held within the UV lamp cover 410 by friction. In this embodiment, the open end of the UV lamp sleeve 406 includes a small external rib 428. The internal surface of the UV lamp cover 410 also includes a corresponding annular recess 430 configured to receive and seat the external rib 428. The UV lamp cover 410 also includes an internal shoulder 426 configured to extend inwardly to engage the end of the UV lamp sleeve 406. The internal shoulder 426 helps to ensure that the UV lamp sleeve 406 is properly seated within the open end of the UV lamp cover 410. A leaktight seal is provided between the UV lamp sleeve 406 and the UV lamp cover 410 to prevent water from reaching the UV lamp 18 or the UV lamp electronics 408. In the illustrated embodiment, the UV lamp cover 410 is fitted over the UV lamp electronics 408, the electrode end of the UV lamp 18 and the open end of the UV lamp sleeve 406. In this embodiment, the UV lamp cover 410 is manufactured from a relatively soft, resilient material that seals against the UV lamp sleeve 406. In this embodiment, the end caps 36 and 38 are manufactured from a soft, resilient material. For example, the UV lamp cover 410 may be manufactured from thermoplastic elastomer (TPE) or silicone. In some applications, it may be desirable to provide a sealant at the interface between the UV lamp cover 410 and the UV lamp sleeve 406. In this embodiment, the UV lamp cover 410 also includes an annular recess 412 configured to interfit with a collar 414. The annular recess 412 is sized and shaped to closely receive the inner edge of the collar 414.

As noted above, opposite ends of the replaceable cartridge 34 are closed by top end cap 36 and bottom end cap 38. In this embodiment, the end caps 36 and 38 are manufactured from a soft, resilient material. For example, the top end cap 36 and the bottom end cap 38 may be manufactured from thermoplastic elastomer (TPE) or silicone. Top end cap 36 is generally disk-shaped and defines a central opening 432 that allows the UV lamp 18 to extend upwardly through the top end cap 36 into the UV lamp cover 410. In this embodiment, the top end cap 36 includes a flange 434 that extends upwardly and inwardly to define a channel 435 configured to receive the collar 414. The top end cap 36 of this embodiment also includes an annular neck 436 that extends downwardly around the periphery of the central opening 432. The neck is configured to interface with the reflector 402 (described below). In the illustrated embodiment, the neck 436 includes one or more outwardly extending tabs 438 that are configured to interfit with corresponding features in the reflector 402. For example, as shown in FIG. 5A, reflector 402 includes a small opening 440 through which tab 438 extends to secure the reflector 402 in place with respect to the top end cap 36. Although FIG. 5B shows only one tab/opening pair, the top end cap 36 and reflector 402 may include a plurality of tab/opening pairs arranged about the circumference of the neck 436 and the reflector 402. In this embodiment, the top end cap 36 also includes a downwardly extending circular rib 442 that is spaced outwardly from neck 436. The rib 442 is concentric with the neck 436 and they cooperatively define a narrow channel 437 that receives and seats the top end of reflector 402. The channel 437 is configured to tightly receive the reflector 402 so that the interference fit between the two components creates a leaktight seal. Sealant may be provided in this channel 437, as desired. The top end cap 36 also includes an integral annular seal 40 that extends upwardly from the outer peripheral edge. In this embodiment, the annular seal 40 is configured to engage the undersurface of the manifold 62 to define the internal flow path within the pressure vessel 12. More specifically, the annular seal 40 separates the inlet flow path 84 from the outlet flow path 86, which ultimately requires water that enters through the inlet flow path 84 to flow radially inward through the carbon block filter 16, down the reflector 402 to the bottom end of the UV chamber, then up along the full length of the UV lamp 18 in the space defined between the UV lamp sleeve 406 and reflector 402 and the slots in the collar 414 before exiting through the outlet flow path 86. In the illustrated embodiment, the top end cap 36 also includes a downwardly extending flange 444 that surrounds the circumferential edge of the carbon block filter 16.

The bottom end cap 38 closes the bottom end of the replaceable cartridge 34. The bottom end cap 38 is generally disk-shaped. The upper surface of the bottom end cap 38 defines a lamp seat 446 that receives and seats the closed end of the UV lamp sleeve 406. As perhaps best shown in FIG. 5B, the lamp seat 446 is configured to a generally spherical recess that corresponds closely in shape with the closed end of the UV lamp sleeve 406. This allows the bottom end cap 38 to firmly retain the free end of the UV lamp sleeve 406. In this embodiment, the upper surface of the bottom end 38, also defines an annular trough 448 surrounding the lamp seat 446. The annular trough 448 is configured to allow water to flow downwardly beyond the free end of the reflector 402 and radially inward into the UV chamber. In the illustrated embodiment, the bottom end cap 38 includes an upwardly extending annular rib 450 that surrounds the circumferential edge of the carbon block filter 16. The bottom end cap 38 includes a shelf 452 that extends around the periphery of the bottom end cap 38 beyond the rib 450 to provide a structure upon which to seat the prefilter 470. In the illustrated embodiment, the bottom surface of the end cap 38 is configured to help center the bottom end of the replaceable cartridge 34 within the base 60. As shown, the bottom end cap 38 of the illustrated embodiment includes a central annular sleeve 454 configured to fit over hub 72 and a plurality of tapered fins 456 that help to shepherd the annular sleeve 454 into position over the hub 72 as the replaceable cartridge 34 is inserted into the base 60.

As noted above, the replaceable cartridge 34 includes a collar 414 that interconnects the UV lamp cover 410 to the top end cap 36. In the illustrated embodiment, collar 414 is somewhat frustoconical having a bottom flange 460 that is engaged with the top end cap 36 and a top flange 462 that is engaged with the UV lamp cover 410. The collar 414 of this embodiment defines a plurality of slots 416 that allow water and UV light to pass through the collar 414. The number, size, shape or configuration of the slots 416 may vary from application to application as desired. In this embodiment, collar 414 is manufactured from a material that is transparent or translucent to visible light emitted by the UV lamp 18. As noted above, the use of transparent or translucent material allows additional visible light to pass through the collar 414 to the UV lamp indicator 194.

The replaceable cartridge 34 may also include a reflector 402 that is situated between the carbon block filter 16 in the UV lamp 18. The reflector 402 may be generally tubular and have an inner surface facing the UV lamp assembly 18 to reflect UV light. The cross-sectional shape of the reflector may vary from application to application. For example, the reflector 402 may be generally circular in cross-section. Alternatively, the reflector 402 may have a more complex cross-sectional shape configured to correspond with the shape of the UV lamp assembly to optimize reflection of UV light into the water to be treated. The reflector 402 may be secured at one end to the top endcap 36. The opposite end of the reflector 402 may terminate short of the bottom end cap 38 to create a gap that allows water to flow to the inside the reflector 402. In this embodiment, the reflector 402 functions not only as a reflector, but also as a baffle to route water that has passed through the carbon block filter 16 to the lower end of the UV lamp 18. This causes water passing through the replaceable cartridge 34 to pass along the essentially the full length of the UV lamp 18, which helps to ensure that the water received an appropriate dose of UV radiation.

In the illustrated embodiment, the replaceable cartridge 34 include a prefilter 470 is removably fitted about the outer surface of the carbon block filter 60. The prefilter 470 may include a prefilter media 472, such as open-cell foam, that is fitted between end caps 474 and 476. In this embodiment, the prefilter media 472 is manufactured from a pleated polypropylene material that closely fits over the carbon block filter 60. The prefilter media 472 may, however, be essentially any prefilter media suitable for use with water. In the illustrated embodiment, the prefilter end caps 474 and 476 are generally identical to one another, and the prefilter 470 can be installed over the carbon block filter. In either axial orientation. As shown in FIG. 5B, prefilter end cap 474 may be configured to engage top end cap 36 and prefilter end cap 476 may be configured to rest on shelf 452 while engaging annular rib 450.

In the illustrated embodiment, the carbon block filter 16 and the UV lamp 18 are integrated into a single cartridge and are replaced together. Alternatively, the carbon block filter 16 and the UV lamp 18 may be separable from one another and may be separately replaceable.

Figure 3:
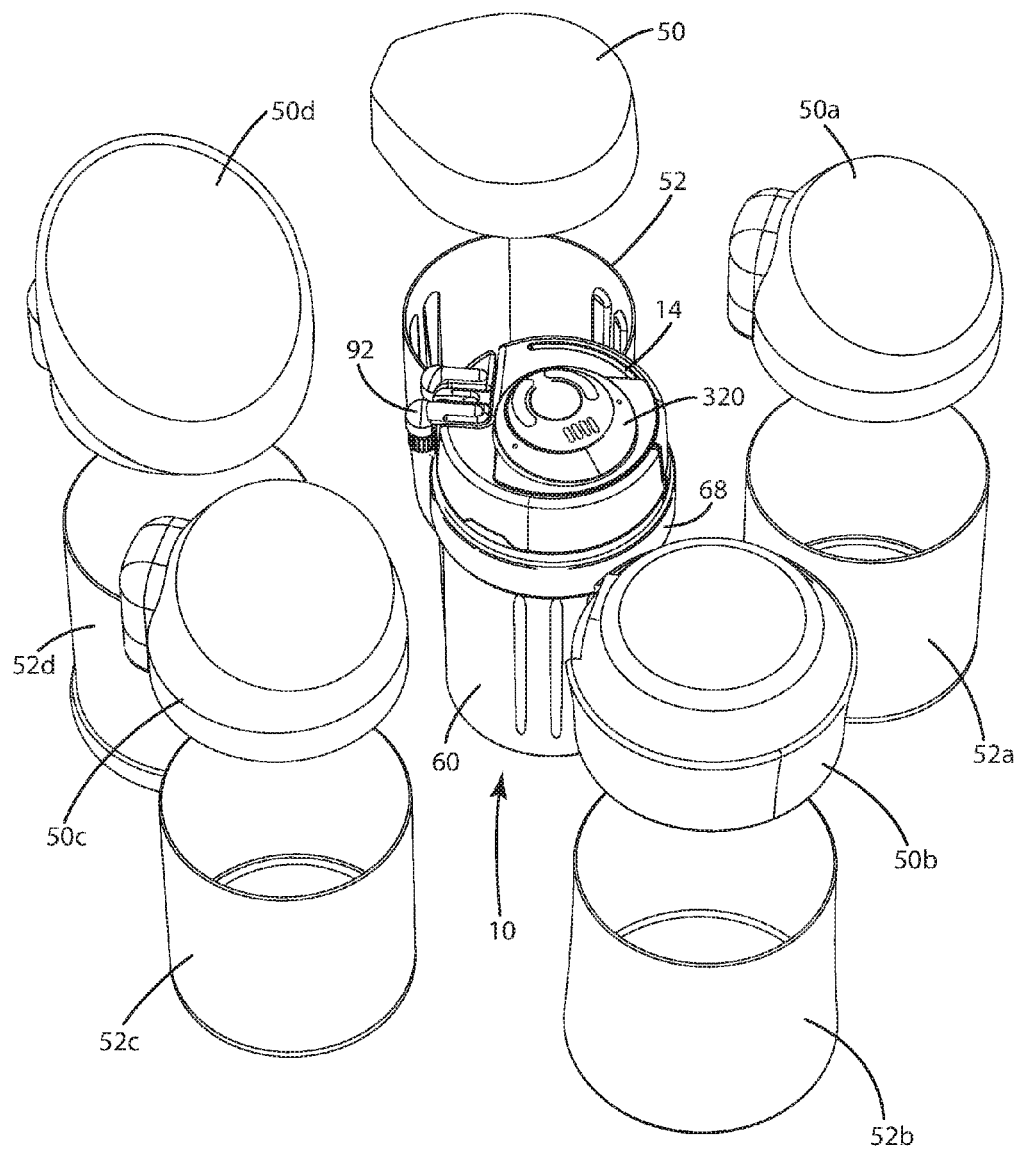
FIG. 3 is a perspective view of the water treatment system and a variety of alternative shrouds.

As noted above, the water treatment engine 10 may be fitted within a shroud assembly including a top shroud 50 and a bottom shroud 52. The design and configuration of the shroud assembly may vary from application to application. For example, FIG. 3 shows a water treatment engine 10 surrounded by five alternative shroud assemblies, each including a top shroud and a bottom shroud. In the illustrated embodiment, the top shroud 50 is configured to be fitted over the electronics module 14 and rest on the top edge of the connector collar 68. As such, the top shroud 50 may include an extension configured to accommodate the water in power supply lines. In the illustrated embodiments, any top shroud extension is configured to fit within boundaries defined by two lines that are tangent to the circular profile and arranged at about ninety degrees to one another. Further, the top shroud 50 may be transparent or translucent or include transparent or translucent regions that allow viewing of any underlying display (e.g. display 300, 320 or 320'). In the illustrated embodiments, the bottom shroud 52 is a generally circular bucket defining a cylindrical void of appropriate size to receive the bottom of the water treatment engine 10. In these embodiments, the bottom edge of the connector collar 68 is configured to rest upon the top edge of the bottom shroud 52 when the water treatment engine is seated in the shroud assembly. As can be seen, in these embodiments, the aesthetic appearance of the water treatment system 11 is largely dictated by the top shroud 50, bottom shroud 52 and connector collar 68. Accordingly, the aesthetic appearance of the water treatment system 11 can be varied without affecting the bulk of the water treatment engine 10 by installing different shrouds and different connector collars.

Figure 4A:
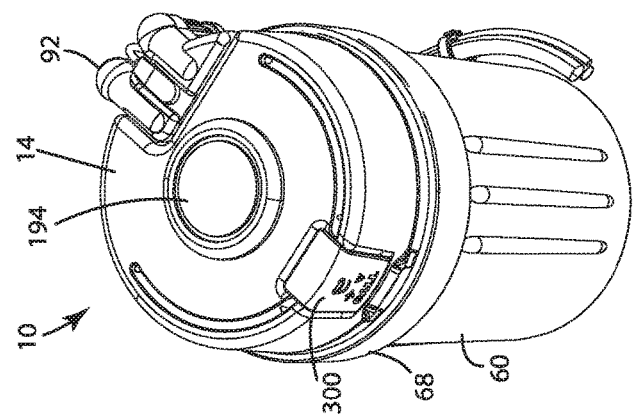
Figure 4D:
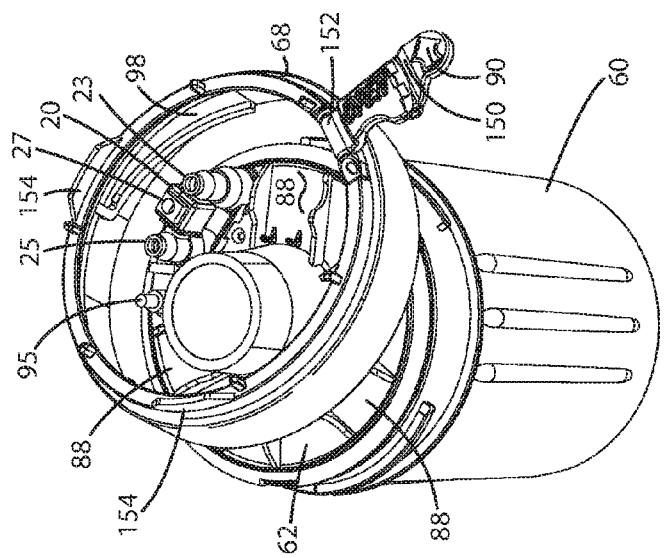
Figure 4E:
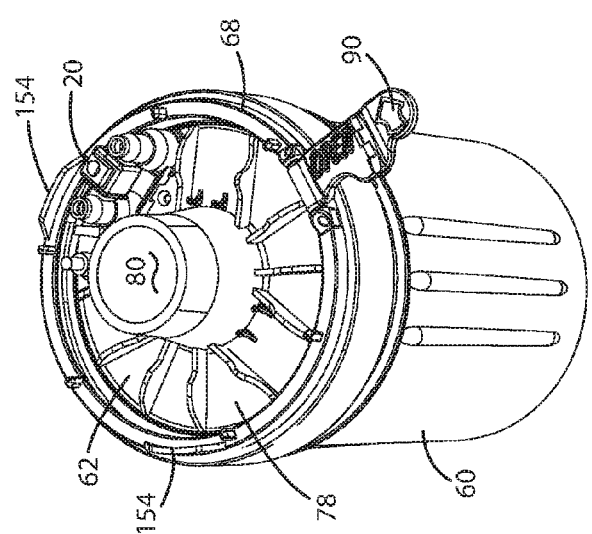
Figure 4F:
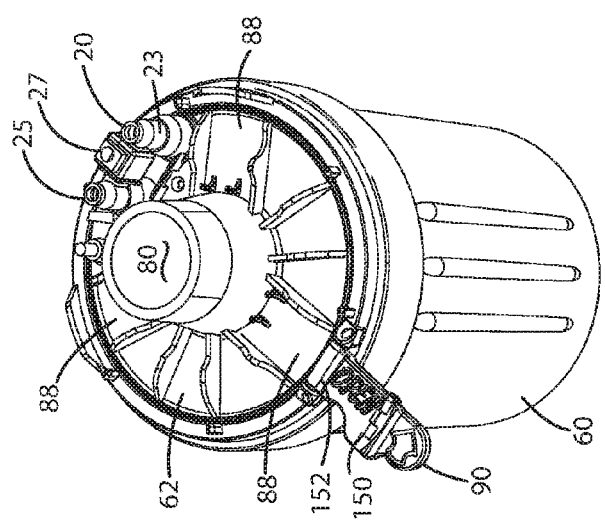

Assembly and disassembly of the water treatment engine 10 will now be described with reference to FIGS. 4A-4I. For purposes of this discussion, the water treatment engine 10 is shown without a shroud assembly. If the water treatment engine 10 is situated within a shroud assembly, the top shroud 50 may first be removed to provide access to the underlying water treatment engine 10. FIG. 4A shows the assembled water treatment engine 10 with the attached tether 92 and the seated electronics module 14. FIG. 4B shows the electronics module 14 removed from the water treatment engine 10. In the illustrated embodiment, the electronics module 14 is simply lifted from the water treatment engine 10. Lifting the electronics module 14 away from the remainder of the water treatment engine 10 automatically disconnects the electronics module from the power connector 95 disposed on the manifold 62. Once the electronics module 14 has been removed, the tether 92 can be disconnected from the connection point 20 on the manifold 62. More specifically, removal of the electronics module 14 provides access to the tether release button 29. The tether 92, including water connections 170 2A-B and the electrical plug end 177, can be removed simply by depressing the release button 29 and the tether away from the connection point 20 (See FIG. 4C). As noted above, the connector collar 68 may include a handle 90 that is folded into a handle seat 88 in the manifold 62. FIG. 4D shows the water treatment engine 10 with the handle 90 unfolded into the operating position. To remove the connector collar 68 from the base 60, the handle 90 can be used to rotate the connector collar 68 with respect to the base 60. FIG. 4E shows the connector collar 68 rotated into the disconnected position. Once disconnected from the base 60, the connector collar 68 can be lifted away from the base 60 to release the manifold 62. FIG. 4G shows the manifold 62 lifted away from the base 60. This provides access to the underlying replaceable cartridge 34. The replaceable cartridge 34 can then be lifted out of the base 60 as shown in FIG. 4H. FIG. 4I shows the bottom end of the replaceable cartridge 34. As described above, the bottom end of the replaceable cartridge 34 includes tapered features that interact with corresponding features in the bottom of the base 60 to help automatically center the bottom end of the replaceable cartridge 34 as it is inserted into the base 60.

Figure 13C:
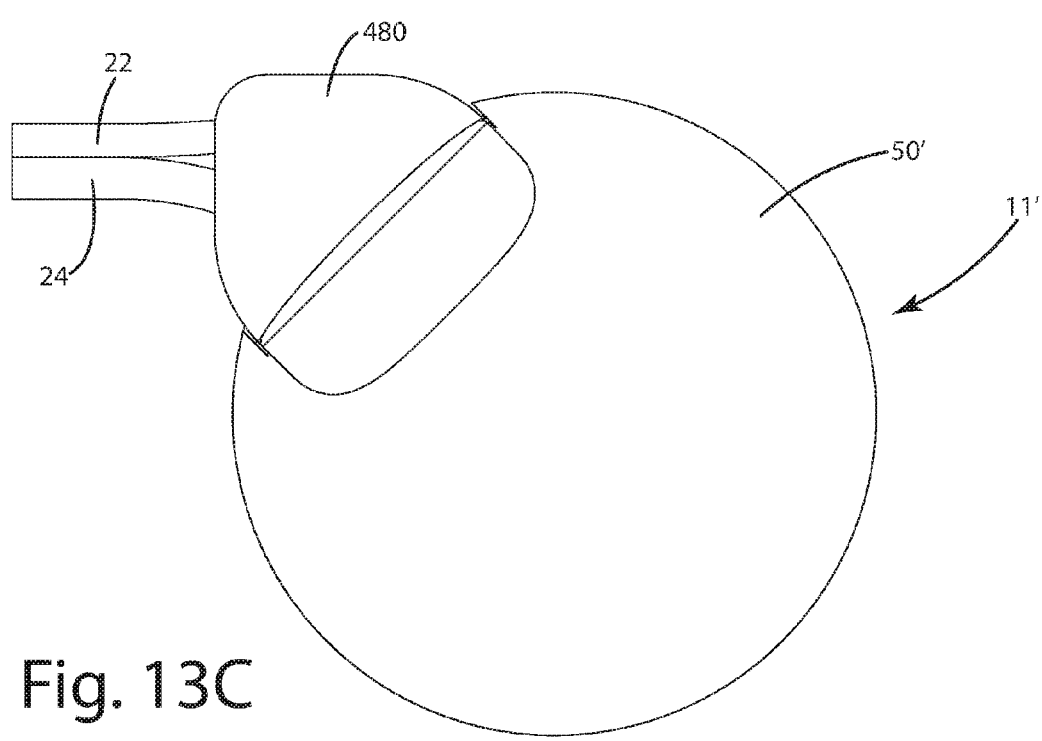
FIG. 13C is a top view of the water treatment system mounted to the stand.
Figure 15A:
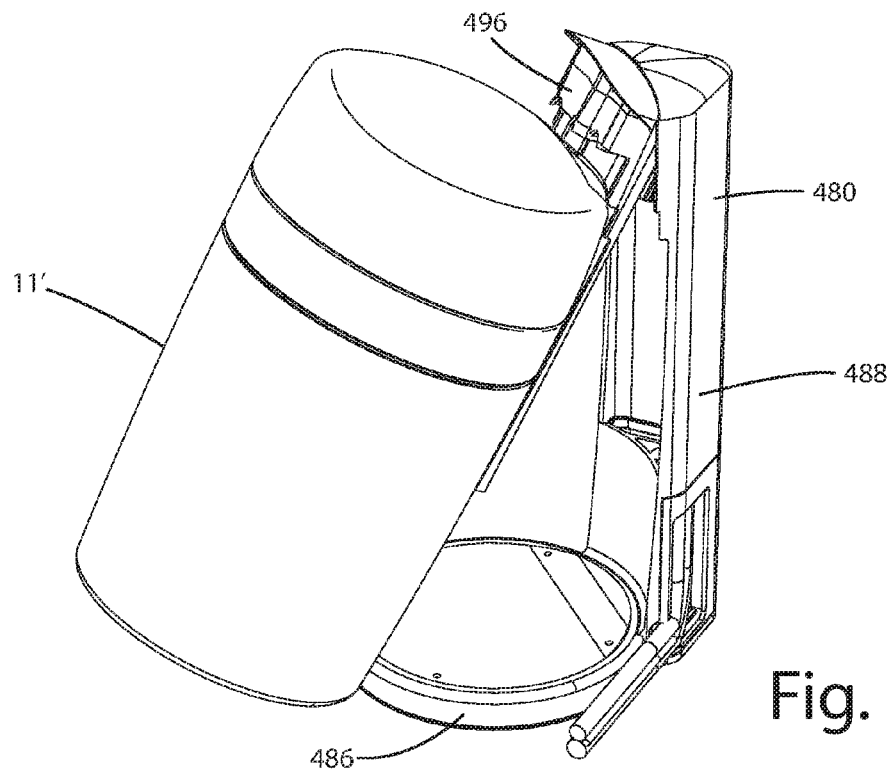
FIG. 15A is a first perspective view of the water treatment system being installed on the stand.
Figure 15B:
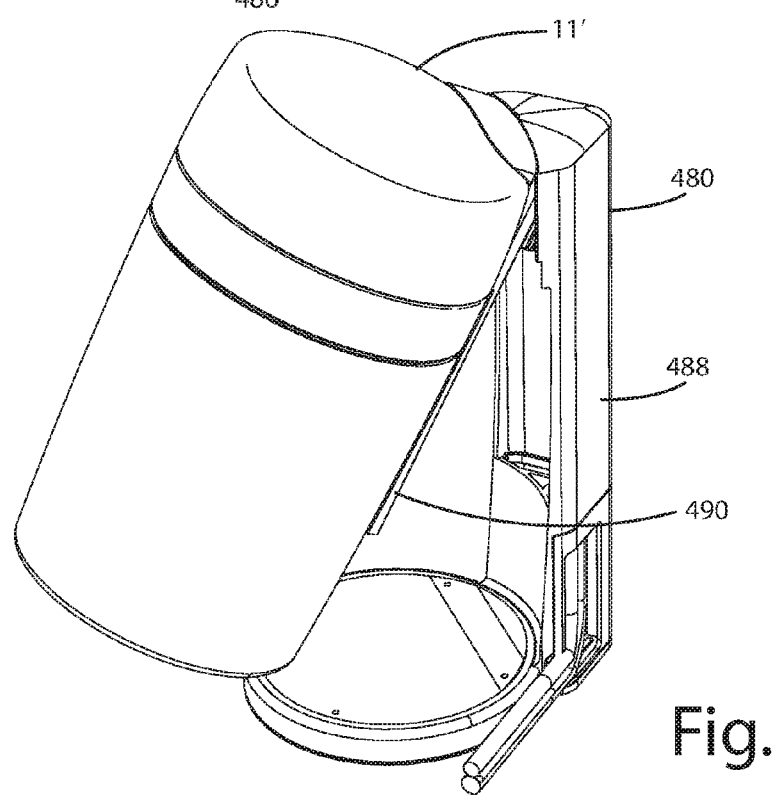
FIG. 15B is a second perspective view of the water treatment system being installed on the stand.
Figure 16A:
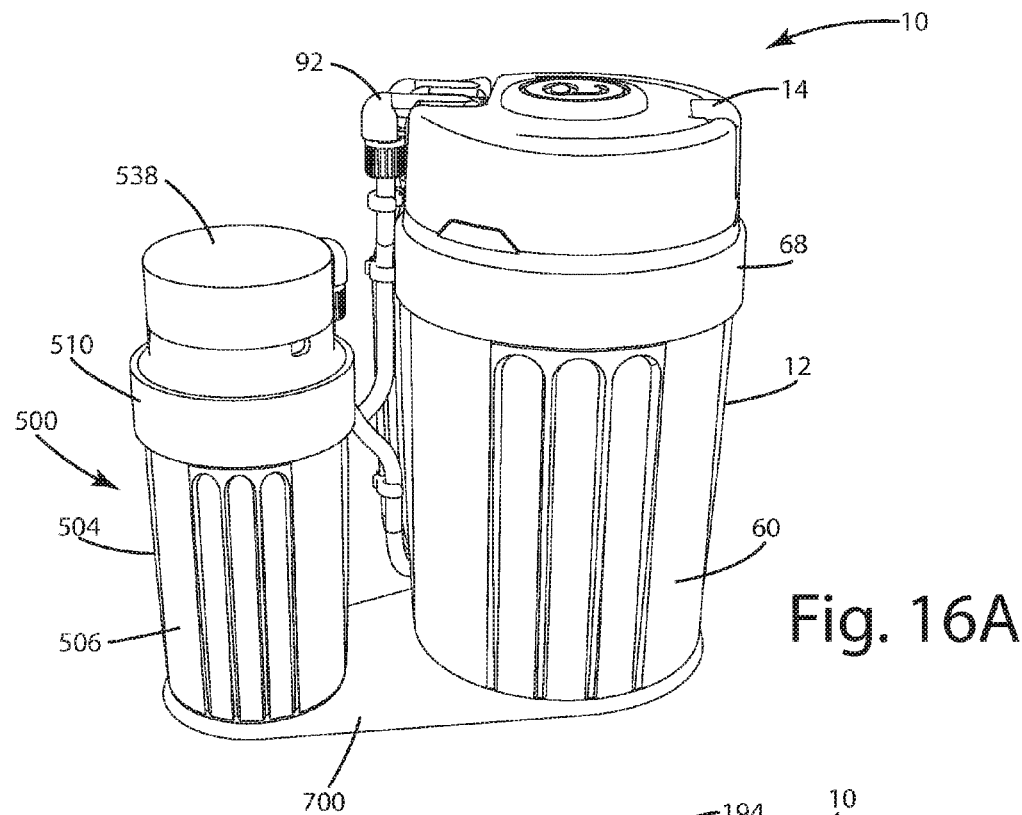
FIG. 16A is a front perspective view of a water treatment engine and an accessory device.
Figure 16B:
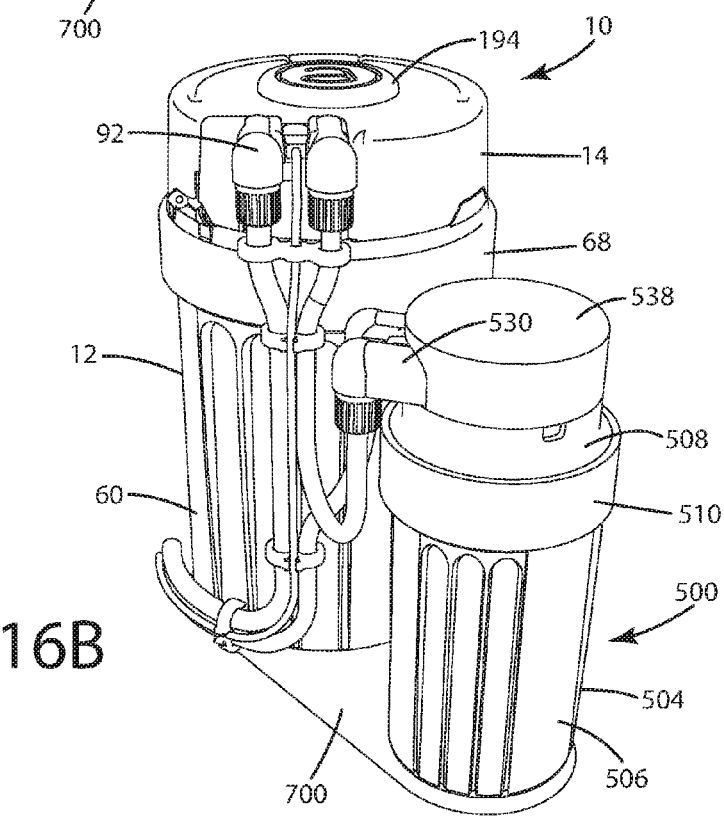
FIG. 16B is a rear perspective view of the water treatment engine and accessory device.

In an alternative embodiment shown in FIGS. 13A-B, 14 and 15A-B, the water treatment system 11' may include a stand 480 that provides a single connection point and an enclosure for water and power lines. In the illustrated embodiment, the stand 480 includes a pedestal 486, an upright portion 488 and a pivoting dock 490. In the illustrated embodiment, the pedestal 486 is a circular disk having approximately the same diameter as the water treatment system 11'. The size, shape and configuration of the pedestal 486 may vary from application to application as desired. The upright portion 488 of this embodiment is contained with a boundary defined by two tangent lines arranged about 90° or more from one another to "square the circle" of the profile of the water treatment system 11' (See FIG. 13C). This can provide a more functional profile, and may allow the water treatment system 11' to fit efficiently into a wider range of spaces. In this embodiment, the upright portion 488 is generally hollow to define a pathway for routing waterlines and power lines from the base of the stand 480 to the pivoting dock 490. As perhaps best shown in FIGS. 13A and 13B, the upright portion 488 may include rear openings 482 to accommodate waterlines and the power line. The pivoting dock 490 of this embodiment is pivotally joined to the top of upright portion 488 includes a cradle portion 494 and an integral tether 496. The cradle portion 494 is configured to extend along a portion of the shroud assembly of the water treatment system 11'. The tether 496 is configured to interconnect with the single connection point on manifold 62. In the illustrated embodiment, the pivoting dock 490 may include a spring (not shown) or other mechanism for biasing the dock 490 into an outward position to easily receive the water treatment system 11'. In the illustrated embodiment, the water treatment system of 11' may include a top shroud 50' and a bottom shroud 52', and the top shroud 50' may be specifically configured to interface with the pivoting dock 490. More specifically, the top shroud 50' may define an opening of precisely the same size and shape as the pivoting dock 490. FIGS. 15A-15B are illustrations showing installation of the water treatment system 11' on the stand 480. FIG. 15A shows the water treatment system 11' being positioned adjacent the cradle portion 494 for installation on the stand 480. At this point, the water treatment system 11' may be rotated so that the connection point in the manifold 62 is aligned with the tether 496. FIG. 15B shows the water treatment system 11' partially installed on the stand 480. In this illustration, the water treatment system 11' has been raised along the cradle portion 494 to bring the connection point in the manifold 62 into engagement with the tether 496. Following this step, the water treatment system 11' and dock 490 can be pivoted inwardly to so that the water treatment system 11' is resting upon pedestal 486. The illustrated stand 480 is merely exemplary. The size, shape and configuration of the stand may vary from application to application as desired.

III. Auxiliary Components.

In the illustrated embodiment, the water treatment system 11 is configured to readily interconnect with auxiliary components upstream and/or downstream from the water treatment system 11. The water treatment system 11 may be connected to different auxiliary components in a wide variety of alternative configurations. Auxiliary components include essentially any components that might be used to add additional features to the water treatment system 11. For example, auxiliary components may add specialized filtering or treatment capabilities that may address application-specific concerns. Specialized filtering and treatment systems may include, among other things, metal oxide treatment systems, woven and non-woven filtering media, special carbon filtering media, membrane treatment systems, as well as other filtering and disinfection systems that are capable of addressing various water quality concerns, such as arsenic contamination, excessive nitrates, excessive total organic carbon and water hardness. In addition to specialized filtering and treatment capabilities, auxiliary components may also provide the ability to dispense hot/cold/ambient water or introduce additives into the water, such as fluoride, vitamins, minerals and other nutritional/food supplements, as well as flavoring, coloring and carbonation.

Figure 17:
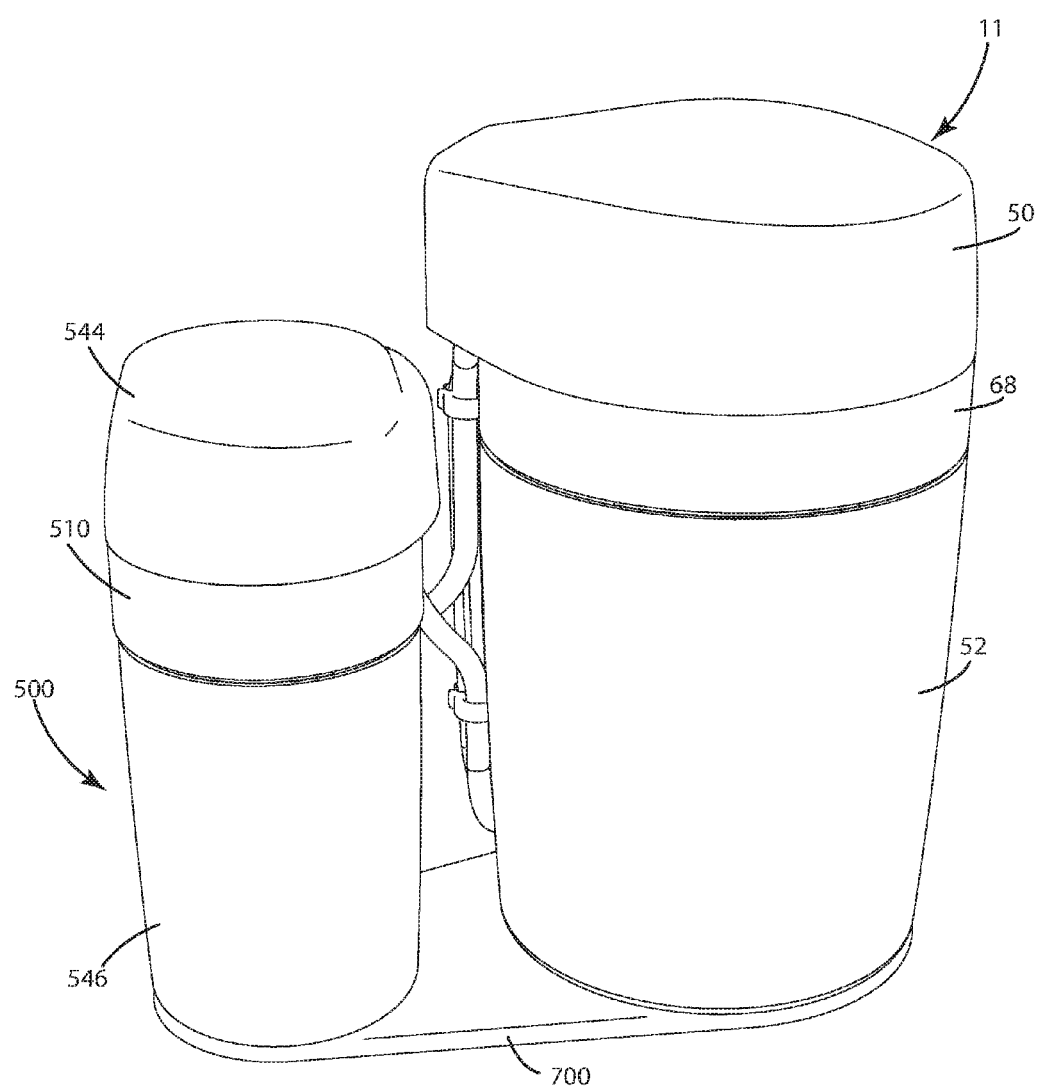
FIG. 17 is a perspective view of the water treatment engine and accessory device contained within corresponding shrouds.
Figure 18A:
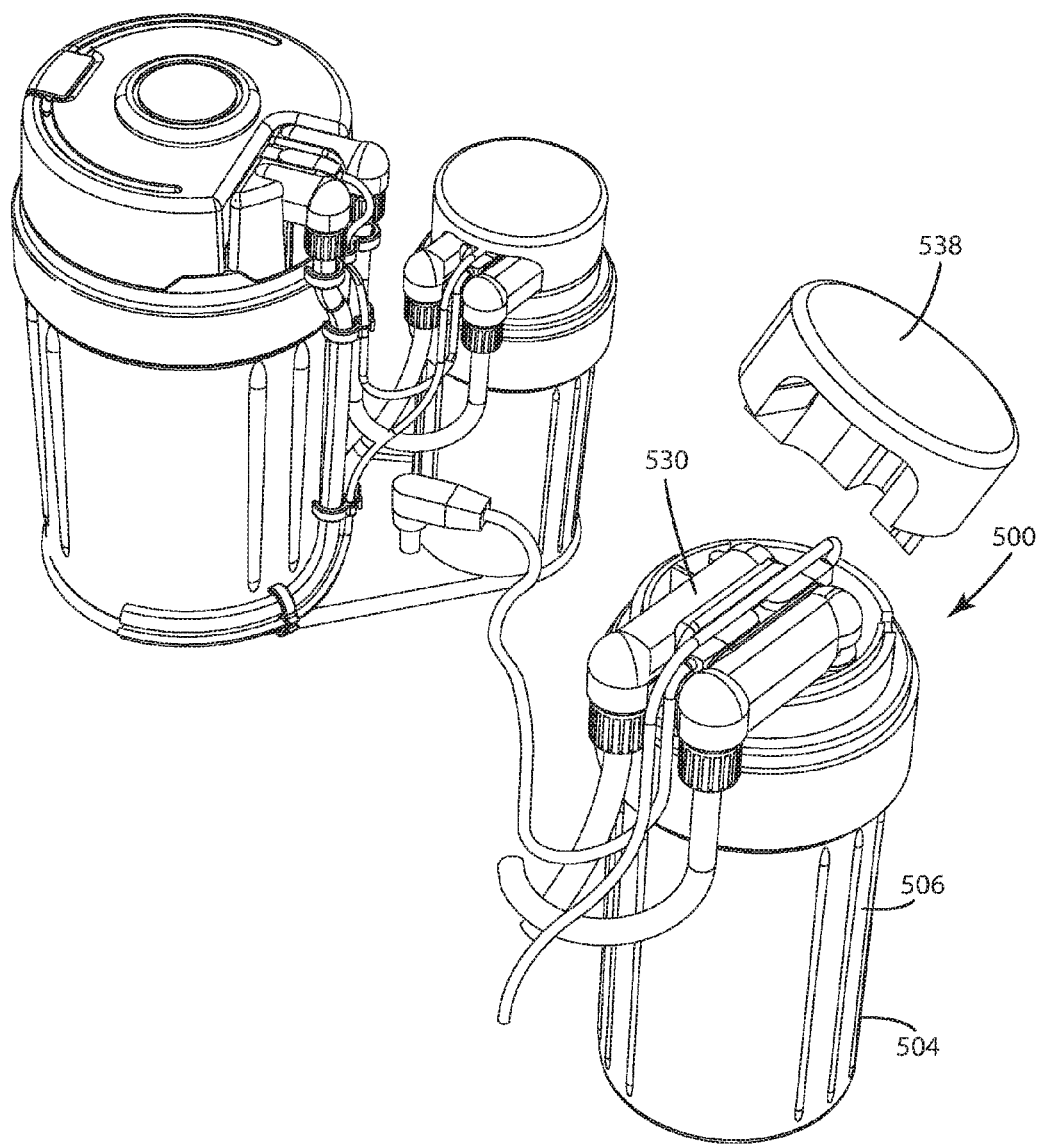
FIGS. 18A-18E are a plurality of views illustrating disassembly of the accessory device.
Figures 18B, 18C:
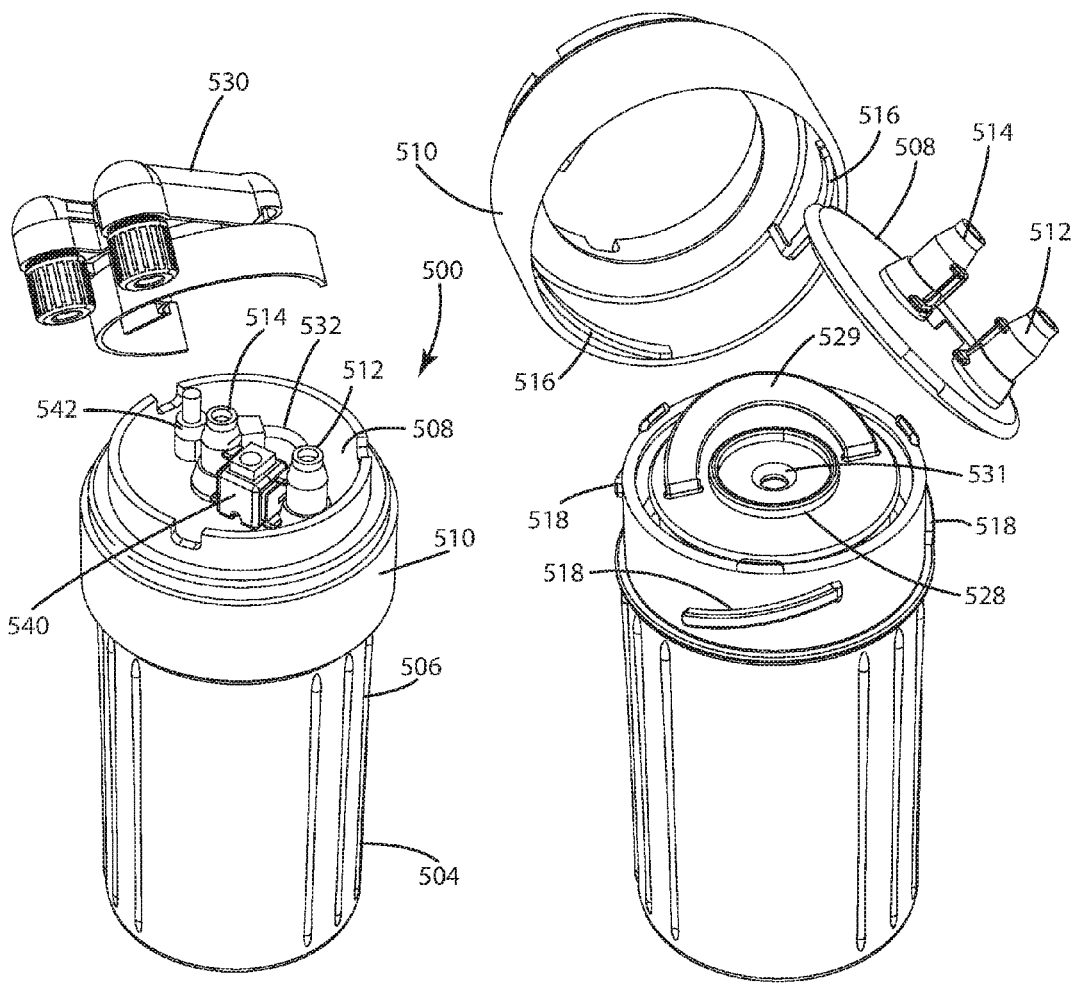
Figures 18D, 18E:
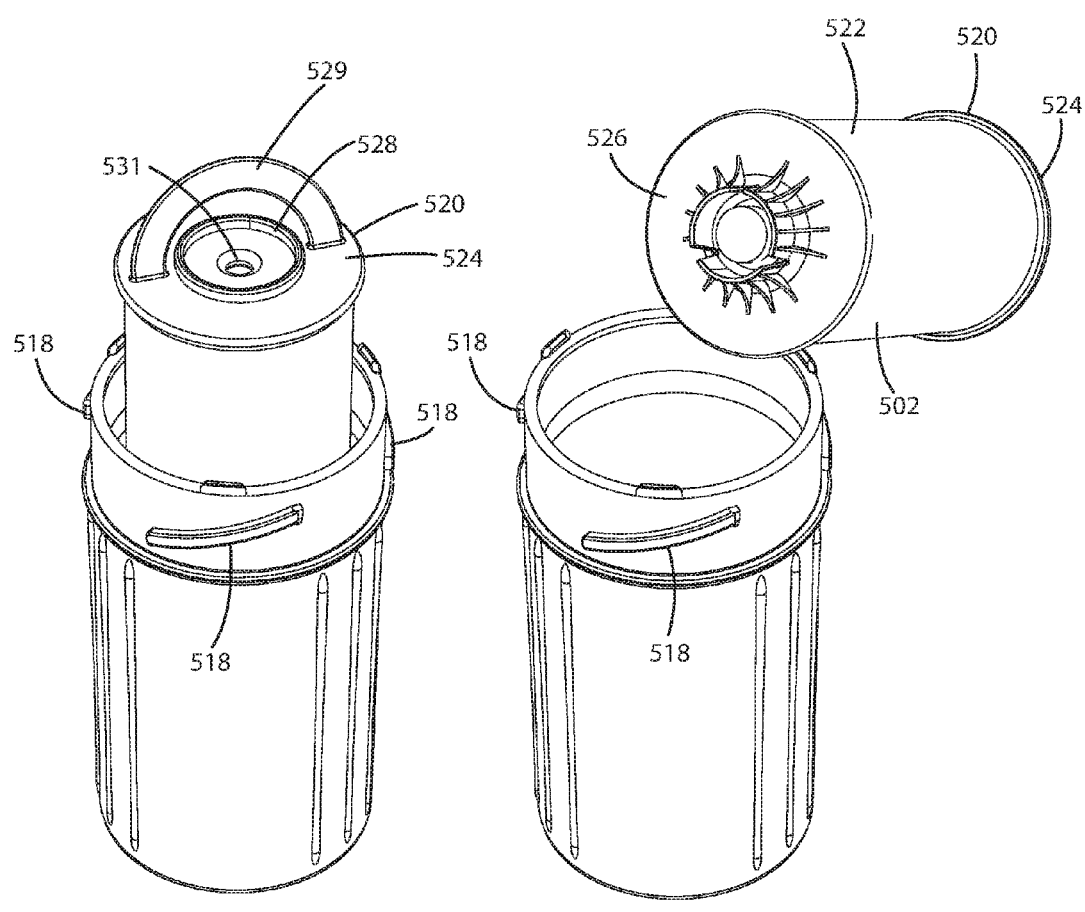

An exemplary auxiliary component, auxiliary filter 500, is shown in FIGS. 16A-B, 17 and 18A-E. In this embodiment, the auxiliary filter 500 includes a supplemental filter 502 that is contained within a pressure vessel 504. In this embodiment, the pressure vessel 504 generally includes a base 506, a manifold 508 and a locking collar 510. The base 506 of this embodiment is generally identical to base 60 described above in connection with water treatment engine 10. The manifold 508 is configured to close the top of the base 506 and includes inlet port 512 and outlet port 514. The inlet port 512 may be disposed toward the outer edge of the manifold 508, while the outlet port 514 may be disposed at the approximate center of the manifold 508. The manifold 508 is secured to the base 506 by locking collar 510. In this embodiment, the locking collar 510 includes internal threads 516 that mate with corresponding external threads 518 on the base 506. As perhaps best shown in FIGS. 18D and 18E, the supplemental filter 502 is provided in the form of a replaceable filter cartridge 520. The replaceable filter cartridge 520 is similar to replaceable filter cartridge 34, except that it does not include a UV lamp or any electronics. In some applications, the replaceable filter cartridge 520 may also include RFID-type technology, such as the RFID system discussed above in connection with water treatment engine 10, to allow the system to uniquely identify the cartridge 520, and to track life, operating conditions and other data of potential interest. For example, the replaceable filter cartridge 520 may include an RFID chip or RFID tag that communicates with the RFID transceiver in the water treatment engine 10. In this embodiment, the replaceable filter cartridge 520 generally includes a filter media 522 disposed between the top and bottom end caps 524 and 526. The top end cap 524 of this embodiment includes an annular seal 528 that is configured to engage the bottom surface of the manifold 508 to separate the inlet port 512 from the outlet port 514, thereby forcing water entering the pressure vessel 504 to flow through the filter cartridge 520 before exiting the pressure vessel 504 through the outlet port 514. The top end cap 524 also defines a central opening 531 that allows water to flow from the center of the filter 520 to the water outlet 514. The top cap also includes a handle 529 to facilitate removal of the replaceable filter cartridge 520 from the base 506. In this embodiment, the handle 529 can be pivoted up to provide a structure for lifting the replaceable filter cartridge 520 from the base 506, and pivoted down flat against the top end cap 524 when not in use to accommodate the manifold 508. As perhaps best shown in FIG. 18A, the system may include a tether 530 configured to connect to a water supply line to the inlet port 512 and a water return the outlet port 514. Although the auxiliary filter 500 of this embodiment does not require power, the manifold 508 of this embodiment also includes a pass-through power cord 532 that allows power delivered via tether 530 to be routed to another component—in this case the water treatment engine 10. The power cord 532 includes a first end 540 that is fitted into the space between the inlet port 512 and the outlet port 514 to align with a power supply port (not shown) on the tether 530 and a second end 542 that is positioned to align with the power return port (not shown) on the tether 530. As perhaps best shown in FIGS. 16A and 16B, the auxiliary filter 500 may include a cover 538 that is configured to fit over the tether 530 to provide a clean aesthetic appearance. Referring now to FIG. 17, the water treatment engine 10 and auxiliary filter 500 may be fitted with matching shroud assemblies. More specifically, the water treatment engine may be fitted with top shroud 50 and bottom shroud 52, while the auxiliary filter 500 may be fitted with top shroud 544 and bottom shroud 546. In this embodiment, the bottom of the locking collar 510 may engage the top edge of bottom shroud 546 and the bottom edge of top shroud 544 may engage the top of the locking collar 510.

Auxiliary device 500 is merely exemplary. The replaceable filter cartridge 520 may be replaced with a wide variety of alternative treatment components, such as other filter that have essentially the same form factor as filter cartridge 520. Auxiliary device 500 can be fitted with alternative treatment components that have different form factors by replacing the manifold with an alternative manifold having the correct form factor. Further, the size, shape and configuration of the auxiliary device may vary from application to application.

In the illustrated embodiment, the water treatment system 11 is configured to interconnect with various combinations of auxiliary components in a variety of alternative configurations. In some embodiments, the water treatment system 11 may be connected to an auxiliary component, such as auxiliary filter 500, by a base plate 700 (See FIGS. 16A-B, 17 and 18A-E). In this embodiment, the auxiliary filter 500 may be joined to the water treatment system 11 in either an upstream or downstream position. This may be achieved by connecting the water supply lines, the water return lines and the power cords in the appropriate manner. In this embodiment, the base plate 700 may include contours configured to interface with the water treatment system 11 and the auxiliary filter 500. For example, the base plate 700 may include recesses that correspond in shape with the bases of the water treatment system 11 and the auxiliary filter 500. As another example, the base plate 700 may include circular rings that are configured to seat the bottoms of the water treatment system 11 and the auxiliary filter 500.

Figures 19A, 19B:
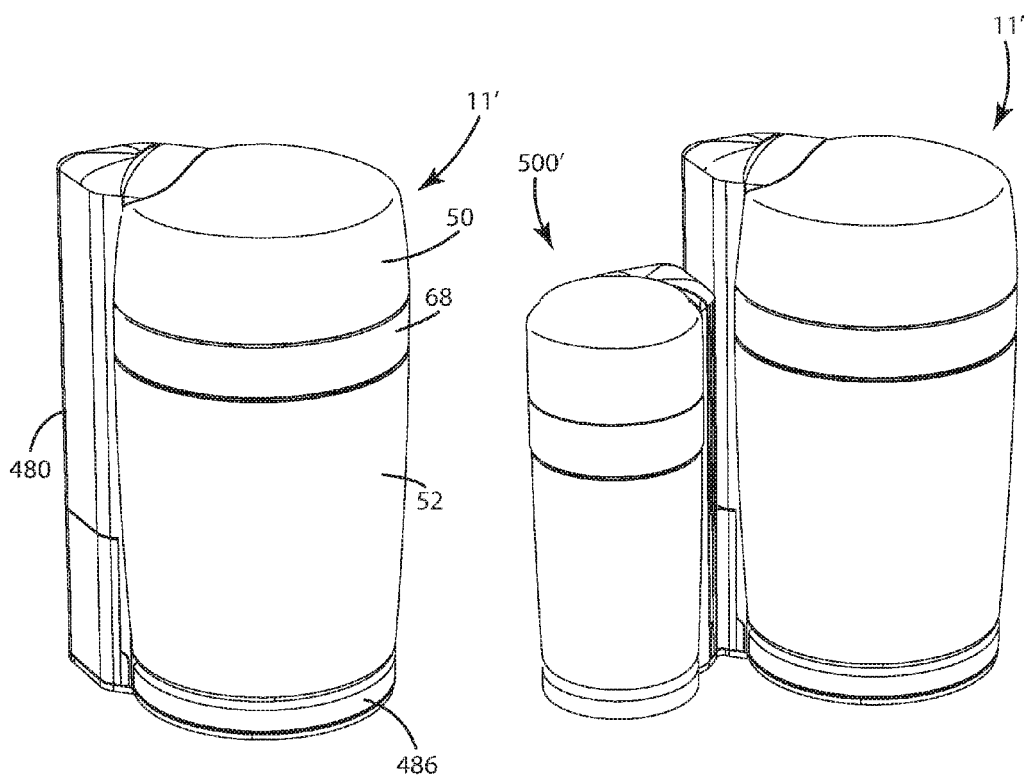

FIG. 19A-E show various alternative embodiments that include a water treatment system 11' and up to two auxiliary components. In the illustrated embodiment, the water treatment engine 11' and auxiliary components (e.g. auxiliary filter 500' and water dispenser 600) are configured to be interconnected at their rear shrouds. FIG. 19A shows a water treatment system 11' situated in stand 480 without any auxiliary components attached. FIG. 20A is a schematic representation showing one way of routing water lines through the water treatment system 11' of FIG. 19A. FIG. 19B shows the water treatment system 11' combined with an auxiliary filter 500'. With this arrangement, the auxiliary filter 500' may be arranged downstream from the water treatment system 11' to provide supplement post-treatment to the water (See schematic representation of FIG. 20A). Alternatively, the auxiliary filter 500' may be arranged upstream from the water treatment system 11' to provide supplemental pre-treatment to the water (See schematic representation of FIG. 20C). In both embodiments, the supply, return and power lines are routed through the rear shrouds. FIG. 19C shows the water treatment system 11' combined with two auxiliary filters 500a-b'. As shown in the schematic representation of FIG. 20F, one of the two auxiliary filters 500' may be connected upstream from the water treatment system 11' to provide pre-treatment and the other auxiliary filter 500' may be connected downstream from the water treatment system 11' to provide post-treatment. Although not shown, the auxiliary filters 500' may both be connected upstream or downstream to provide two stages of pre-treatment or two stages of post-treatment.

FIG. 19D shows the water treatment system 11' combined with a water dispenser 600. In addition to providing a water dispensing point, the water dispenser 600 may also include treatment components, such as a supplemental filter, or other auxiliary components, such as a water heater, a water cooler or a system for introducing additives into the water. FIG. 20E is a schematic representation showing a water dispenser 600 combined with a water treatment system 11'. In this embodiment, the water dispenser 600 is the only way to dispense water from the system. If desired, a fitting (e.g. a "Y" fitting) may be coupled to the treated outlet of the water treatment system 11' to allow treated water to be routed to the water dispenser 600 and to another component, such as an auxiliary faucet (not shown) mounted in a sink.

FIG. 19E shows the water treatment system 11' combined with a water dispenser 600 and an auxiliary filter 500'. In this embodiment, the auxiliary filter 500' is connected downstream from the water treatment system 11' and upstream from the water dispenser 600, as shown in the schematic representation of FIG. 20D. In this embodiment, the water dispenser 600 is the only way to dispense water from the system. As with the system shown in FIG. 19D, a fitting (e.g. a "Y" fitting) may be coupled to the treated outlet of the water treatment system 11' or the treated outlet of the auxiliary filter 500' to allow treated water to be routed to the water dispenser 600 and to another component, such as an auxiliary faucet (not shown) mounted in a sink.

Figure 22:
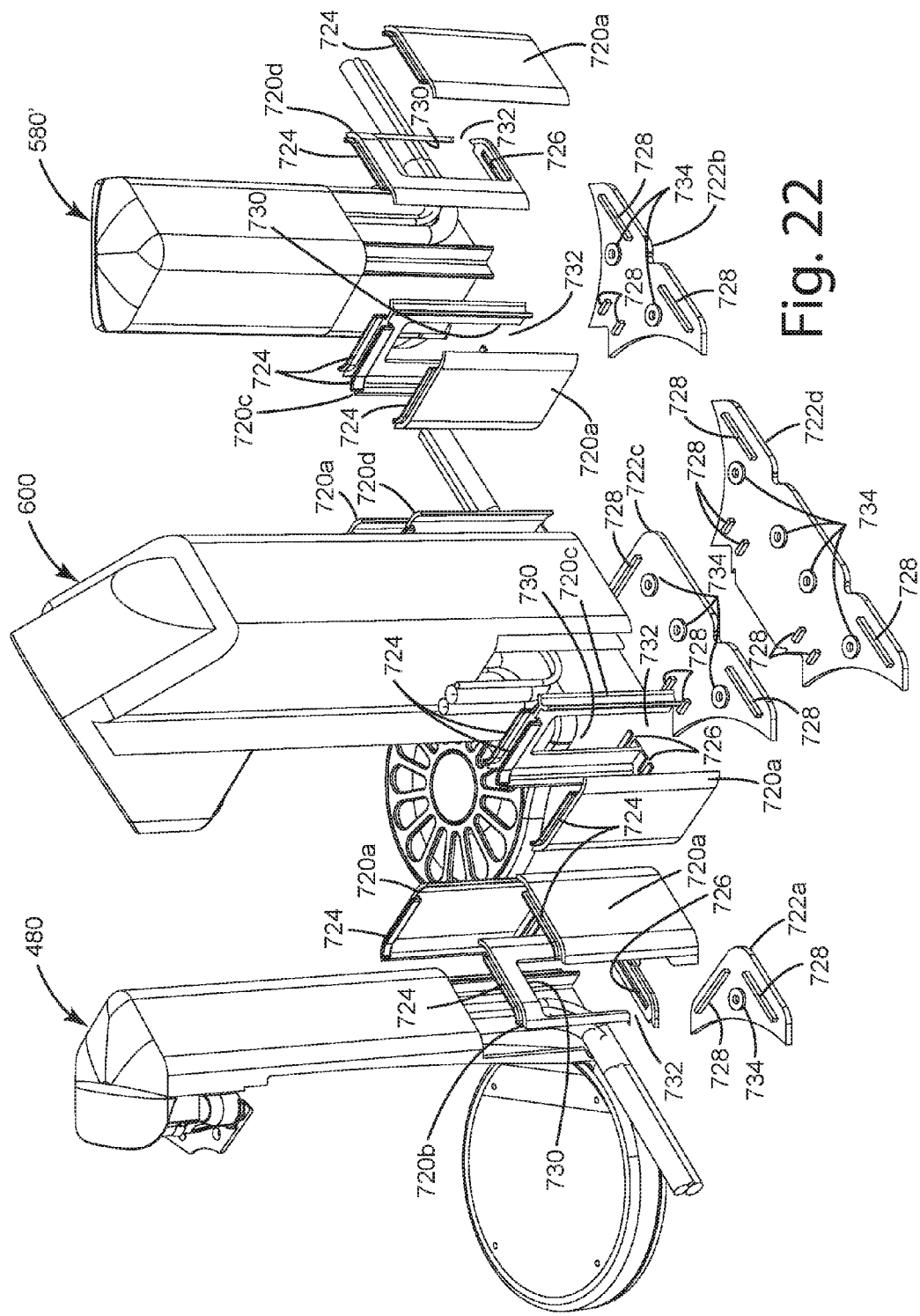
FIG. 22 is an exploded perspective view showing the stand for a water treatment system, a water dispense and an auxiliary filter.

In the embodiments shown in FIGS. 19A-E and 20A-F, the water treatment system 11' and the various auxiliary components (e.g. auxiliary filter 500, 500' and water dispenser 600) may be provided with interchangeable wall panels that selectively provide openings for routing water and power lines through the system. In the illustrated embodiment, the interchangeable wall panels are incorporated into the rear shrouds of the water treatment system 11' and the various auxiliary components. The rear shrouds may incorporated directly into the housings for the water treatment system 11 and the auxiliary components (e.g. auxiliary filter 500, 500' and water dispenser 600), or into accessories that are mounted to the rear of the components, such as stand 480 or a stand configured to receive an auxiliary component, such as auxiliary filter 500 or 500'. For example, FIG. 22 is an exploded view of a system including a water treatment system 11' (although just the stand 480 for water treatment system 11' is illustrated), water dispenser 600 and auxiliary filter 500' (although just a stand 580' for auxiliary filter 500' is illustrated), as well as a variety of alternative base plates 722a-d and alternative wall panels 720a-d. In this embodiment, the rear shroud of each component is provided with openings that are configured to receive interchangeable wall panels 720a-d. Wall panel 720a is a solid wall panel intended to fully close the corresponding portion of the rear shroud. The top end of the wall panel 720a includes a flange 724 intended to engage the rear shroud and the bottom end includes a slot 726 intended to engage a rib 728 in the base plate 722a-d (described below). Wall panel 720b is a pass-through wall panel having an opening 730 that allows water and power lines to be routed through the corresponding portion of the rear shroud. Wall panel 720b may define a narrow gap 732 that allows the water and power lines to be fitted into the opening 730 without the need to disconnect them. To provide additional options, a mirror-image version of wall panel 720b may be provided. The mirror-image version is shown in FIG. 22 as wall panel 720d, which includes opening 730 and gap 732. Wall panel 720c is a pass-through wall panel intended for use in joining adjacent components. Wall panel 720c includes an opening 730 that allows routing of water and power lines. The bottom of wall panel 720c may include a gap 732 that allows water and power lines to be fed into the opening 730 without disconnection. In this embodiment, the top end of wall panel 720c includes dual flanges 724 configured to engage the rear shrouds of adjacent components and the bottom end includes a dual slots 726 configured to engage corresponding ribs 728 in the base plate.

Further, the bottom of each shroud is configured to receive an interchangeable base plate 722a-d. In use, the base plates 722a-d bridge the combined components to provide interconnection and entrap the interchangeable wall panels 722a-d to secure them in place. In this embodiment, each base plate 722a-d includes one or more bosses 734 for securing the base plate to each of the combined components with a fastener (e.g. a screw). Each base plate 722a-d also includes a plurality of ribs 728 that interlock with corresponding slots 726 in the bottom of each wall panel 720a-d. Base plate 722a is intended for use when the water treatment system 11' is used alone without any additional components. Base plate 722b is intended for use when the water treatment system 11' is used in combination with an auxiliary filter 500 or 500'. This base plate 722b is ambidextrous in the sense that it allows the auxiliary filter 500 or 500' to be situated on either side of the water treatment system 11'. Base plate 720c is intended for use when the water treatment system 11' is used in combination with a water dispenser 600. Base plate 722c may be provided in both right-handed and left-handed versions to allow the water dispenser 600 to be situated on either side of the water treatment system 11'. Base plate 722d is intended for use when the water treatment system 11' is used in combination with a water dispenser 600 and an auxiliary filter 500 or 500'. Base plate 722d is ambidextrous in the sense that it allows the auxiliary filter 500 or 500' and the water treatment system 11' to be arranged on either side of the water dispenser 600. Although not shown, the system may also include an additional base plate that is intended for use when the water treatment system 11' is used in combination with two auxiliary filters 500 or 500'.

Figure 21D:
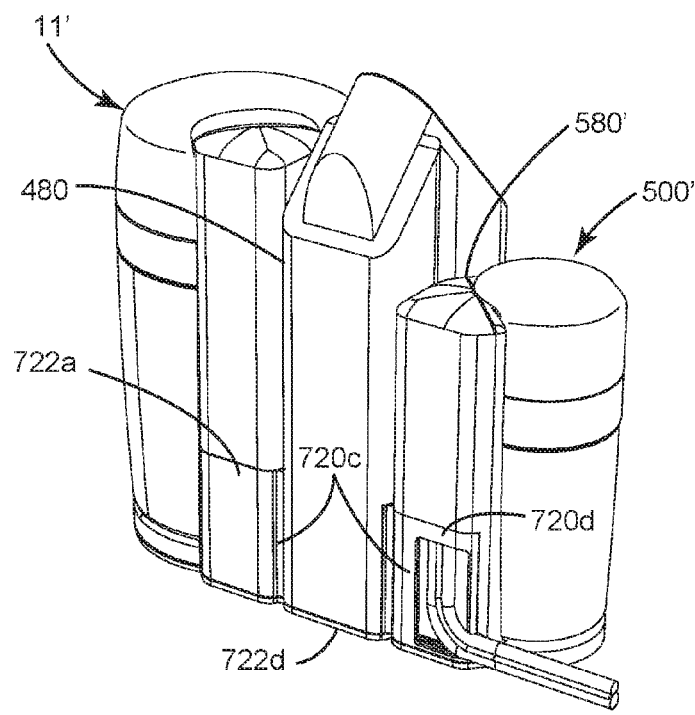
Figure 21E:
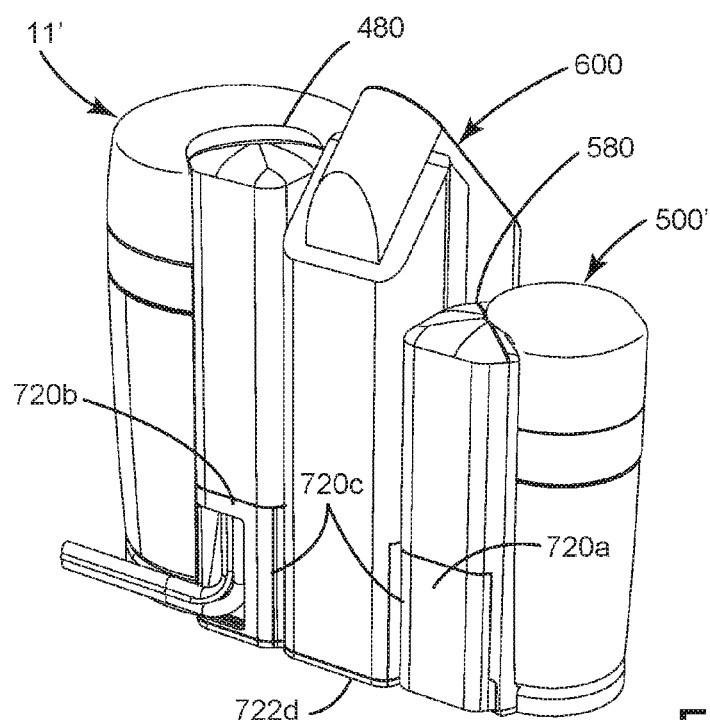

For example, FIGS. 21A-E show various alternative embodiments with different arrangements of wall panels 720a-d and base plates 722a-d. FIG. 21A shows a water treatment system 11' installed in the stand 480. In this embodiment, the rear shroud (e.g. upright portion) includes a solid interchangeable wall panel 720a and a pass-through interchangeable wall panel 720b. As can be seen, water and power lines can be routed into the stand 480 through the pass-through wall panel 720b. The water treatment system 11' is fitted with base plate 722a. FIG. 21B shows an alternative arrangement that includes a water treatment system 11' and an auxiliary filter 500'. In this embodiment, the water treatment system 11' includes a stand 480 that includes a solid wall panel 720a that is exposed and the auxiliary filter 500' includes a stand 580' that includes an exposed pass-through wall panel 720d through which water and power lines are routed into and out of the system. Additionally, a single interconnecting wall panel 720c is installed in the stand 480 and stand 580' where the two rear shrouds abut one another. The interconnecting wall panel 720c includes an opening that allows routing of water and power lines between the two adjacent components (e.g. the water treatment system 11 in the auxiliary filter 500'). The stand 480 and stand 580' are joined by base plate 722b. FIG. 21C shows a water treatment system 11' combined with a water dispenser 600. In this embodiment, the water treatment system stand 480 includes a solid wall panel 720a that is exposed and the water dispenser 600 includes an exposed pass-through wall panel 720d through which water and power lines are routed into and out of the system. Additionally, a single interconnecting wall panel 720c is installed in the stand 480 and the dispenser 600 where the two abut one another. The interconnecting wall panel 720c includes an opening that allows routing of water and power lines between the water treatment system 11' and the water dispenser 600. The stand 480 and dispenser 600 are joined by base plate 722c. FIG. 21D shows a water treatment system 11' combined with a water dispenser 600 and an auxiliary filter 500'. In this embodiment, the water treatment system stand 480 includes a solid wall panel 720a that is exposed and the auxiliary filter stand 580' includes an exposed pass-through wall panel 720d through which water and power lines are routed into and out of the system. Additionally, a first interconnecting wall panel 720c is installed in the stand 480 and the dispenser 600 where the two abut one another, and a second interconnecting wall panel 720c is installed in the dispenser 600 and the stand 580' where the two about one another. The stand 480, dispenser 600 and stand 580' are joined by base plate 722d. FIG. 21E shows an arrangement that is similar to the arrangement of FIG. 21D, except that water and power lines are routed into and out of the water treatment stand 480 rather than the auxiliary filter stand 580'. In this embodiment, the water treatment system stand 480 includes an exposed pass-through wall panel 720b and the auxiliary filter stand 580' includes an exposed solid wall panel 720a. Additionally, a first interconnecting wall panel 720c is installed in the stand 480 and the dispenser 600 where the two abut one another, and a second interconnecting wall panel 720c is installed in the dispenser 600 and the stand 580' where the two about one another. The stand 480, dispenser 600 and stand 580' are joined by base plate 722d.

Alternative Pressure Vessel.

Figure 27:
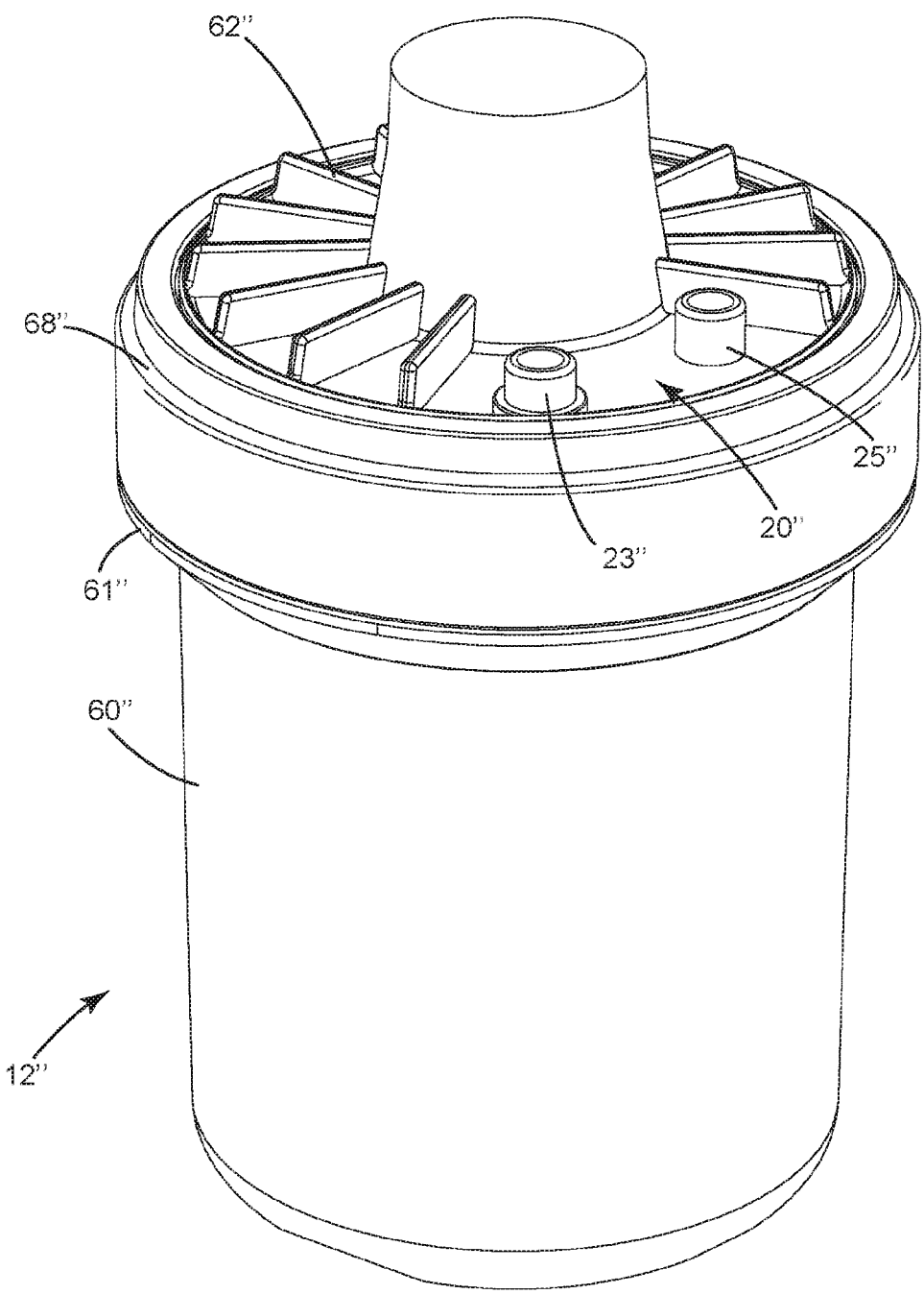
FIG. 27 is a perspective view of an alternative pressure vessel.
Figure 28:
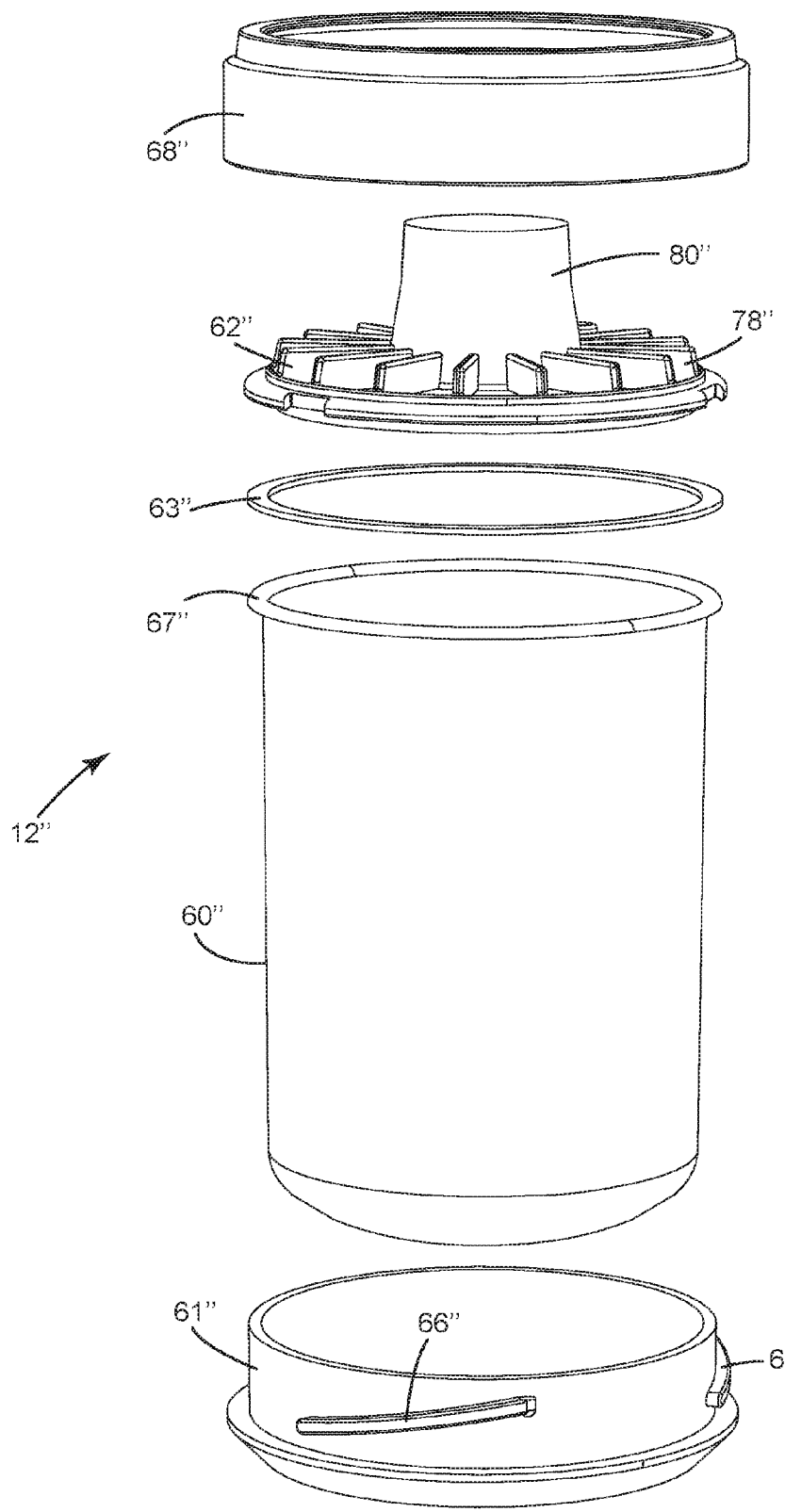
FIG. 28 is an exploded perspective view of the alternative pressure vessel.
Figure 29:
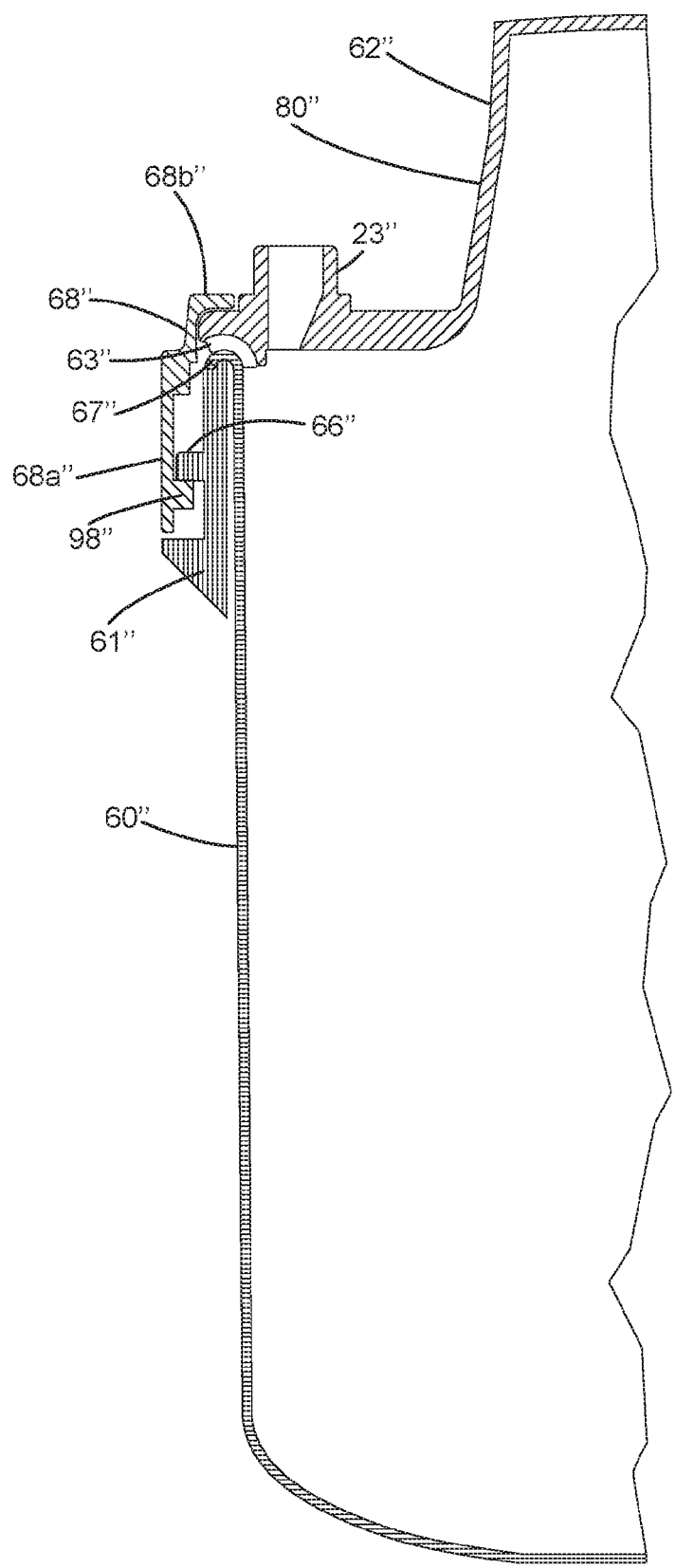
FIG. 29 is a sectional view of the alternative pressure vessel.
Figure 30A:
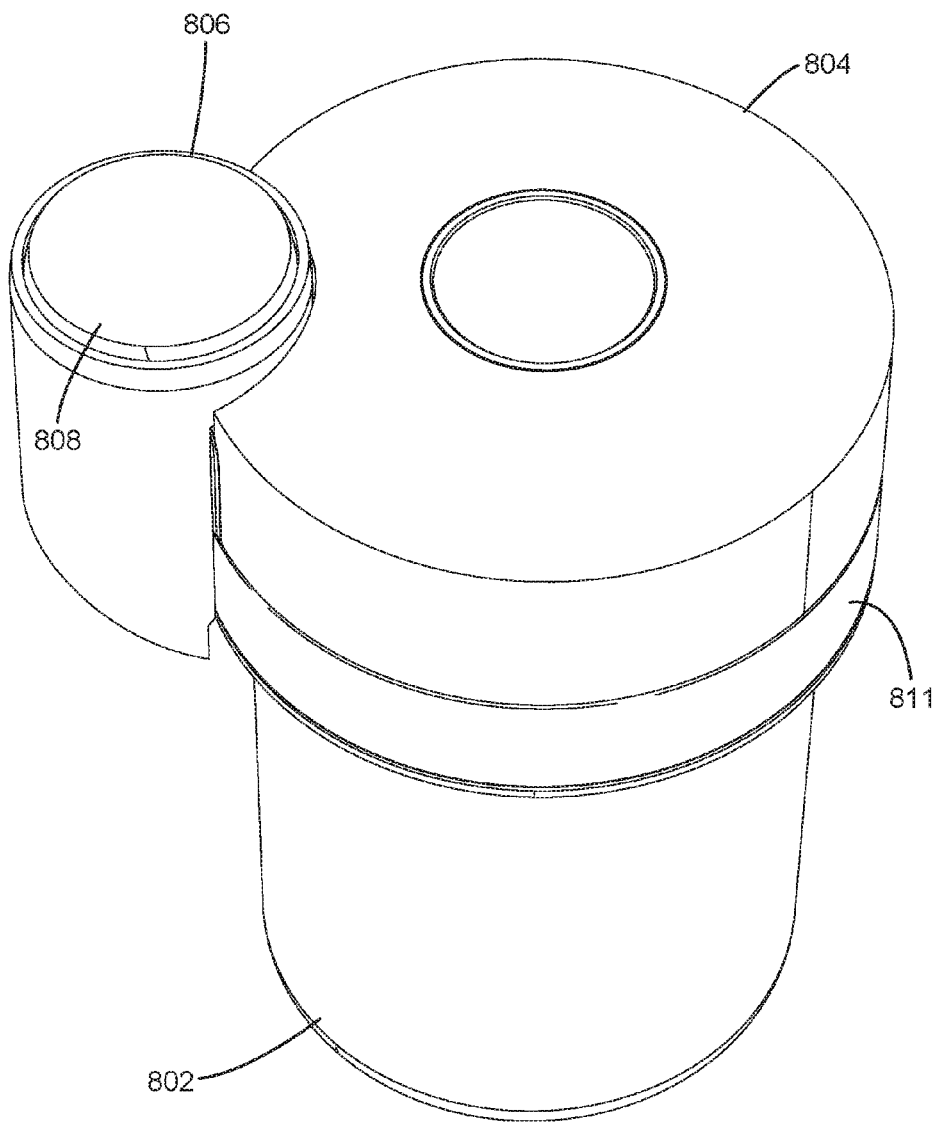
FIG. 30A-C are perspective views of an assembly including a first alternative tether.
Figure 30B:
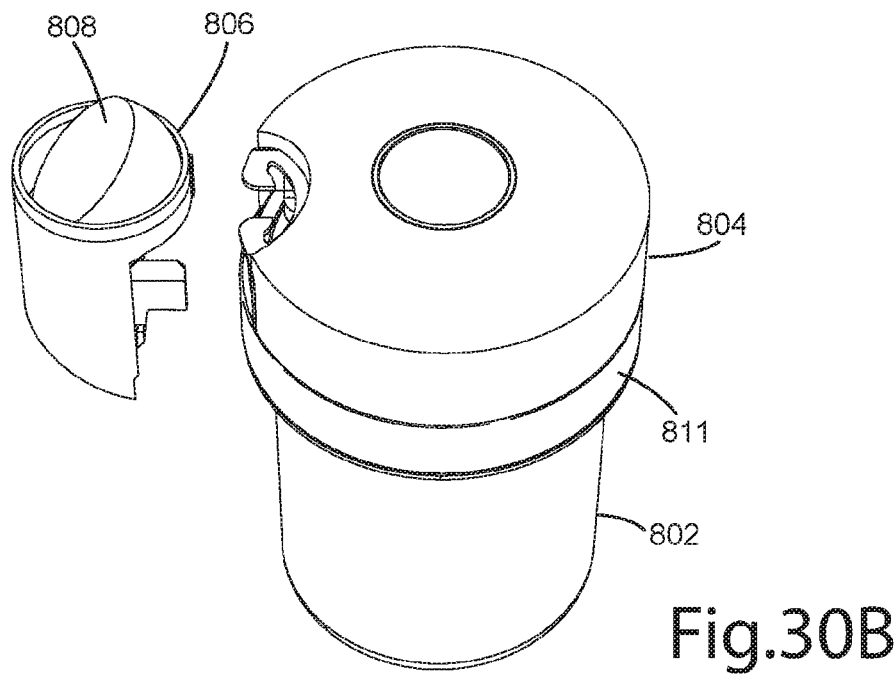
Figure 30C:
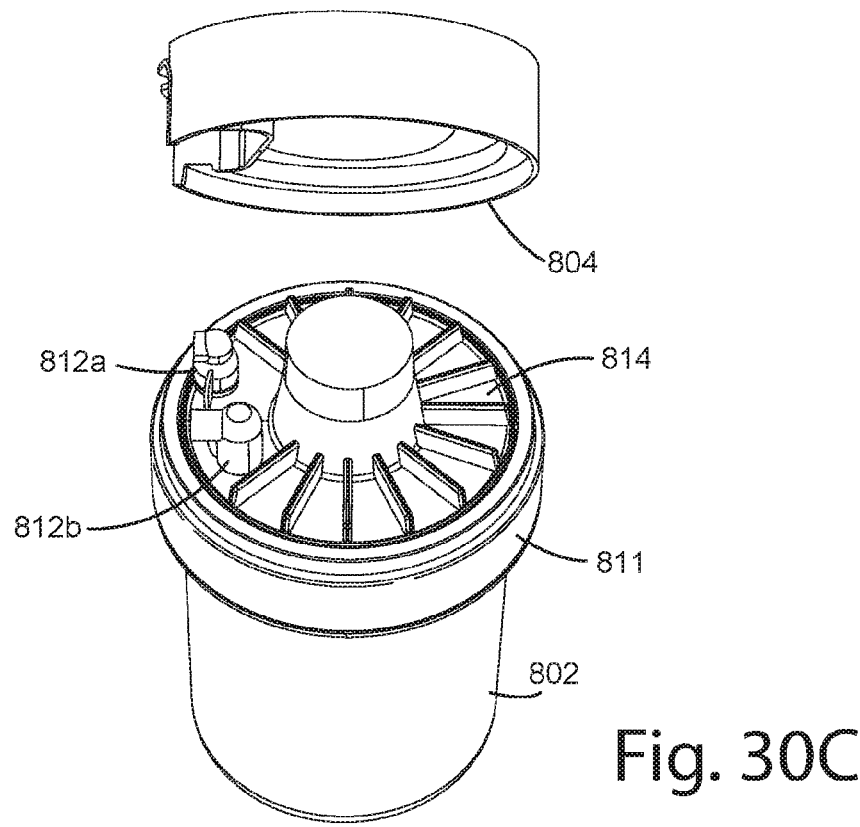
Figure 31:
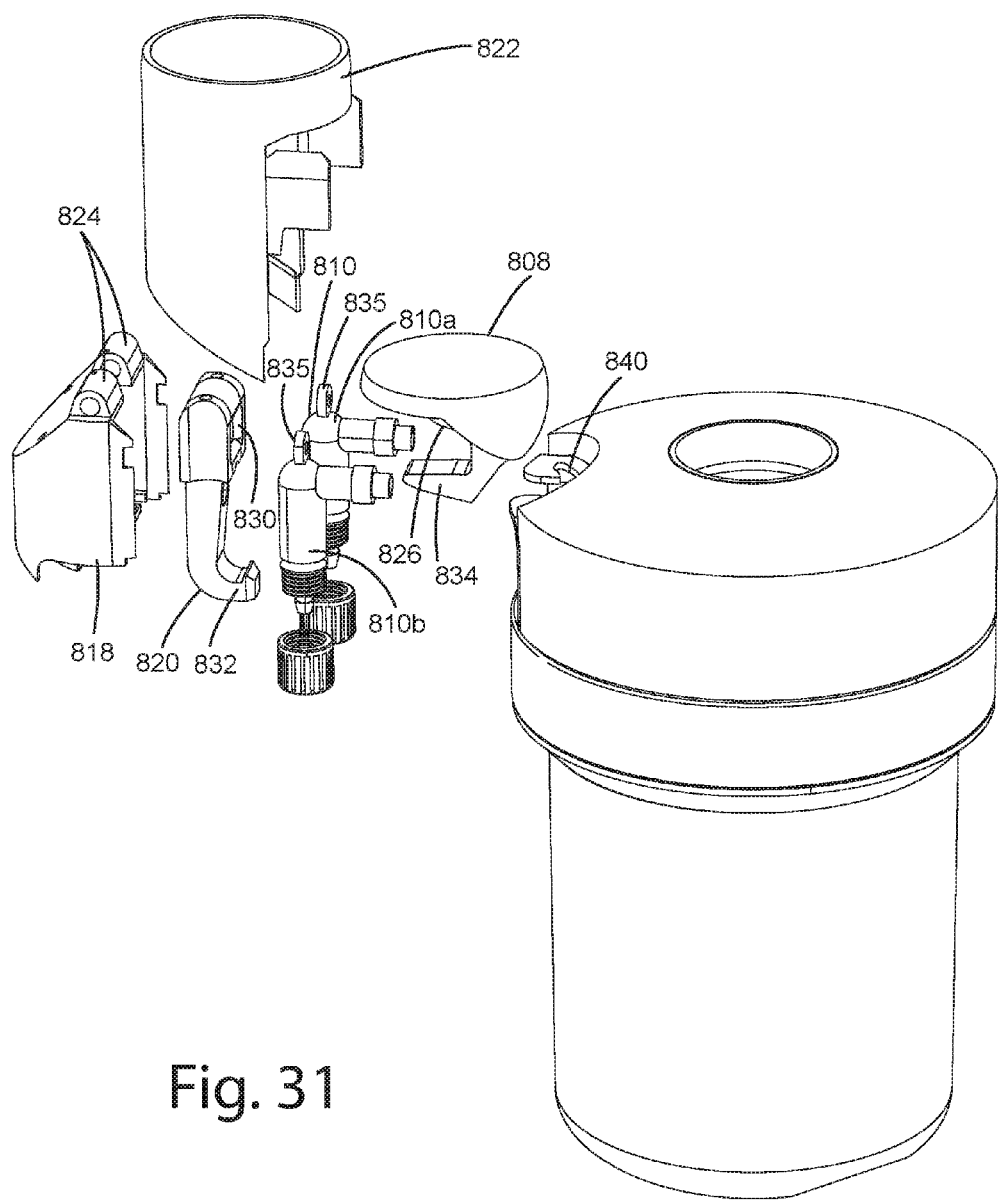
FIG. 31 is a partially exploded view of the assembly including the first alternative tether.

An alternative pressure vessel is shown in FIGS. 27-29. In this embodiment, the pressure vessel 12" generally includes a tank 60", a tank adapter 61", a manifold 62" and a collar 68" (See FIG. 28). The illustrated tank 60" is a generally cylindrical thin-walled structure with an open top and a closed, rounded bottom. As shown, the tank 60" of this embodiment is sized and shaped to receive a replaceable cartridge (such as replaceable cartridge 34), but the size and shape of the tank 60" may vary from application to application. In this embodiment, the tank 60" includes an integral flange 67" extending around the open top to interface with the manifold 62", the tank adapter 61" and the collar 68". The size and shape of the flange 67" may vary from application to application. In the illustrated embodiment, the tank 60" is manufactured from steel, for example, by stamping or hydroforming. However, the tank 60" may be manufactured from essentially any suitable alternative material, such as plastic or other metals, and any suitable alternative manufacturing method, such as injection molding or thermoforming.

The manifold 62" is configured to close the open end of the tank 60". The illustrated manifold 62" includes a generally disc shaped main body 78" and a central hub 80". The hub 80" may be provided to accommodate a UV lamp for treating water in the pressure vessel 12" with UV light. As shown, the manifold 62" is sized and shaped to engage with the flange 67". As perhaps best shown in FIG. 29, a seal 63" may be fitted between the manifold 62" and the flange 67" to provide a leaktight interface. In this embodiment, the manifold 62" is configured to provide a single connection point 20" for attaching a tether that carries the water and possibly power lines. For example, the manifold 62" includes a water inlet 23" and a water outlet 25" that are in close proximity to one another. Although not shown, a power connector may also be situated on the manifold 62" to facilitate electrical connections for the electronics module.

As noted above, the pressure vessel 12" includes structure for securing the manifold 62" to the tank 60". In this embodiment, this structural generally includes a tank adapter 61" and collar 68", which close on the manifold 62" and the tank 60" from opposite sides. The illustrated tank adapter 61" is an annular structure that can be fitted about the tank 60" and brought into engagement with the flange 67". The tank adapter 61" extends circumferentially around the tank 60" and provides a mating structure for intersecuring the tank adapter 61" and the collar 68". In this embodiment, the mating structure includes one or more external threads 66" that can be interfitted with corresponding internal threads 98" on the inside of the collar 68". The mating structure may, however, vary from application to application.

The collar 68" is fitted over the manifold and is configured to be intersecured to the tank adapter 61". In this embodiment, the collar 68" generally includes a vertical wall 68a" and a horizontal flange 68b". The vertical wall 68a" is configured to fit about the upper end of the tank 60" and includes internal threads 98" that are configured to rapidly interact with the external threads 66" on the tank adapter 61". The horizontal flange 68b" extends inwardly from the top edge of the vertical wall 68a" and is configured to engage in the upper surface of the manifold 62" around its perimeter. In use, the collar 68" and tank adapter 61" interact to compress the seal 63" between the manifold 62" and the tank flange 67".

The alternative pressure vessel 12" may be incorporated into essentially any of the alternative water treatment systems discussed herein. In some applications, various features of the pressure vessel 12" may need to be modified to facilitate incorporation into a specific water treatment system. For example, the locations, size and configuration of the supply inlet 23" and treated water outlet 25" in the manifold 62" may be modified to correspond with the desire tether, electronics module and housing combination. As with other embodiments discussed above, the pressure vessel 12" may be contained within an outer housing or outer shroud. In applications that include an outer housing or outer shroud, the collar 68" may be exposed or may be hidden within an outer housing or outer shroud.

Alternative Tether Arrangements.

As discussed above, a water treatment system in accordance with an embodiment of the present invention may include a tether that provides a single connection for attaching water and power lines to the pressure vessel. The use of a tether may simplify connection and disconnection of the water treatment system to the water supply line, the treated water return line and to a source of electrical power. In some applications, the tether may only incorporate connections for the water lines. For example, there may be no electrical connections in application that involve a water treatment system that does not require electrical power, or when electrical power is provided to the water treatment system using a wireless power supply or a power cord separate from the tether.

The design and configuration of the tether may vary from application to application. To illustrate, several exemplary tethers are described in the following paragraphs. In each of these embodiments, the tether is described in the context of a pressure vessel that is generally identical to pressure vessel 12" described above. As shown and described, the design and configuration of select components of the water treatment system may be customized to interface with the tether. For example, the manifold, collar and/or electronics module may be specially configured to support and/or interlock with the tether.

An alternative tether 806 is shown in FIGS. 30A-34. FIGS. 30A-34 show an assembly having a pressure vessel 802, an electronics module 804 and a tether 806. In this embodiment, the tether 806 includes a prominent button 808 that is manually actuated by the user to lock or release the tether 806. As described in more detail below, movement of the button 808 into the locking position interconnects the tether 806 with the electronics module 804 and the collar 811. Further, the prominent button 808 provides an easily recognizable visual indication of the position of the button 808. In the illustrated embodiment, the tether 806 generally includes tether frame 818, a collar hook 820, a connector assembly 810, the button 808 and a tether housing 822. The tether frame 818 provides the primary structural component of the tether 806. The tether frame 818 includes axle segments 824 that are configured to pivotally receive the button 808 as described in more detail below. The tether frame 818 also include screw bosses 828 configured to receive screws for attaching the connector assembly 810 to the tether frame 818 (See FIG. 33). Although FIG. 33 only shows one screw boss 828, the tether frame 818 of the illustrated embodiment includes two screw bosses 828 aligned with mounting tabs 835 of connector assembly 810 (described below).

In the illustrated embodiment, the collar hook 820 is a movable component that is configured to assist in securing the tether 806 by selectively engaging with the collar 811. As shown, the collar hook 820 of this embodiment is disposed between tether frame 818 and the connector assembly 810, and is vertically movable to selectively engage and disengage with collar 811. The illustrated collar hook 820 is a vertically-extending structure with a central opening 830 and a catch 832. The central opening 830 is configured to receive a finger 834 extending from the button 808. The finger 834 is configured so that movement of the button 808 between the locked and released positions results in vertical movement of the collar hook 820 within the tether 806. The catch 832 is shaped to mate with the bottom edge of the collar 811 when the collar hook 820 is lifted by movement of the button 808 into the locked position.

The connector assembly 810 provides the water flow paths for water entering the system and treated water exiting the system. In this embodiment, the connector assembly 810 includes two L-shaped water connectors 810a and 810b. The water connectors 810a-b may be combined as a single component or may be separate components. The water supply line is connected to one end of water connector 810a and the treated water return line is connected to one end of water connector 810b. The opposite ends of the water connectors 810a-b are configured to be interfitted with the water inlet 812a and the water outlet 812b, respectively, in the manifold 814. In this embodiment, the water inlet 812a and water outlet 812b extend horizontally such that the water connectors 810a-b are installed by moving the tether 806 in a horizontal direction. Opposite ends of the water connectors 810a-b may include essentially any fittings or other leaktight connecting structure. For example, the water connectors 810a-b may include threaded fittings, compression fitting, friction fittings or any other fittings or connections suitable for the application. The connector assembly 810 also includes a pair of mounting tabs 835 that allow the connector assembly 810 to be secured to the tether frame 818 by screws.

Figure 32:
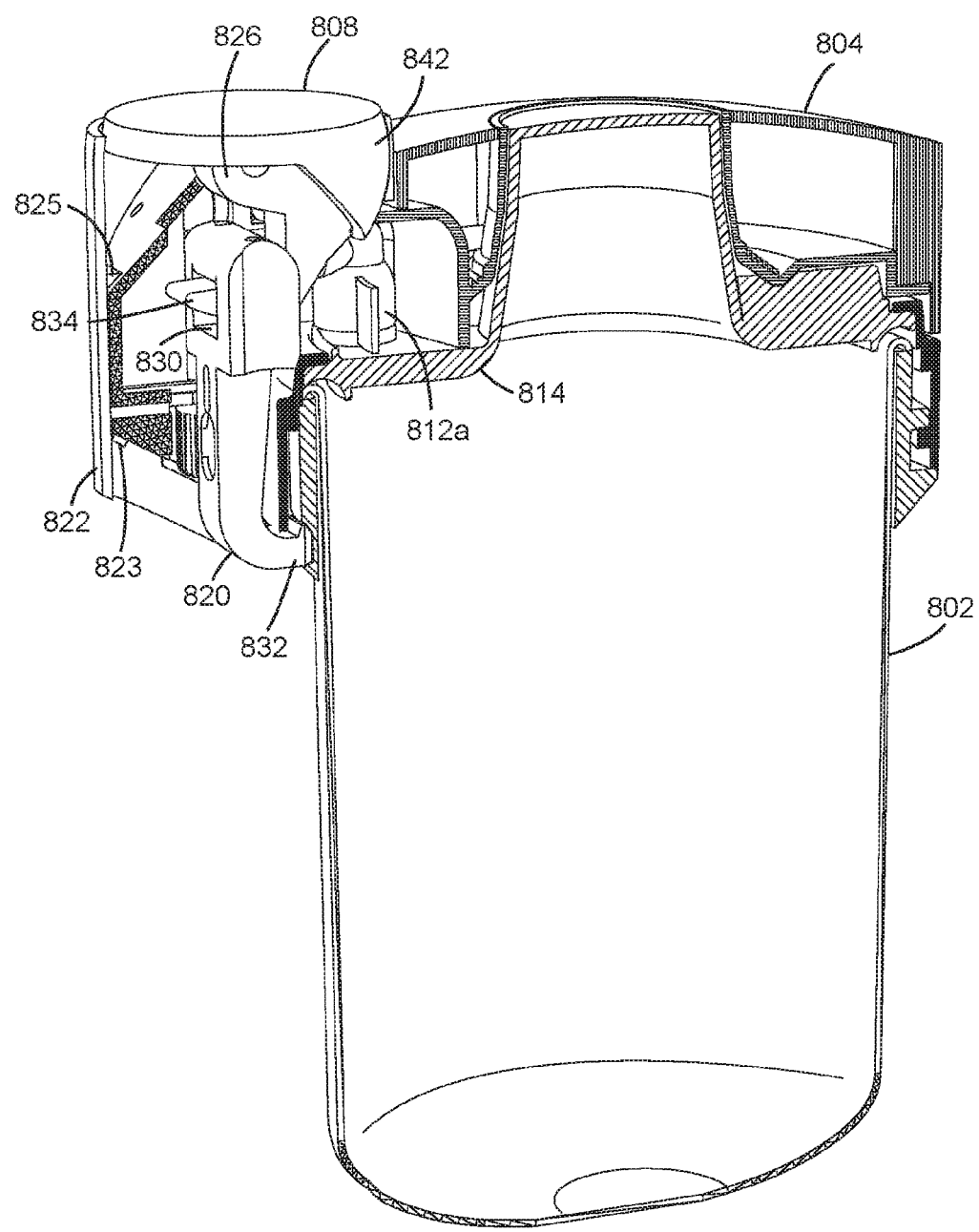
FIG. 32 is a sectional view of the assembly including the first alternative tether with the button in the locked position and showing the finger engaged with the collar hook.
Figure 33:
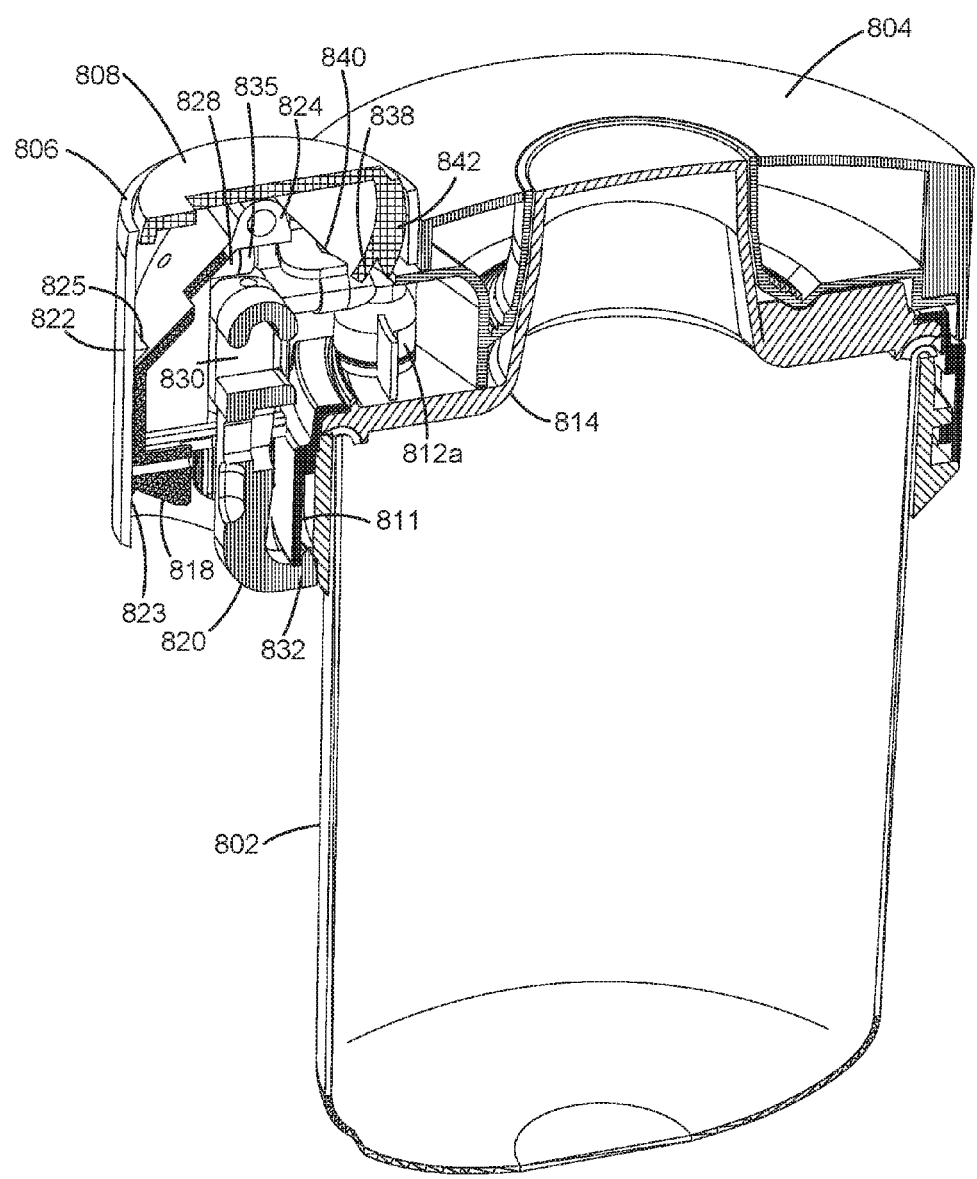
FIG. 33 is a sectional view of the assembly including the first alternative tether with the button in the locked position and showing the inner skirt engaged with the electronics module.
Figure 34:
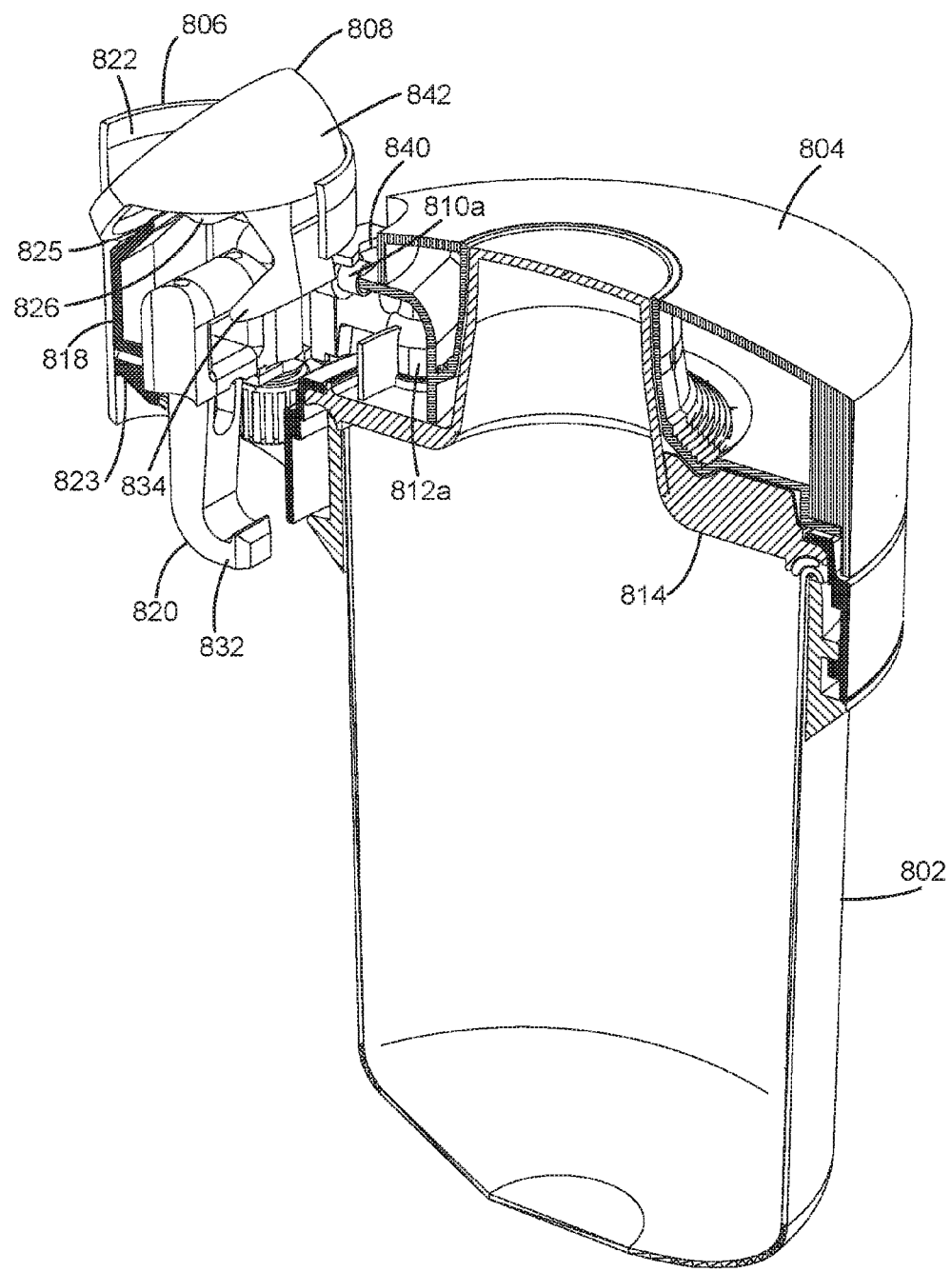
FIG. 34 is a partially exploded sectional view of the assembly including the first alternative tether with the button in the released position and the tether moved away from the pressure vessel

The tether 806 includes a tether housing 822 that encloses a majority of the tether components. In this embodiment, the tether housing 822 is fitted about the tether frame 818, collar hook 820, connector assembly 810 and button 808. The tether housing 822 may be snap-fitted into place on the tether frame 818. For example, as shown in FIGS. 32-34, the tether housing 822 may include protrusions 823 and 825 that snap-fit about the tether frame 818. In this embodiment, the top edge of the tether housing 822 is open to expose the button 808. The open upper edge of the tether housing 822 may extend parallel to the top surface of the button 808 when the button 808 is in the locked position and be significantly askew to the top surface of the button 808 when in the released position.

In the illustrated embodiment, the tether 806 includes a prominent, exposed button 808 that is actuated to lock and release the tether 806. When in the locked position, the tether 806 is engaged with the electronics module 804 and the collar 811 (See FIGS. 32 and 33). The button 808 of this embodiment includes an axle segment 826 on its bottom surface that is configured to mate with the axle segments 824 on the tether frame 818. In this embodiment, the axle segments 824 and 826 are configured to snap-lock together. However, this arrangement may be replaced by other structure that allows appropriate movement of the button 808. When installed, the button 808 is capable of being manually pivoted with respect to the tether frame 818 between locked and released positions. In this embodiment, the button includes an inner skirt 838 that is configured to selectively engage with a corresponding opening 840 in the electronics module 804 when the button 808 is in the locked position. As shown in FIG. 33, the inner skirt 838 is closely received in opening 840 when the button 808 is locked. The inner skirt 838 may be replaced by other structures capable of mechanically interacting with the opening 840. The button 808 of this embodiment also includes an outer skirt 842 that is configured to fill the space between the button 808 and the tether housing 822 throughout the range of motion of the button 808 (See FIGS. 32 and 34). The button 808 includes a finger 834 that is interfitted with the collar hook 820. The finger 834 is configured to lift the collar hook 820 when the button 808 is moved into the locked position and to lower the collar hook 820 when the button 808 is moved into the released positioned. In operation, movement of the button 808 into the locked position causes the inner skirt 838 to interlock with the opening 840 in the electronics module 804 and the catch 832 of the collar hook 820 to interlock with the collar 811. Collectively, these interlocking connections secure the tether 806 to the water treatment system.

In alternative embodiments, the tether may be configured so that it can only be installed and removed when the electronics module is not present on the pressure vessel. In use, this may help to prevent the electronics module from being exposed to potentially harmful water. For example, FIGS. 35-39 show an alternative embodiment having a pressure vessel 902, an electronics module 904 mounted atop the pressure vessel 902 and a tether 906 that is generally hidden beneath the electronics module 904. In this embodiment, the tether 906 generally includes a connector assembly 908, a pair of pivots 910a-b, an elbow 912, a tether head 914 and a tether housing 916. The connector assembly 908 includes two water connectors 908a and 908b that provide a mechanism for securing supply and return water lines to the tether 906. The connectors 908a-b may include essentially any fittings or other leaktight connecting structure. For example, the water connectors 908a-b may include threaded fittings, compression fitting, friction fittings or any other fittings or connections suitable for the application. In this embodiment, the tether 906 is configured to be fitted to a keyway 918 on the collar 911. Accordingly, the connector assembly 908 includes a key 920 that is configured to be fitted into the keyway 918 through an upward, vertical sliding motion. The key 920 and keyway 918 may include snaps or other integral features to help retain them in the interfitted position. The connector assembly 908 of this embodiment also includes a mounting tab 922 for securing the connector assembly 908 to the tether housing 916 by a screw 923. The connector assembly 908 also includes a pair of pivot seats 924a-b that are in fluid communication with the water connectors 908a-b. The pivot seats 924a-b are configured to securely receive the pivots 910a-b in a leaktight manner. For example, the pivot 910a-b may be secured within the pivot seats 924a-b by epoxy or other adhesives. As another example, the pivot seats 924a-b and pivot 910a-b may be provided with interlocking structure that allow them to be snap-fitted into leaktight, interlocking relationship.

Figure 35:
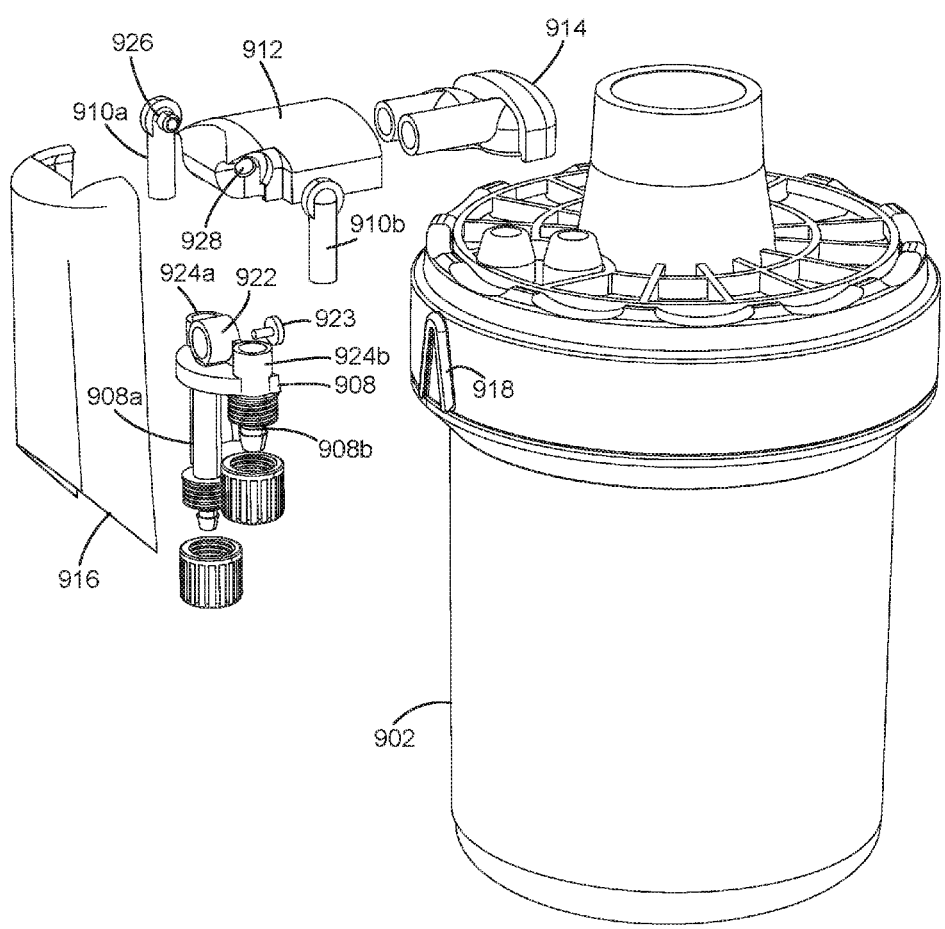
FIG. 35 is a partially exploded perspective view of an assembly including a second alternative tether.
Figure 36:
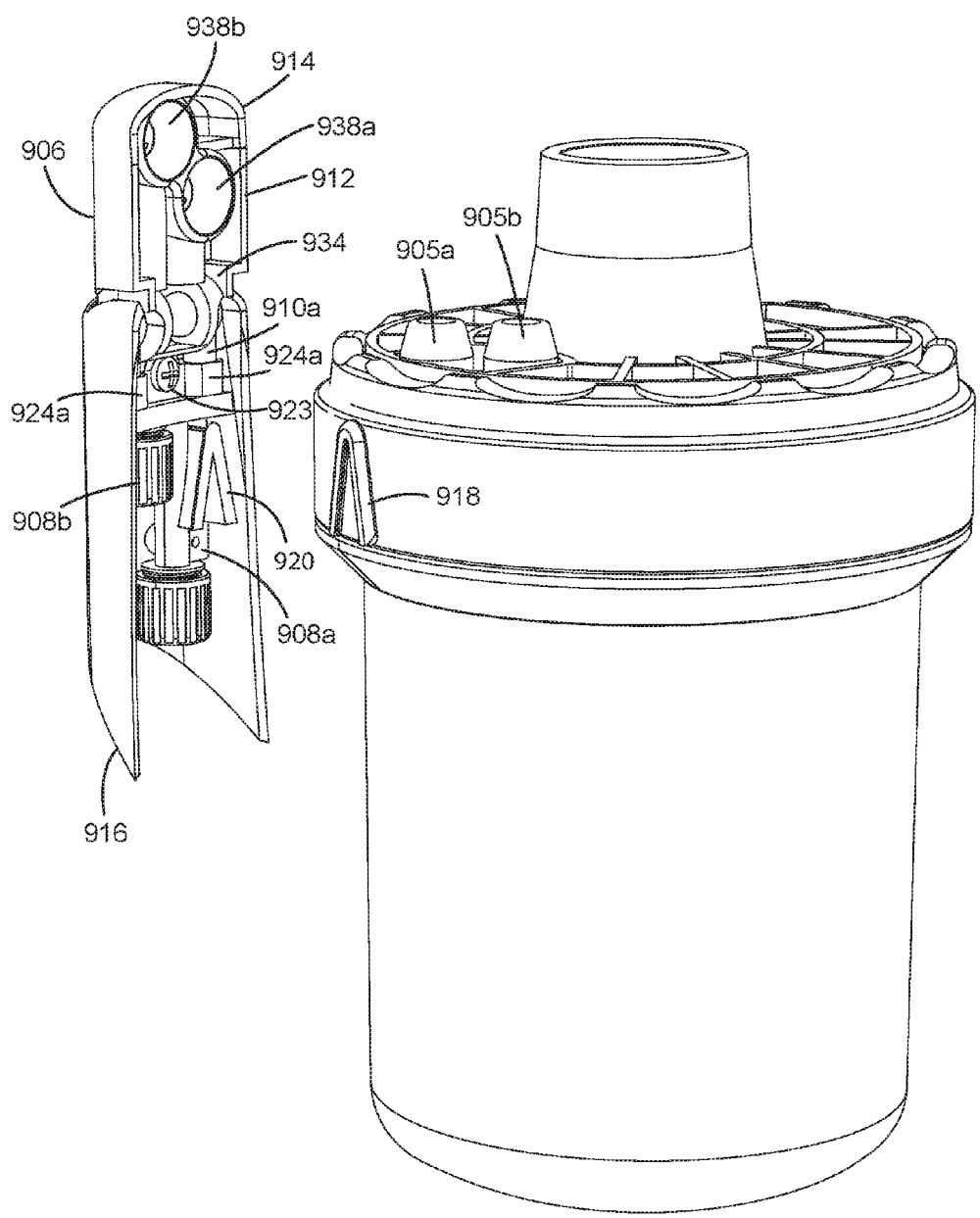
FIG. 36 is a partially exploded perspective view of an assembly including the second alternative tether.
Figure 37:
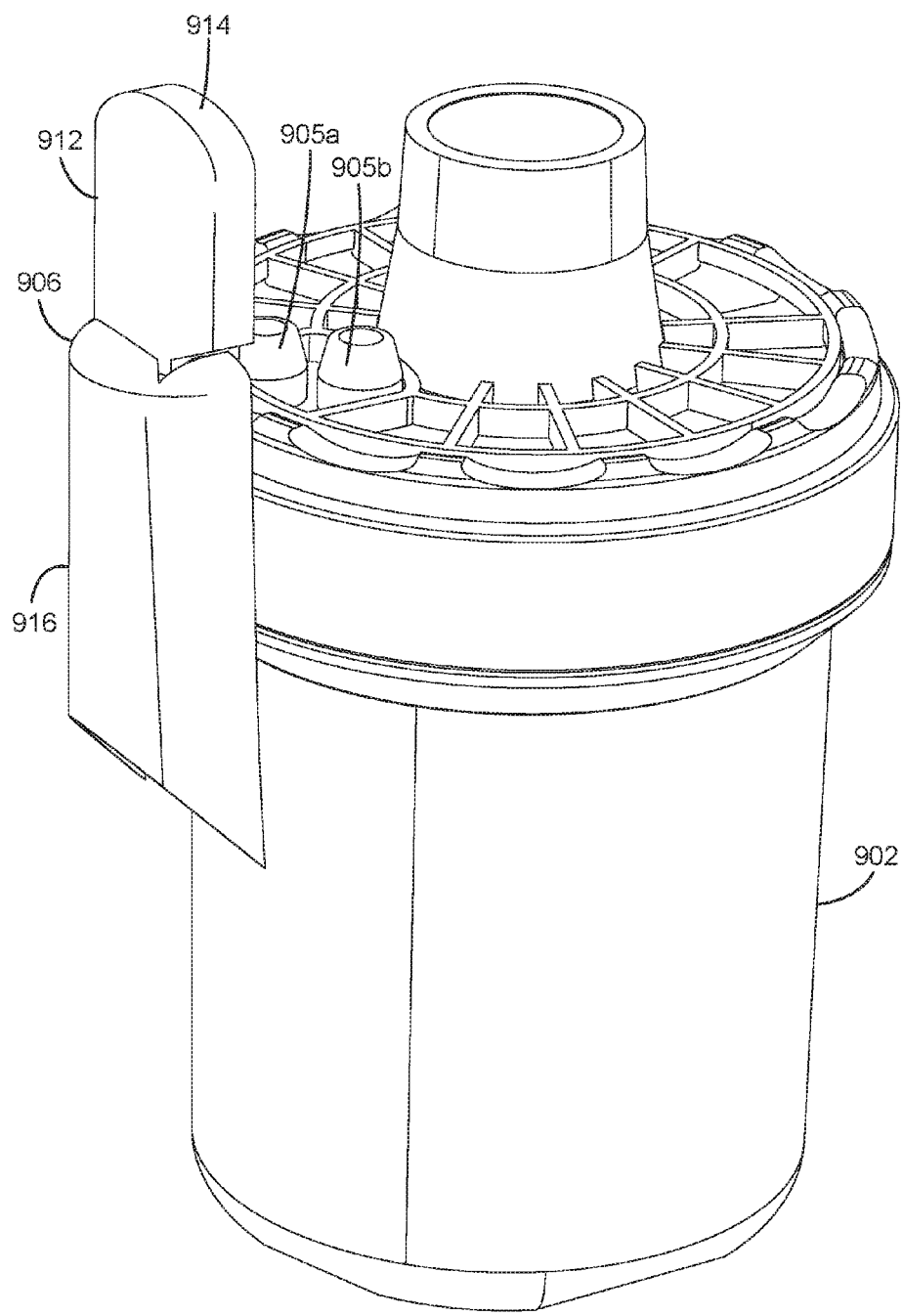
FIG. 37 is a perspective view of an assembly including the second alternative tether partially installed.
Figure 38:
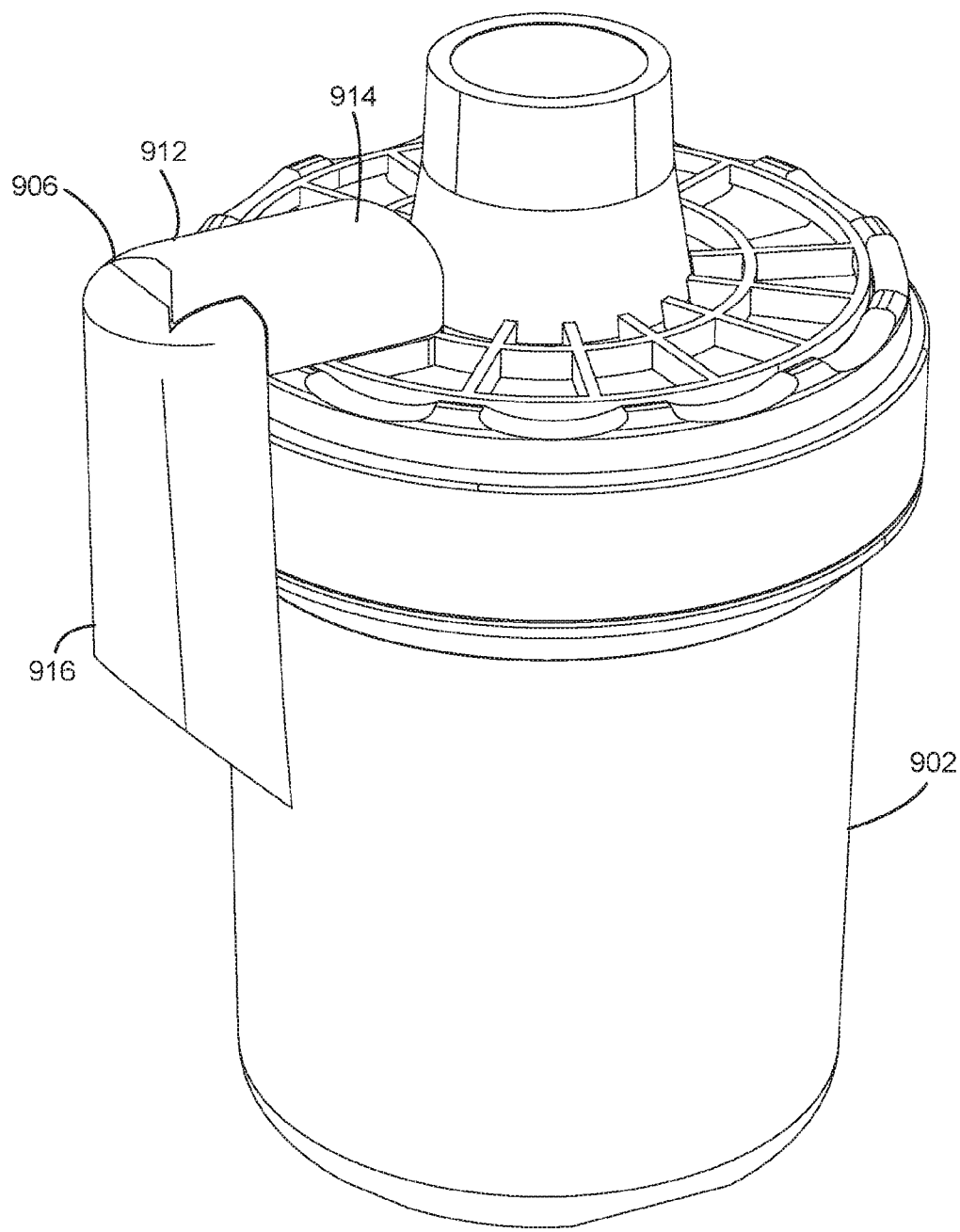
FIG. 38 is a perspective view of an assembly including the second alternative tether fully installed.
Figure 39:
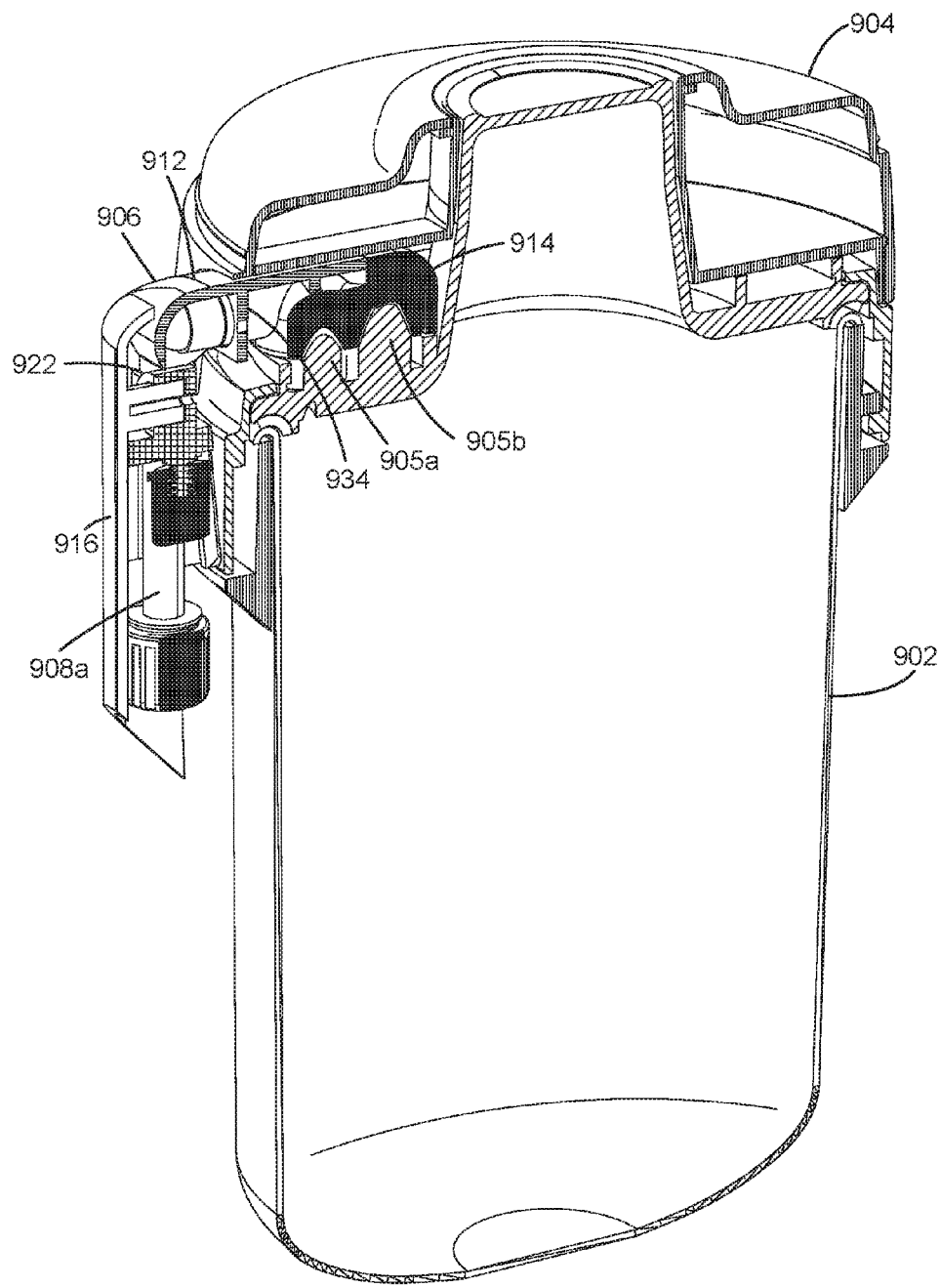
FIG. 39 is a sectional perspective view of an assembly including the second alternative tether
Figure 40A:
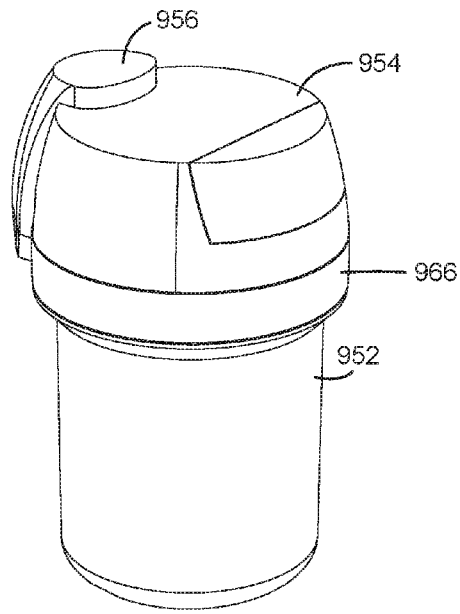
FIG. 40A-C are perspective views of an assembly including a third alternative tether.
Figure 40B:
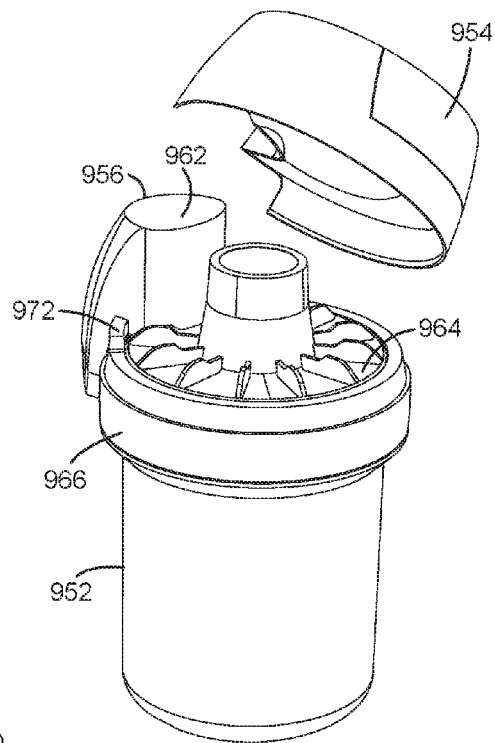
Figure 40C:
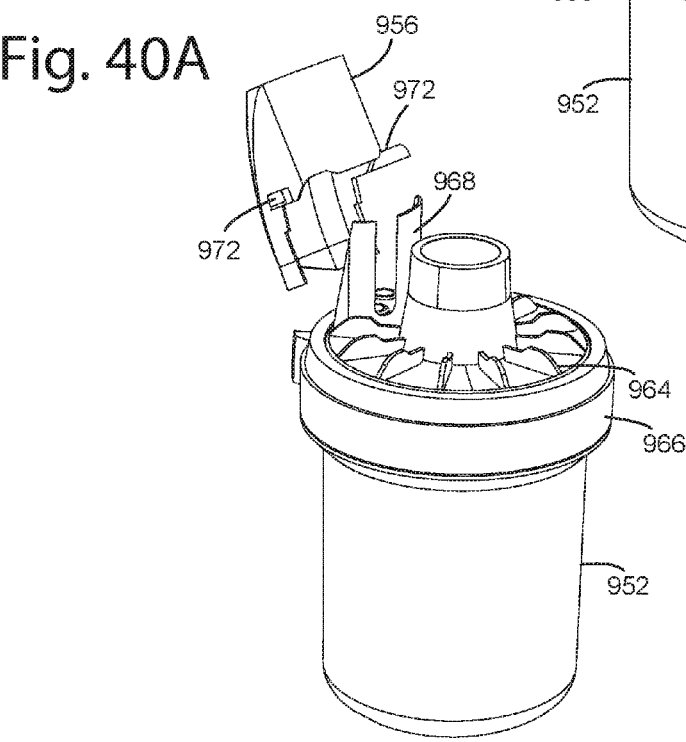
Figure 41:
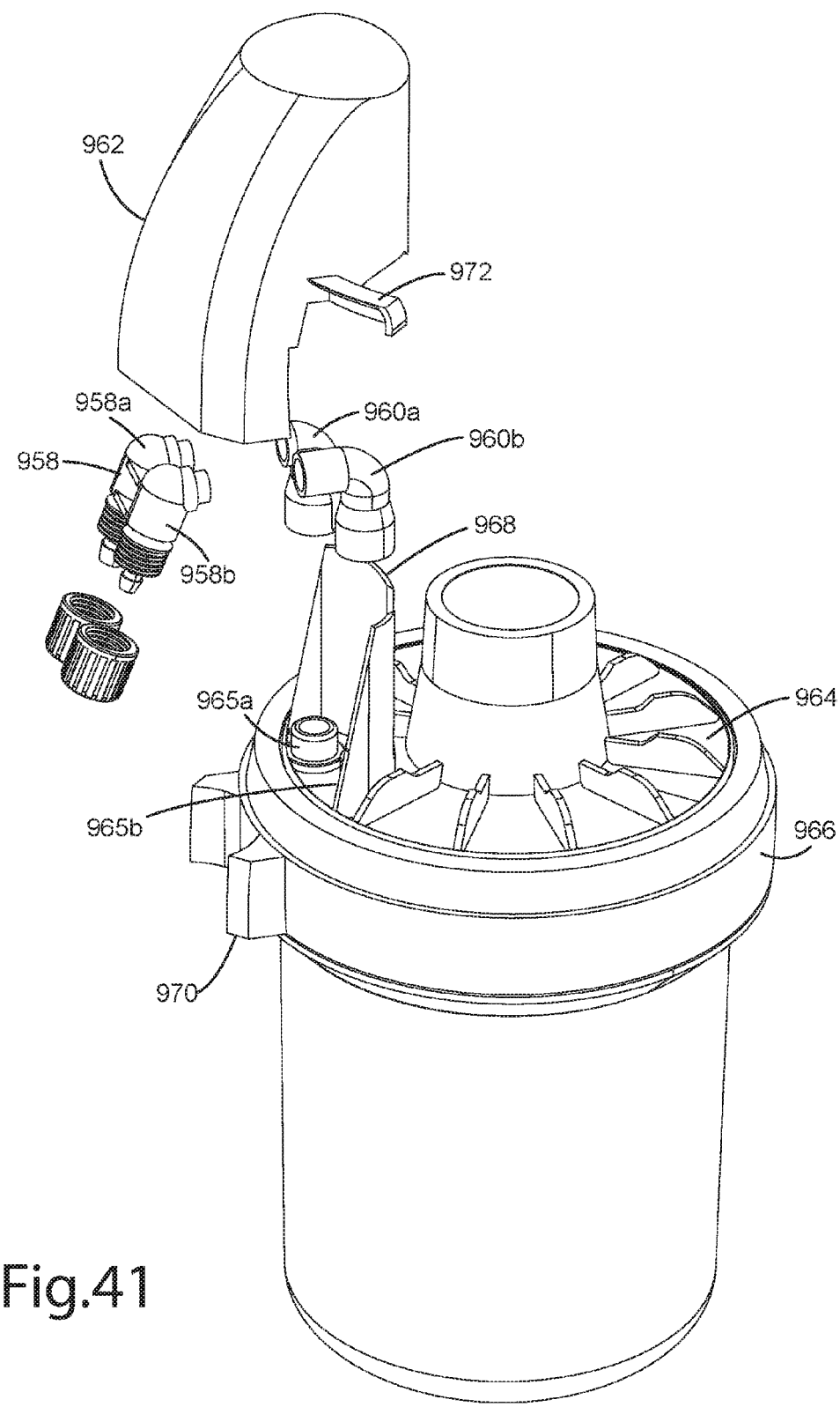
FIG. 41 is a partially exploded perspective view of the assembly including the third alternative tether.
Figure 42:
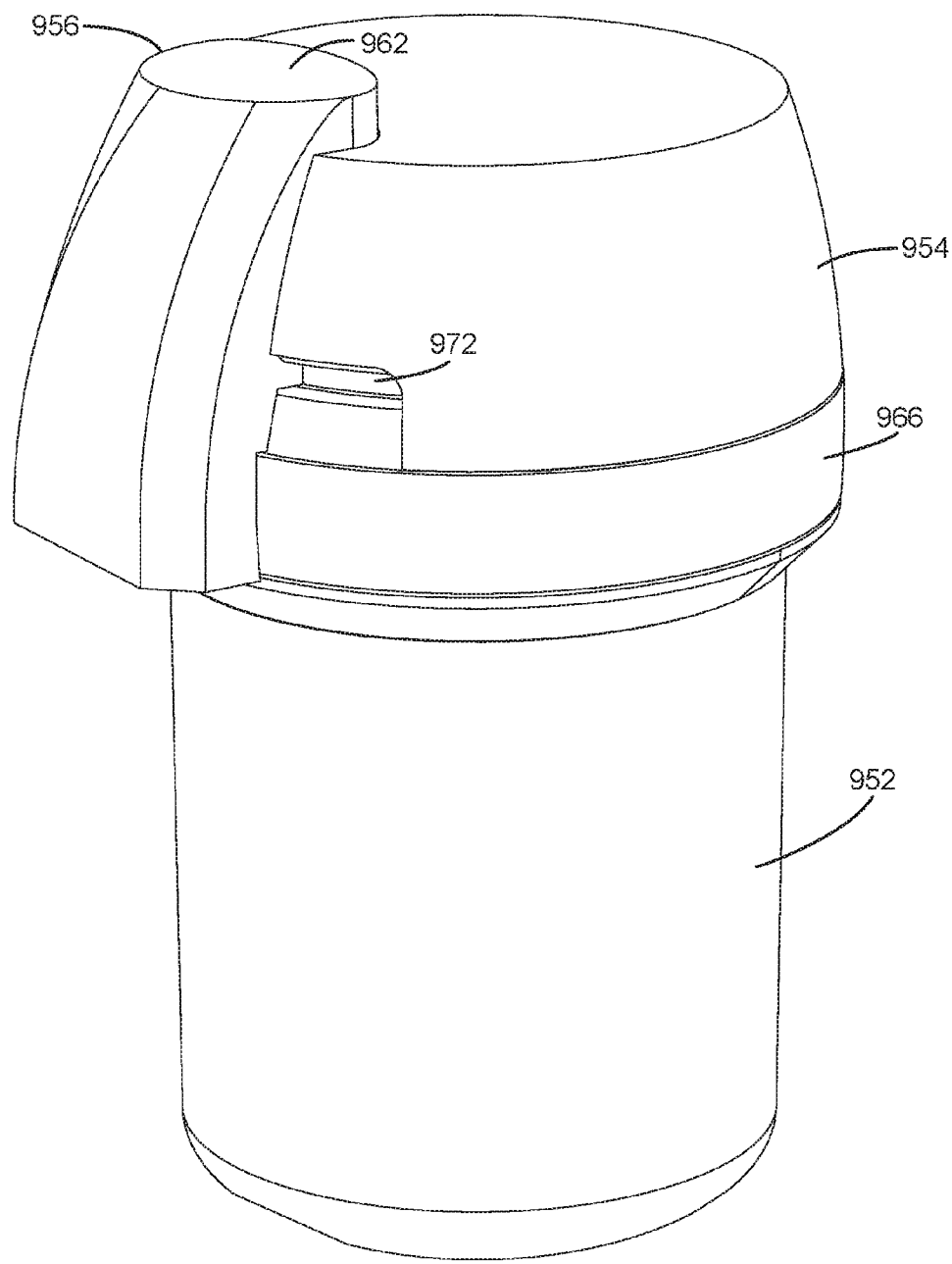
FIG. 42 is a perspective view of the assembly including the third alternative tether.
Figure 43:
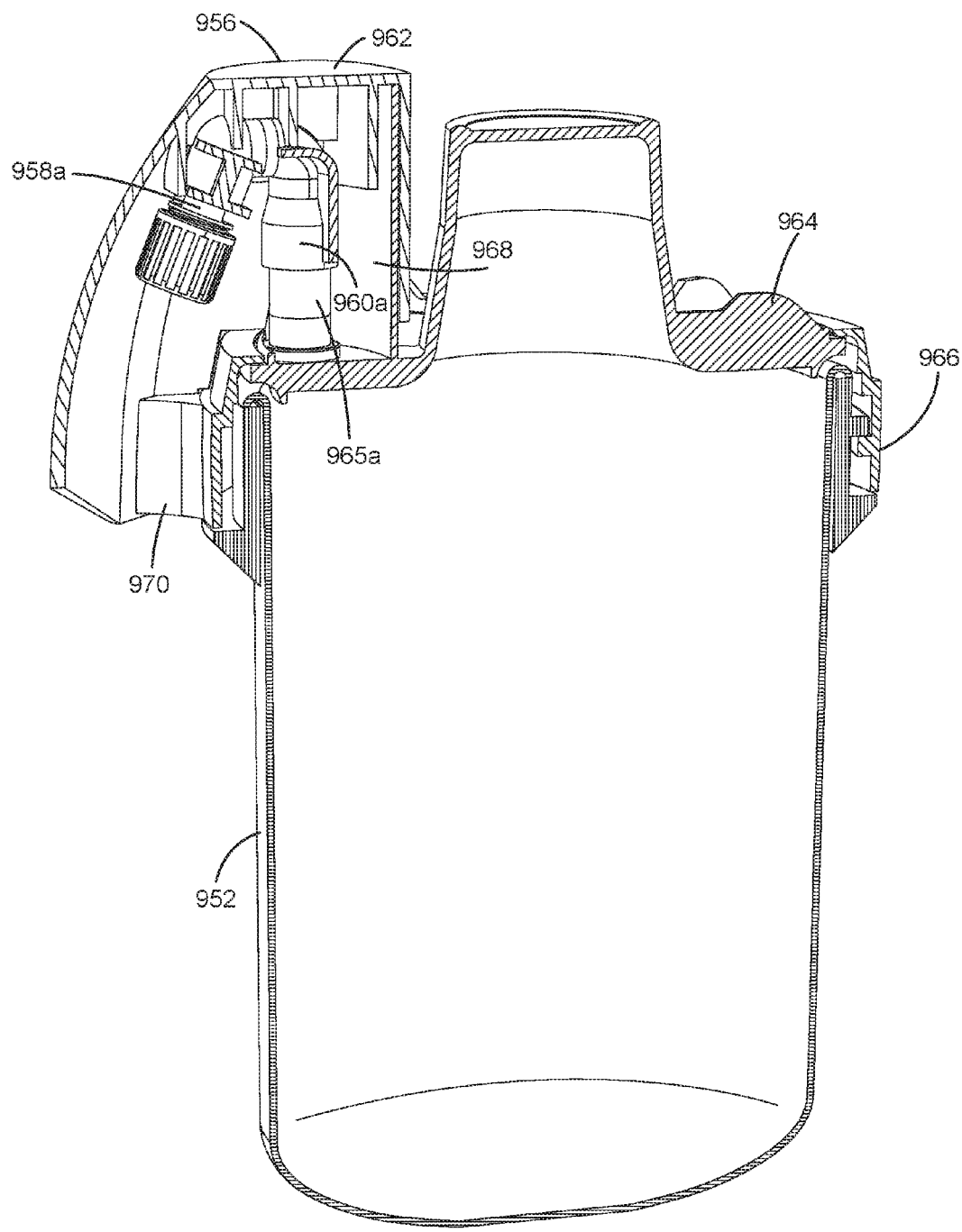
FIG. 43 is a sectional view of the assembly including the third alternative tether.

In the illustrated embodiment, the connector assembly 908 is coupled to the elbow 912 by pivots 910a-b. In this embodiment, the pivots 910a-b perform various functions. The pivots 910a-b intersecure the elbow 912 and the connector assembly 908 in such a way as to allow the elbow 912 to pivot with respect to the connector assembly 908. Further, the pivots 910a-b provide flow passages between the connectors 908a-b and the elbow 912. In the illustrated embodiment, each pivot 910a-b is a generally L-shaped structure that defines internal water flow passage. As shown in FIG. 35, each pivot 910a-b includes a nipple 926 that is fitted into a corresponding seat 928 in the elbow 912. The nipple 926 and seat 928 are configured to provide a leaktight, yet pivotal, connection.

As noted above, the elbow 912 is pivotally coupled to the connector assembly 908 by pivots 910a-b. The elbow 912 defines a pair of internal flow passages that provide fluid communication between the pivots 910a-b and the tether head 914. The internal flow passages are in fluid communication with seats 928 so that there is fluid communication between the flow passages in the pivots 910a-b and the flow passages in the elbow 912. The elbow 912 also defines a tether head receptacle 934 configured to receive the tether head 914 as described below. The tether head receptacle 934 may be sized and shaped to correspond with and closely receive the mating portion of tether head 914.

In the illustrated embodiment, the tether head 914 is configured to pivot with the elbow 912 so that the tether head 914 can be selectively engaged with and disengaged from the pressure vessel 902. As shown, the tether head 914 of this embodiment includes a first end that is configured to be fitted into the tether head receptacle 934 in the elbow 912 and a second end that is configured to operatively couple to the supply inlet 905a and the treated outlet 905b. The tether head 914 may be secured in the receptacle 934 using essentially any leaktight union. For example, the tether head 914 may be joined to the elbow 912 using epoxy or other adhesives. The tether head 914 defines a pair of internal passages that extend through the tether head 914 and emerge at the second end to form a supply port 938a that can be fitted over the supply inlet 905a and a return port 983b that can be fitted over the treated outlet 905b. Although not shown, seals may be provided to create a leaktight seal.

The tether housing 916 of this embodiment is a shroud that covers the connector assembly 908 and the pivots 910a-b. The tether housing 916 may include a screw boss that allows the tether housing 916 to be secured to the connector assembly 908 by a screw 923. The design and configuration of the tether housing 916 may vary from application to application. In some applications, the tether housing may be eliminated.

In use, the tether 906 is installed by pivoting the elbow 912 and the tether head 914 into the upright position and then joining the connector assembly 908 to the collar 911. More specifically, the connector assembly 908 is manipulated to move the key 920 vertically upward into keyway 918. Once the key 920 is fully seated, the elbow 912 and the tether head 914 can be pivoted down into the horizontal position to operatively couple the supply port 938a with the supply inlet 905a and the return port 983b with the treated outlet 905b. In some applications, the interconnection between the tether head 914 and the pressure vessel 902 may be sufficient to hold the tether 906 in the folded position. For example, the fitting arrangement may provide sufficient frictional interaction to hold the parts together or the fitting may include feature that provide a sufficient mechanical interlock. If desired, the tether head 914 and/or pressure vessel 902 may be provided with additional structure to mechanically secure the tether head 914 in the horizontal position, such as a latch, tab, screw or snap fit. It should be noted that the key 920/keyway 918 help to ensure that the collar 911 is properly seated before the water treatment system is operated. If the collar 911 has not been properly seated (e.g. properly tightened) the tether 906 will not be aligned with the supply inlet 905a or the return port 905b and therefore cannot be connected to the pressure vessel 902. Once the tether 906 has been installed, the electronics modules 904 may be installed on the pressure vessel 902 covering the elbow 912 and tether head 914. In some applications, the electronics module 904 may be securely attached to the pressure vessel 902. In such applications, the secured electronics module 904 may engage the tether head 914 to hold or help to hold it in the horizontal position.

FIGS. 40A-43 show another alternative embodiment having a pressure vessel 952, an electronics module 954 mounted atop the pressure vessel 952 and a tether 956 with a portion that is trapped beneath the electronics module 954. As with tether 906, the electronics module 954 must be removed from the pressure vessel 952 to allow installation or removal of the tether 956. In this embodiment, the tether 956 generally includes a connector assembly 958, a pair of manifold connectors 960a-b, and a tether housing 962. The manifold 964 and the collar 966 are specially configured to interfit with tether 956. More specifically, the manifold 964 includes a tether wall 968 that is configured to receive and support the tether housing 962 and the collar 966 includes a tether key 970 that is configured to receive the connector assembly 958. The tether key 970 helps to ensure that the collar 966 is properly seated before the water treatment system is operated. If the collar 966 has not been properly seated (e.g. properly tightened), the tether key 970 will be askew with respect to the manifold 964. As a result, the tether 956 situated in the tether key 970 will not be properly aligned with the supply inlet 965a or the return port 965b in the manifold 964.

In this embodiment, the connector assembly 958 includes two water connectors 958a and 958b that provide a mechanism for securing supply and return water lines to the tether 956. The connectors 958a-b may include essentially any fittings or other leaktight connecting structure. For example, the water connectors 958a-b may include threaded fittings, compression fitting, friction fittings or any other fittings or connections suitable for the application. In this embodiment, the connectors 958a-b are combined into a single structure, but they could be separate components, if desired.

As noted above, the tether 956 includes a pair of manifold connectors 960a-b that are configured to join the connector assembly 958 to the manifold 964. More specifically, manifold connector 960a is coupled to water connector 958a and is designed to be selectively fitted over the supply inlet 965a, and manifold connector 960b is coupled to water connector 958b and is designed to be selectively fitted over the treated outlet 965b. The various connectors 958a-b and 960a-b may be connected using essentially any leaktight union. For example, one end of each manifold connector 960a-b may be joined to the corresponding water connector 958a-b by cement or other adhesives and the other end of each manifold connector 960a-b may be configured to frictionally interfit with the supply inlet 956a and the treated outlet 956b. Additional structure may be provided to secure the connector assembly/manifold connectors to the manifold 964. For example, a latch, tabs, a snap-fit or screws may be used to secure the tether 956 in place on the supply inlet 956a and the treated outlet 956b. In this embodiment, the manifold connectors 960a-b are separate from one another and are independently joined to the connector assembly 958. In alternative embodiments, the two manifold connectors may be combined into a single component. In other alternative embodiments, the connector assembly 958 and manifold connectors 960a-b may be integrally formed as a single one-piece component.

The tether housing 962 is configured to form a shroud covering a majority of the tether 956. In the illustrated embodiment, the tether housing 962 is disposed over the connector assembly 958 and the manifold connectors 960a-b. The tether housing 962 and connector assembly 958 may be intersecured, for example, by screws or by adhesive, such that they are installed on and removed from the pressure vessel 952 as a single unit. Alternatively, the tether housing 962 may generally be separate from the connector assembly 958 and may be installed over the connector assembly 958 once the connector assembly 958 has been secured to the supply inlet 956a and the treated outlet 956b. In this embodiment, the tether housing 962 includes a pair of legs 972 that extend outwardly from the housing and are configured to be trapped beneath the electronics module 954 once the electronics module 954 is installed. In alternative embodiments, the tether housing 962 may include alternative structure that is trapped beneath or otherwise secured by the electronics module 954. Additionally or alternatively, the tether housing 962 may be secured to the manifold 964 or the collar 966. In the illustrated embodiment, the tether housing 962 is sized and shaped to fit over the tether wall 968. The tether housing 962 may be secured to the tether wall 968, for example, by snap-locking features or by fasteners, such as screws. Once the tether 956 and tether housing 962 have been installed on the manifold 964, the electronics modules 954 may be installed on the pressure vessel 952 covering the legs 972 of the tether housing 962. In some applications, the electronics module 954 may be securely attached to the pressure vessel 952. In such applications, the secured electronics module 954 may engage the legs 972 to hold or help to hold the manifold connectors 96a-b in engagement with the supply inlet 956a and the treated outlet 956b.

Although not shown the tethers 806, 906 and 956 may also include integrated power connections, as shown, for example, in tether 92 discussed above in connection with water treatment system 10. For example, any one of the tethers 806, 906 or 956 may be provided with integrated power connections by including a power connector seat that is configured to receive the plug end of the power cord. The power connector seat may be configured to correspond with the shape of the plug end so that the plug end is held in the seat by an interference fit or a snap-lock. The plug end may alternatively be secured to the tether using essentially other suitable technique, such as fasteners. The power connector seat may be positioned in alignment with a corresponding power connector secured to the manifold or the electronics module, as desired. For example, the power connector seat may be positioned so that installation of the tether not only automatically connects the water connections, but also automatically connects the power connector.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A water treatment engine comprising:
    a pressure vessel containing a water treatment component, said pressure vessel including a single connection point having a water inlet, a water outlet and a power inlet;
    an electronics module removably mounted to said pressure vessel; and
    a tether releaseably interfitted with said single connection point, said tether coupled to a water supply line, a water return line and a power line, said tether configured to be fitted into said single connection point with a single action that simultaneously couples said water supply line to said water inlet, said water return line to said water outlet and said power line to said power inlet.

2. The water treatment engine of claim 1 wherein said tether and said single connection point cooperatively form a locking mechanism for securing said tether to said single connection point.

3. The water treatment engine of claim 2 wherein said locking mechanism includes a release, said release being accessible only when said electronics module is removed from said pressure vessel.

4. The water treatment engine of claim 1 wherein said single connection point power inlet is electrically coupled to a power outlet;
    said electronics module including a power inlet, said electronics module power inlet being positioned to automatically couple to said power outlet when said electronics module is disposed on said pressure vessel.

5. The water treatment engine of claim 4 wherein said pressure vessel includes a base and a manifold, said manifold being disposed above said base, said single connection point being incorporated into said manifold.

6. The water treatment engine of claim 5 wherein said manifold has a perimeter, said single connection point disposed within said perimeter.

7. The water treatment engine of claim 1 wherein said tether includes a portion disposed between said electronics module and said pressure vessel, wherein said tether is removable from and installable on said pressure vessel only when said electronics module is removed from said pressure vessel.

8. The water treatment engine of claim 1 wherein said tether includes an actuator movable between a locked position in which said tether is coupled to said electronics module and to said pressure vessel and a released position in which said tether is decoupled from said electronics module and said pressure vessel.

9. The water treatment engine of claim 8 wherein said actuator includes a button that is manually pivotable between said locked position and said released position.

10. The water treatment engine of claim 9 wherein said button includes a first part configured to mechanically interfit with said electronic module only when said button is in said locked position and a second part configured to mechanically interfit with said pressure vessel only when said button is in said locked position.

11. The water treatment engine of claim 10 wherein said second part is a vertically movable hook having a catch that selectively engages said pressure vessel when said button is in said locked position.

12. The water treatment engine of claim 1 wherein said tether includes a tether housing, said tether housing including a portion disposed between said electronics module and said pressure vessel, wherein said tether is removable from and installable on said pressure vessel only when said electronics module is removed from said pressure vessel.

13. The water treatment engine of claim 12 wherein said pressure vessel includes a tank, a manifold and a collar, said manifold including said water inlet and said water outlet, said collar securing said manifold to said tank; and
wherein said collar includes a tether key configured to provide a seat for said tether, said tether key aligning with said water inlet and said water outlet when said collar is fully seated.

14. The water treatment engine of claim 1 wherein said tether includes a pivotal tether head that is pivotally movable between a raised position and a folded position, said tether head being engaged with said water inlet and said water outlet when in said folded position.

15. The water treatment engine of claim 14 wherein said pressure vessel includes a keyway and said tether includes a key configured to be fitted into said keyway, said key and keyway providing alignment between said tether head and said water inlet and between said tether head and said water outlet.

16. The water treatment engine of 15 wherein said tether head is disposed beneath said electronics module when said electronics module is properly installed on said pressure vessel.

17. A water treatment assembly comprising:
a pressure vessel containing a water treatment component, said pressure vessel including a single connection point having a water inlet and a water outlet; and
a tether releaseably interfitted with said single connection point, said tether coupled to a water supply line and a water return line, said tether configured to be operatively interconnected with said single connection point with a single action that simultaneously couples said water supply line to said water inlet and said water return line to said water outlet;
wherein said single connection point includes a power inlet, said tether being coupled to a power supply line and including a power connection for coupling said power supply line to said power inlet;
wherein said single action simultaneously couples said water supply line to said water inlet, said water return line to said water outlet and said power connection to said power inlet.

18. The water treatment assembly of claim 17 wherein said pressure vessel includes a tank, a manifold and a collar, said collar selectively joining said manifold to said tank, said collar having a fully seated position; and
said tether being mountable to said single connection point only when said collar is in said fully seated position.

19. The water treatment assembly of claim 18 further including an electronics module disposed on said pressure vessel, said tether at least partially disposed between said electronics module and said pressure vessel, whereby said electronics module must be removed from said pressure vessel for said tether to be installed on or removed from said single connection point.

20. The water treatment assembly of claim 17 further including an electronics module disposed on said pressure vessel; and
wherein said tether includes an actuator movable between a locked position in which said tether is coupled to said electronics module and to said pressure vessel and a released position in which said tether is decoupled from said electronics module and said pressure vessel.

21. The water treatment assembly of claim 17 wherein said tether includes a pivotal tether head that is pivotally movable between a raised position and a folded position, said tether head being engaged with said water inlet and said water outlet when in said folded position.

22. The water treatment assembly of claim 21 wherein said pressure vessel includes a keyway and said tether includes a key configured to be fitted into said keyway when said tether is installed on said pressure vessel, said key and keyway providing alignment between said tether head and said water inlet and between said tether head and said water outlet.

23. A method for installing a water treatment engine, comprising the steps of:
providing a pressure vessel with a single connection point including a water inlet and a water outlet;
providing a tether coupled to a water supply line and a water return line, the tether having a first connection for coupling to the water supply line to the water inlet and a second connection for coupling the water return line to the water outlet; and
releasably mounting the tether to the pressure vessel in a single action that simultaneously couples the first connection to said water inlet and the second connection to the water outlet;
wherein the single connection point includes a power inlet, the tether being coupled to a power supply line and including a third connection for coupling the power supply line to the power inlet;
wherein said tether mounting step is further defined as mounting the tether to the pressure vessel in a single action that simultaneously couples the first connection to the water inlet, the second connection to the water outlet and the third connection to the power inlet.

24. The method of claim 23 further including the step of installing an electronics module on the pressure vessel; and
wherein said tether mounting step includes securing the tether to the electronics module and to the pressure vessel.

25. The method of claim 23 wherein said tether mounting step includes the steps of:
securing the tether to the pressure vessel; and
moving the tether into a folded position to bring the first connection into operative engagement with the water inlet and to bring the second connection into operative engagement with the water outlet.

26. The method of claim 23 further including the step of installing an electronics module on the pressure vessel after said tether mounting step, wherein at least a portion of the tether is entrapped between the electronics module on the pressure vessel.

* * * * *